(12) United States Patent
Kobayashi et al.

(10) Patent No.: US 9,100,525 B2
(45) Date of Patent: Aug. 4, 2015

(54) INFORMATION PROCESSING APPARATUS, INFORMATION STORAGE APPARATUS, INFORMATION PROCESSING SYSTEM, INFORMATION PROCESSING METHOD, AND PROGRAM

(71) Applicant: SONY CORPORATION, Tokyo (JP)

(72) Inventors: Yoshiyuki Kobayashi, Tokyo (JP); Hiroshi Kuno, Kanagawa (JP); Takamichi Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 287 days.

(21) Appl. No.: 13/673,042

(22) Filed: Nov. 9, 2012

(65) Prior Publication Data
US 2013/0129089 A1 May 23, 2013

(30) Foreign Application Priority Data
Nov. 17, 2011 (JP) .................................. 2011-251735

(51) Int. Cl.
*H04L 29/00* (2006.01)
*H04N 1/00* (2006.01)
*G06F 21/10* (2013.01)

(52) U.S. Cl.
CPC ............ *H04N 1/00838* (2013.01); *G06F 21/10* (2013.01)

(58) Field of Classification Search
USPC ........................................................ 380/201
See application file for complete search history.

(56) References Cited

U.S. PATENT DOCUMENTS

2003/0177379 A1* 9/2003 Hori et al. ...................... 713/193
2010/0161928 A1* 6/2010 Sela et al. ...................... 711/163
2010/0205461 A1* 8/2010 Satou et al. .................... 713/193
2012/0303972 A1 11/2012 Kuno et al.

OTHER PUBLICATIONS

U.S. Appl. No. 13/593,824, filed Aug. 24, 2012, Kuno, et al.
U.S. Appl. No. 13/558,687, filed Jul. 26, 2012, Kuno, et al.
U.S. Appl. No. 13/556,301, filed Jul. 24, 2012, Kuno, et al.
U.S. Appl. No. 13/562,788, filed Jul. 31, 2012, Kobayashi, et al.

* cited by examiner

*Primary Examiner* — Joseph P Hirl
*Assistant Examiner* — Chi Nguy
(74) *Attorney, Agent, or Firm* — Hazuki International, LLC

(57) ABSTRACT

An information storage apparatus includes a storage unit configured to store an encrypted content and an encryption key to be applied to decryption of the encrypted content, the storage unit including a protected area in which a converted encryption key is stored and to which access restrictions are set, the converted encryption key being a data item acquired through conversion of the encryption key, and a general purpose area storing the encrypted content and an encrypted content signature file set correspondingly to the encrypted content, the encrypted content signature file containing, as a recorded data item, a block identifier indicating in which of areas in the protected area storage of the converted encryption key is permitted, to permit a reproducing apparatus to execute content reproduction possibility judgment applying the block identifier, the reproducing apparatus being configured to read the encrypted content from the storage unit and execute a reproducing process.

13 Claims, 35 Drawing Sheets

| ECS Issuer Key Revocation List | | | | | |
|---|---|---|---|---|---|
| Version | Number of entries | Revoked ECS Issuer Certificate ID #1 / Revoked Date #1 | ... | Revoked ECS Issuer Certificate ID #N / Revoked Date #N | Signature by LA |

FIG.12

| | Protected Area | | General Purpose Area |
|---|---|---|---|
| | Block #0 | Block #1 | |
| Server A | Kt(a1)⊕(UR(a1)) \|\| ECSSig(a1))hash<br>Kt(a2)⊕(UR(a2)) \|\| ECSSig(a2))hash<br>Kt(a3)⊕(UR(a3)) \|\| ECSSig(a3))hash | --- | Con(a1), UR(a1), ECS(a1)<br>Con(a2), UR(a2), ECS(a2)<br>Con(a3), UR(a3), ECS(a3) |
| Server B | --- | Kt(b1)⊕(UR(b1)) \|\| ECSSig(b1))hash<br>Kt(b2)⊕(UR(b2)) \|\| ECSSig(b2))hash | Con(b1), UR(b1), ECS(b1)<br>Con(b2), UR(b2), ECS(b2) |

FIG.21

|  | Protected Area | | General Purpose Area |
|---|---|---|---|
|  | Block #0 | Block #1 | |
| Server A | Kt(a1)⊕(UR(a1)\|\|ECSSig(a1))hash<br>Kt(a2)⊕(UR(a2)\|\|ECSSig(a2))hash<br>Kt(a3)⊕(UR(a3)\|\|ECSSig(a3))hash | --- | Con(a1), UR(a1), ECS(a1)<br>Con(a2), UR(a2), ECS(a2)<br>Con(a3), UR(a3), ECS(a3) |
| Server B | Kt(b1)⊕(UR(b1)\|\|ECSSig(b1))hash<br>Kt(b2)⊕(UR(b2)\|\|ECSSig(b2))hash | --- | Con(b1), UR(b1), ECS(b1)<br>Con(b2), UR(b2), ECS(b2) |
| Server C | --- | Kt(c1)⊕(UR(c1)\|\|ECSSig(c1))hash | Con(c1), UR(c1), ECS(c1) |
| Server D | --- | Kt(d1)⊕(UR(d1)\|\|ECSSig(d1))hash<br>Kt(d2)⊕(UR(d2)\|\|ECSSig(d2))hash | Con(d1), UR(d1), ECS(d1)<br>Con(d2), UR(d2), ECS(d2) |

FIG.22

INFORMATION PROCESSING APPARATUS, INFORMATION STORAGE APPARATUS, INFORMATION PROCESSING SYSTEM, INFORMATION PROCESSING METHOD, AND PROGRAM

BACKGROUND

The present disclosure relates to an information processing apparatus, an information storage apparatus, an information processing system, an information processing method, and a program. More particularly, the present disclosure relates to an information processing apparatus, an information storage apparatus, an information processing system, an information processing method, and a program for preventing fraudulent usage of contents.

Contents such as a movie and a music piece are provided to users via various media such as a DVD (Digital Versatile Disc), a Blu-ray Disc (trademark), and a flash memory, networks such as the Internet, or a broadcast wave. The users can reproduce such contents by using a recording/reproducing apparatus such as a PC, a mobile terminal, a BD player, or various information processing apparatuses such as a television.

However, copyrights, distribution rights, and the like of many of the contents to be provided to users, such as music data items and image data items are held by creators or sellers. Thus, in many cases, providers of such contents set predetermined usage restriction on the contents when providing the contents to the users.

By using digital recording apparatuses and digital recording media, for example, images and sound can be repeatedly recorded and reproduced without being deteriorated. Thus, there has been a problem of spread of usage of illegally copied contents, specifically, distribution of illegally copied contents via the Internet and distribution of what is called pirated discs.

In order to prevent such illegal data copying, various technologies for preventing illegal copying to digital recording apparatuses and digital recording media have been put to practical use.

As an example of such technologies, there is a content encryption process of giving a key to decryption of an encrypted data item only to a reproducing apparatus having a license which is a content usage right. The license is given to a reproducing apparatus designed to follow predetermined operating regulations such as a regulation prohibiting illegal copying. Thus, other reproducing apparatuses to which the license has not been given do not have the key to decryption of an encrypted data item, and hence cannot decrypt the encrypted data item.

However, even when such content encryption is executed, contents have still been fraudulently used.

Here, an example of fraudulent usage of contents is described.

In this example, a configuration is assumed in which a content server distributes encrypted contents to user apparatuses such as a recording/reproducing apparatus, a PC, and a mobile terminal.

When distributing encrypted contents to the user apparatuses, the content server distributes the following data items to the user apparatuses, for example, via a network.

(a) Encrypted contents
(b) Encryption keys to encryption and decryption of the encrypted contents.

When distributing the same content such as the same movie to a large number of user apparatuses, the content server executes, for example, in either one of the following two processes.

(A) Creating different encrypted contents through application of individual different encryption keys, and providing the different encrypted contents respectively to the user apparatuses.

(B) Creating the same encrypted content encrypted with the same encryption key, and providing the same encrypted content to each of the plurality of user apparatuses.

In consideration of security for preventing fraudulent usage of contents, the above-mentioned process (A) is advantageous.

However, in order to execute the above-mentioned process (A), it is necessary to execute a process of setting individual encryption keys respectively to a large number of users and creating individual encrypted contents. As a result, there arises a problem that, in proportion to the number of users to receive contents, processing load to the server becomes higher owing, for example, to creation and management of the encryption keys, and the process of creating the encrypted contents.

Thus, in many cases, the above-mentioned process (B), in other words, a process of creating the same encrypted content of the same content by encryption with the same encryption key and providing the same encrypted content to each of the plurality of users is performed.

For example, one encryption key (in other words, title key) is set with respect to a content having a certain title, and the same encrypted content is created through application of the one encryption key. Then, the following data set is distributed to each of the large number of users.

(a) Encrypted content
(b) Title key

Such a process reduces the processing load to a content server.

Note that, in the following description, encryption keys set in units of titles of contents are defined as "title keys."

Note that, the title keys are applied to processes of encrypting and decrypting encrypted contents corresponding to the titles.

However, when the same data sets, in other words, the same combinations of the following data items:

(a) Encrypted content, and
(b) Title key, are distributed to the large number of users in this way, some "unauthorized users" may execute the following processes.

Specifically, fraudulence as follows may be performed.

(1) An "unauthorized user" reads a title key received from a server, and exposes the read title key to an unspecified number of users.

Alternatively, (2) an "unauthorized user" uses a title key A corresponding to a certain encrypted content A so as to encrypt a whole different content B, and distributes the following data combinations to an unspecified number of users.

(X) Title key A
(Y) Encrypted content B encrypted with the title key A.

For example, in a case where the above-mentioned process (1) is executed, a large number of users who have acquired the illegally exposed title key fraudulently use the content encrypted with the same title key as the illegally exposed title key.

Further, in a case where the above-mentioned process (2) is executed, when the large number of users acquire, from the above-mentioned "unauthorized user," the illegal data set, in other words, (X) Title key A, and (Y) Encrypted content B encrypted with the title key A, which are created by the "unauthorized user," the encrypted content B is illegally used.

As a result, fewer users legally purchase an original legal data set, in other words, the encrypted content B, and a title key B corresponding to the encrypted content B, and profit to copyright holders and distribution right holders are markedly lost.

Further, a specific example of the fraudulent process is described.

In this specific example, it is assumed that the content server holds the following data sets of encrypted contents (C) of items (1) to (3) and title keys (Kt).

(1) (Kt11, C11)

(2) (Kt12, C12)

(3) (Kt13, C13)

Note that, Cnn represents a content file, and

Ktnn represents a title key used for encryption of the content.

(Kt11, C11) represents a data set of a title key (Kt11) and a content (C11) encrypted with the title key (Kt11).

For example, it is assumed that a certain "unauthorized user Ux" has purchased all the above-mentioned three data sets:

(1) (Kt11, C11), (2) (Kt12, C12), and (3) (Kt13, C13), and that this purchasing process itself has been executed based on a predetermined legal purchasing procedure between a user apparatus such as a PC of the "unauthorized user Ux" and a content server.

The "unauthorized user Ux" records the above-mentioned data sets (1) to (3) to a medium such as a hard disc of the PC as a user apparatus.

The "unauthorized user Ux" reads the above-mentioned data sets (1) to (3) from the medium such as a hard disc of the PC as a user apparatus, and decrypts all the encrypted contents with respective title keys. In this way, the following data items are acquired.

Title keys: Kt11, Kt12, and Kt13

Decrypted contents: C11, C12, and C13

Note that, when a regular content reproduction program is used in an authorized reproducing apparatus, title keys cannot be read to the outside. However, the title keys may be read, for example, by installing a malicious program to the apparatus itself such as the PC. Thus, it has still been difficult to perfectly prevent the title keys from being read.

Further, the "unauthorized user Ux" creates a data item

C11∥C12∥C13 acquired through concatenation of the decrypted contents: C11 to C13, and encrypts this concatenated data item with the title key: Kt11.

In other words, the "unauthorized user Ux" creates the following data set (Kt11, C11∥C12∥C13), and illegally distributes this data set via a network. Specifically, this data set is sold at low price, or provided for free to a large number of users.

Such a process allows the large number of general users to acquire, from the above-mentioned "unauthorized user Ux," the above-mentioned illegally created data set, in other words, (Kt11, C11∥C12∥C13).

This data set contains the following data items:

(a) Encrypted contents encrypted with the title key Kt11, and (b) Title key Kt11, and has the same data structure as that of a data set content provided from an authorized content provider to a user.

Thus, as long as having a licensed regular content reproduction program, any authorized reproducing apparatus can decrypt and reproduce the encrypted content [C11∥C12∥C13] without any problem by using the title key Kt11.

As a result, contents are fraudulently used more and more without being legally purchased. In this example, fewer users legally purchase the contents such as C11 to C13. Ultimately, profit to legal right holders is lost.

Here, this fraudulent process is more specifically described. For example, it is assumed that, with regard to series contents such as a drama of twelve titles of Episode 1 to Episode 12, purchase units of the contents are set in units of the episodes as follows.

Episode 1=(Kt01, C01)

Episode 2=(Kt02, C02)

Episode 3=(Kt03, C03)

. . .

Episode 12=(Kt12, C12)

In such a case, a certain "unauthorized user" may execute the following process: purchasing the entire series, in other words, all the twelve titles of Episode 1 to Episode 12; concatenating the contents corresponding to Episode 1 to Episode 12: C01 to C12; and creating a data set by re-encryption with the title key corresponding to Episode 1, in other words, (Kt01, C01µC02∥C03 . . . ∥C12)

so as to expose this data set on the network or illegally sell the same.

In such a case, a large number of user apparatuses are allowed to reproduce and use the contents by acquiring the fraudulent data set (Kt01, C01∥C02∥C03 . . . ∥C12)

created by the "unauthorized user."

For example, on the assumption that a full price in episode units of each of the above-mentioned twelve episodes is ¥2,000, purchase of all the twelve episodes costs as follows.

12×¥2,000=¥24,000

When the "unauthorized user" sells, for example, at ¥6,000, the fraudulent data set (Kt01, C01∥C02∥C03 . . . ∥C12), a large number of users are allowed to purchase this lower-price content. As a result, legal sale of contents is hindered, which leads to profit loss and infringement of rights of original copyright holders and distributorship holders.

Other than the above-mentioned example, the title key Kt11 that has been set correspondingly to a certain content C11 may be used for encryption of various other irrespective contents Cxx as the following data set.

(Kt11, Cxx)

The contents Cxx may include various contents, and hence there arises a problem that all the contents can be limitlessly decrypted and reproduced with a single title key.

In other words, even when a reproducing apparatus prohibited from reproducing plaintext contents is used, by using the above-mentioned fraudulent data set, decryption and reproduction can be executed just as legally purchased contents are decrypted and reproduced.

Further, the "unauthorized user" is allowed also to offer replacement and re-encryption of title keys as services, and hence is allowed to behave just as an authorized server.

As described above, it has been difficult to prevent fraudulent usage only with such a content encryption process as a countermeasure.

As a method of eliminating fraudulent usage of contents other than the encryption process, there is a method of causing a reproducing apparatus to verify whether or not contents have been tampered. By employing this method, in a case where some alteration (tampering) has been confirmed in a content, for example, during a process of distributing the content, usage of the tampered content can be canceled.

Specifically, the following control system may be employed: permitting reproduction of contents only in a case where a user apparatus to execute reproduction of contents is caused to execute a process of verifying whether or not a content has been tampered and no tampering has been confirmed in the content; and cancelling reproduction of contents in a case where some tampering has been confirmed in the content.

For example, Patent Document 1 (Japanese Patent Application Laid-open No. 2002-358011) discloses a control system: calculating a hash value from a file of a content to be reproduced; executing comparison of this hash value with a prepared verification hash value, in other words, a verification hash value calculated in advance based on a regular content data item; and shifting to a process of reproducing the content in a case where the newly calculated hash value has matched the verification hash value and it has been judged that no tampering has been confirmed in the content.

However, in the case of executing such a process of calculating a hash value based on a content, when a volume of a content data item as a source data item of a calculation of the hash value is large, excessively high processing load and an excessively long processing time period are required for the calculation. In recent years, qualities of moving images have become higher, and hence, in many cases, one content has a data volume of from few gigabytes to few tens of gigabytes. When the user apparatus to execute reproduction of contents is caused to execute the process of calculating a hash value of a content based on such a large volume data, there arises problems that an excessively high data processing capability is required of the user apparatus and that a content reproducing process is not efficiently executed owing to a longer time period required for verification of contents.

Further, Patent Document 2 (Japanese Patent No. 4576936) discloses a system in which hash values of respective hash units set as segmented data items of contents stored in an information recording medium are recorded to a content hash table, and are stored in the information recording medium together with the contents.

According to the system disclosed in Patent Document 2, an information processing apparatus to execute content reproduction executes a hash value verification process based on at least one of the hash units selected at random. With this system, processes of calculating and verifying the hash values can be executed irrespective of data volumes of contents, specifically, based on a hash unit having a small volume of data. As a result, content verification can be efficiently executed in the user apparatus to execute content reproduction.

However, the system disclosed in Patent Document 2 is designed on the premise of a process on contents stored in an information recording medium. In other words, there is a problem that, although the system disclosed in Patent Document 2 is applicable to a case where not only contents but also hash values are simultaneously recorded, for example, at the time of manufacture of the information recording medium, it is difficult for this system to be applied to contents downloaded, for example, from a server.

Further, Patent Document 1 and Patent Document 2 above each put emphasis on verification of whether or not content have been tampered, and hence have a problem of difficulty in restriction of distribution of illegally copied contents.

As described above, with processes of encrypting contents and verifying whether or not the contents have been tampered in related art, distribution of illegally copied contents or leakage of content encryption keys has not yet been sufficiently prevented.

SUMMARY

In view of the above-mentioned problems, there is a need to provide an information processing apparatus, an information storage apparatus, an information processing system, an information processing method, and a program which effectively prevent fraudulent usage of contents.

According to a first embodiment of the present disclosure, there is provided an information storage apparatus, including a storage unit configured to store an encrypted content and an encryption key to be applied to decryption of the encrypted content, the storage unit including a protected area in which a converted encryption key is stored and to which access restrictions are set, the converted encryption key being a data item acquired through conversion of the encryption key, and a general purpose area storing the encrypted content and an encrypted content signature file set correspondingly to the encrypted content, the encrypted content signature file containing, as a recorded data item, a block identifier indicating in which of areas in the protected area storage of the converted encryption key is permitted, to permit a reproducing apparatus to execute content reproduction possibility judgment applying the block identifier, the reproducing apparatus being configured to read the encrypted content from the storage unit and execute a reproducing process.

Further, in the information storage apparatus according to the first embodiment of the present disclosure, the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas in the protected area, storage of the converted encryption key is permitted, and the information storage apparatus permits the reproducing apparatus to judge whether or not the block identifier recorded in the encrypted content signature file falls within the block identifier range recorded in the ECS issuer certificate, and to determine, based on results of the judgment, whether or not the encrypted content can be reproduced, the reproducing apparatus being configured to read the encrypted content from the storage unit and execute the reproducing process.

Still further, in the information storage apparatus according to the first embodiment of the present disclosure, the general purpose area further stores a usage control information item corresponding to the encrypted content, the usage control information item being an information item containing a different block identifier indicating in which of blocks the encryption key is stored, and the information storage apparatus permits the reproducing apparatus to judge whether or not the block identifier recorded in the encrypted content signature file matches the different block identifier recorded in the usage control information item, and to determine, based on results of the judgment, whether or not the encrypted content can be reproduced, the reproducing apparatus being configured to read the encrypted content from the storage unit and execute the reproducing process.

Further, according to a second embodiment of the present disclosure, there is provided an information processing apparatus, including a data processing unit configured to execute a decryption process and a reproducing process of an encrypted content recorded in a medium, the data processing unit being configured to read an encrypted content signature file set correspondingly to the encrypted content from the medium, to acquire, from the encrypted content signature file, a block identifier indicating in which of areas storage of an encryption key to be applied to decryption of the encrypted content is permitted, and to execute a content reproduction possibility judgment process applying the block identifier. Still further, in the information processing apparatus according to the second embodiment of the present disclosure, the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas, storage of the encryption is permitted, and the data processing unit judges whether or not the block identifier recorded in the encrypted content signature file falls within the block identifier range recorded in the ECS issuer certificate, and determines, based on results of the judgment, whether or not the encrypted content can be reproduced.

Yet further, in the information processing apparatus according to the second embodiment of the present disclosure, the medium further stores a usage control information item corresponding to the encrypted content, the usage control information item being an information item containing a different block identifier indicating in which of blocks the encryption key is stored, and the data processing unit judges whether or not the block identifier recorded in the encrypted content signature file matches the different block identifier recorded in the usage control information item, and determines, based on results of the judgment, whether or not the encrypted content can be reproduced.

Further, according to a third embodiment of the present disclosure, there is provided an information processing apparatus, including a data processing unit configured to output an encrypted content to be recorded to a medium and an encryption key to be applied to decryption of the encrypted content, the data processing unit being configured to acquire an encrypted content signature file set correspondingly to the encrypted content, to acquire, from the encrypted content signature file, a block identifier indicating in which of areas storage of the encryption key is permitted, and to execute a content output possibility judgment process applying the block identifier.

Still further, in the information processing apparatus according to the third embodiment of the present disclosure, the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas, storage of the encryption key is permitted, and the data processing unit judges whether or not the block identifier recorded in the encrypted content signature file falls within the block identifier range recorded in the ECS issuer certificate, and determines, based on results of the judgment, whether or not the encrypted content can be output.

Yet further, in the information processing apparatus according to the third embodiment of the present disclosure, the data processing unit is configured to acquire a usage control information item set correspondingly to the encrypted content, to acquire, from the acquired usage control information item, a different block identifier indicating in which of blocks the encryption key is stored, to judge whether or not the block identifier recorded in the encrypted content signature file matches the different block identifier recorded in the usage control information item, and to determine, based on results of the judgment, whether or not the encrypted content can be reproduced.

Further, according to a fourth embodiment of the present disclosure, there is provided an information processing method to be executed by an information processing apparatus, the information processing apparatus including a data processing unit configured to execute a decryption process and a reproducing process of an encrypted content recorded in a medium, the data processing unit being configured to read an encrypted content signature file set correspondingly to the encrypted content from the medium, to acquire, from the encrypted content signature file, a block identifier indicating in which of areas storage of an encryption key to be applied to decryption of the encrypted content is permitted, and to execute a content reproduction possibility judgment process applying the block identifier.

Further, according to a fifth embodiment of the present disclosure, there is provided an information processing method to be executed by an information processing apparatus, the information processing apparatus including a data processing unit configured to output an encrypted content to be recorded to a medium and an encryption key to be applied to decryption of the encrypted content, the data processing unit being configured to acquire an encrypted content signature file set correspondingly to the encrypted content, to acquire, from the encrypted content signature file, a block identifier indicating in which of areas storage of the encryption key is permitted, and to execute a content output possibility judgment process applying the block identifier.

Further, according to a sixth embodiment of the present disclosure, there is provided a program causing an information processing apparatus to execute an information process, the information processing apparatus including a data processing unit configured to execute a decryption process and a reproducing process of an encrypted content recorded in a medium, the program causing the data processing unit to execute a process of reading an encrypted content signature file set correspondingly to the encrypted content from the medium, a process of acquiring, from the encrypted content signature file, a block identifier indicating in which of areas storage of an encryption key to be applied to decryption of the encrypted content is permitted, and a content reproduction possibility judgment process applying the block identifier.

Further, according to a seventh embodiment of the present disclosure, there is provided a program causing an information processing apparatus to execute an information process, the information processing apparatus including a data processing unit configured to output an encrypted content to be recorded to a medium and an encryption key to be applied to decryption of the encrypted content, the program causing the data processing unit to execute a process of acquiring an encrypted content signature file set correspondingly to the encrypted content, a process of acquiring, from the encrypted content signature file, a block identifier indicating in which of areas storage of the encryption key is permitted, and a content output possibility judgment process applying the block identifier.

Note that, the programs according to the embodiments of the present disclosure include programs that can be provided by recording media or communication media to, for example, information processing apparatuses, computers, and systems capable of executing various programs and codes. By providing such programs in the computer-readable form, processes corresponding to the programs are executed in the information processing apparatuses, the computers, and the systems.

The term "system" used in this specification means a logical collective configuration of a plurality of apparatuses, and hence these apparatuses configured as described above are not necessarily provided in the same casing.

According to a configuration in one embodiment of the present disclosure, an apparatus and method for effectively preventing fraudulent usage of contents are provided.

Specifically, from an encrypted content signature file set correspondingly to an encrypted content, a block identifier indicating in which of areas storage of an encryption key to be applied to decryption of the encrypted content is permitted is acquired. Then, a content reproduction possibility judgment process applying the block identifier is executed. The encrypted content signature file contains a certificate issued from an ECS issuer as an issuer of the encrypted content signature file. A judgment is executed as to whether or not the block identifier recorded in the encrypted content signature file falls within a block identifier range recorded in the ECS issuer certificate, and a judgment is executed as to whether or not the block identifier recorded in the encrypted content signature file matches a different block identifier recorded in a usage control information item. Based on results of these judgments, whether or not the content can be reproduced is determined.

By using the block identifier information item acquired from the encrypted content signature file, content usage control can be performed based on a judgment as to whether or not a key information item is recorded in a certain access permitted block.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 12 is an explanatory diagram of a configuration example of an ECS issuer certificate revocation list;

FIG. 21 is an explanatory diagram of a configuration example of the recorded data in the memory card;

FIG. 22 is an explanatory diagram of another configuration example of the recorded data in the memory card;

DETAILED DESCRIPTION OF EMBODIMENTS

Figure 1:
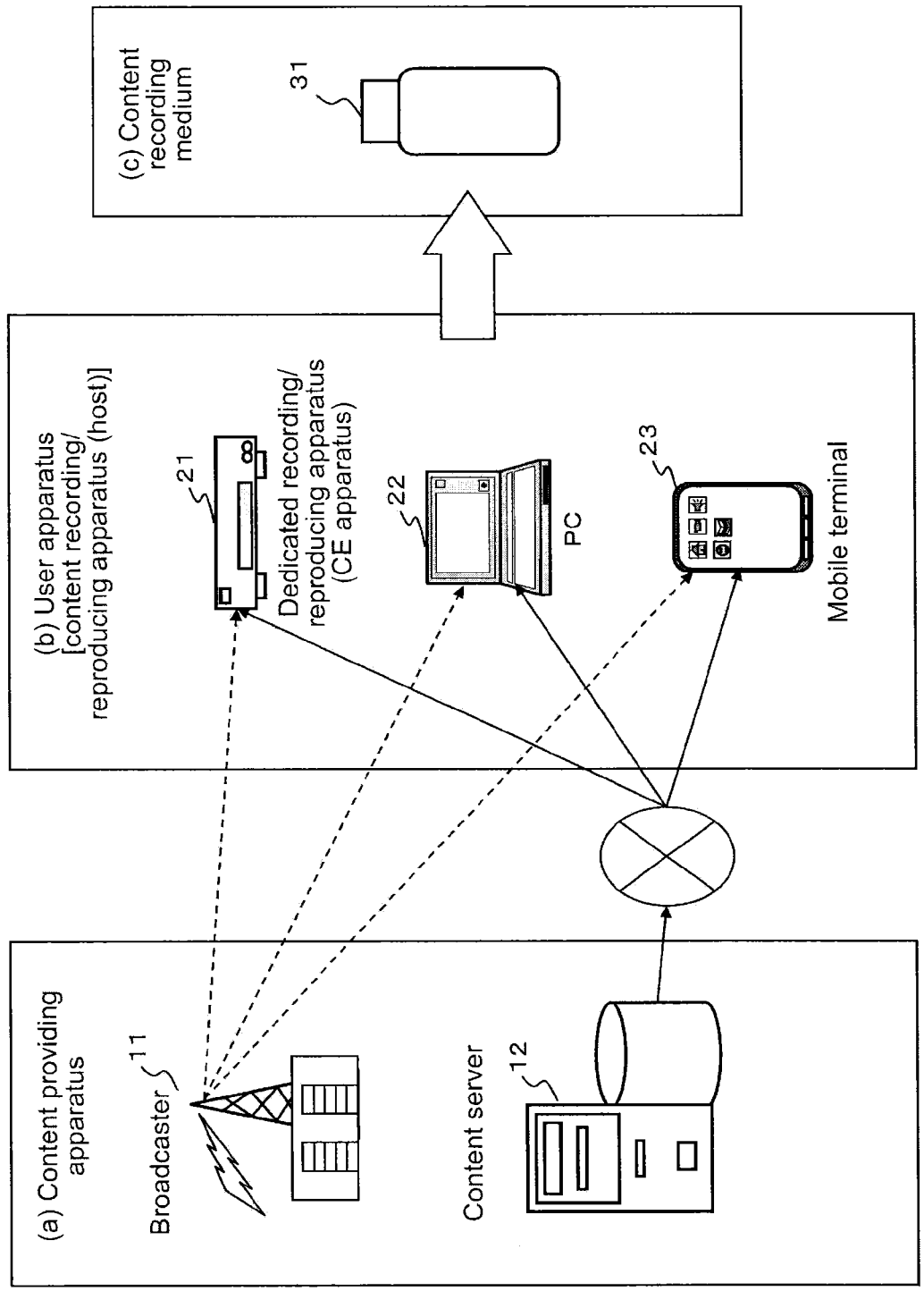
FIG. 1 is an explanatory diagram of an overview of a content providing process and a content usage process.

Hereinafter, an information processing apparatus, an information storage apparatus, an information processing system, an information processing method, and a program according to embodiments of the present disclosure will be described in detail with reference to the drawings. Note that, description is made in the following sections in the following order.

1. Overview of content providing process and content usage process
2. Configuration example and usage example of memory card
3. Certificate containing access permission information item with respect to protected area
4. Example of process of making access to memory card with reference to certificates of apparatuses
5. Content providing system using encrypted content signature (ECS) issuer
6. Configuration example of ECS file
7. Structure of ECS issuer key revocation list
8. Creation process of encrypted content signature file (ECS file)
9. Processes applying date information items of ECS file and ECS issuer certificate
10. Configuration of relating encryption key and signature by ECS issuer
11. Process of applying block identifier recorded in encrypted content signature (ECS) file
12. Hardware configuration example of each apparatus
13. Summary of configuration of present disclosure

[1. Overview of Content Providing Process and Content Usage Process]

Hereinafter, the information processing apparatus, the information processing method, and the program according to embodiments of the present disclosure will be described in detail with reference to the drawings.

First, an overview of a content providing process and a content usage process will be described with reference to FIG. 1 and subsequent drawings.

FIG. 1 illustrates examples of the following from the left-hand side thereof.

(a) Content providing apparatus
(b) Content recording/reproducing apparatus (Host)
(c) Content recording medium The (c) content recording medium is a medium in which a user records contents and which the user uses for a process of reproducing the contents. Herein, there is illustrated a memory card 31 which is an information storage apparatus such as a flash memory.

Note that, in an example described as a typical example in the embodiments hereinafter, although contents provided by a content providing apparatus are encrypted contents, configurations according to the embodiments of the present disclosure are not limited to the case where provided contents are encrypted contents, and applicable also to a case where provided contents are unencrypted plaintext contents.

A user uses the memory card 31 for recording various contents such as a music piece and a movie. These contents include contents to be controlled in usage, such as contents covered by copyright.

The contents to be controlled in usage include contents prohibited from being limitlessly copied or distributed in a form of copied data, and contents limited in usable time period. Note that, when such usage controlled contents are recorded in the memory card 31, usage control information items (usage rules) corresponding to the contents are simultaneously recorded.

As the usage control information items (usage rules), there are recorded information items relating to usage of the contents, such as a permitted usable time period of the contents and the permitted number of times of copying of the contents.

The content providing apparatus provides such usage control information items correspondingly to and together with the contents.

The (a) content providing apparatus is a source of provision of contents such as a music piece and a movie. As examples of the content providing apparatus, FIG. 1 illustrates a broadcaster 11 and a content server 12.

The broadcaster 11 such as a television station provides various broadcast contents on terrestrial waves or satellite waves via a satellite to a user apparatus [(b) content recording/reproducing apparatus (host)].

The content server 12 is a server to provide the contents such as a music piece and a movie via networks such as the Internet.

For example, the user inserts the memory card 31 as the (c) content recording medium into the (b) content recording/reproducing apparatus (host). In this way, the contents provided by the broadcaster 11 and the content server 12 are received via a reception unit of the (b) content recording/reproducing apparatus (host) itself or a reception apparatus connected to the content recording/reproducing apparatus (host), and recorded in the memory card 31.

The (b) content recording/reproducing apparatus (host) accepts the memory card 31 as the (c) content recording medium to record the contents received from the broadcaster 11 and the content server 12 as the (a) content providing apparatus in the memory card 31.

The (b) content recording/reproducing apparatus (host) includes a dedicated recording/reproducing apparatus 21 (CE apparatus: consumer electronics apparatus) 21, such as a DVD player, which is provided with discs such as a hard disc, a DVD, and a BD. Further, the (b) content recording/reproducing apparatus (host) includes a PC 22 and a mobile terminal 23 such as a smart phone, a mobile phone, a mobile player, and a tablet terminal. All of them are apparatuses capable of accepting the memory card 31 as the (c) content recording medium.

By using the dedicated recording/reproducing apparatus 21, the PC 22, the mobile terminal 23, and the like, the user receives the contents such as a music piece and a movie from the broadcaster 11 and the content server 12, and records these contents to the memory card 31.

How the contents recorded in the memory card 31 are used is described with reference to FIG. 2.

The memory card 31 as an information storage apparatus is a recording medium detachable with respect to a content reproduction apparatus such as a PC, and hence can be freely detached from an apparatus from which the contents have been recorded, and also inserted into other user apparatuses.

Figure 2:
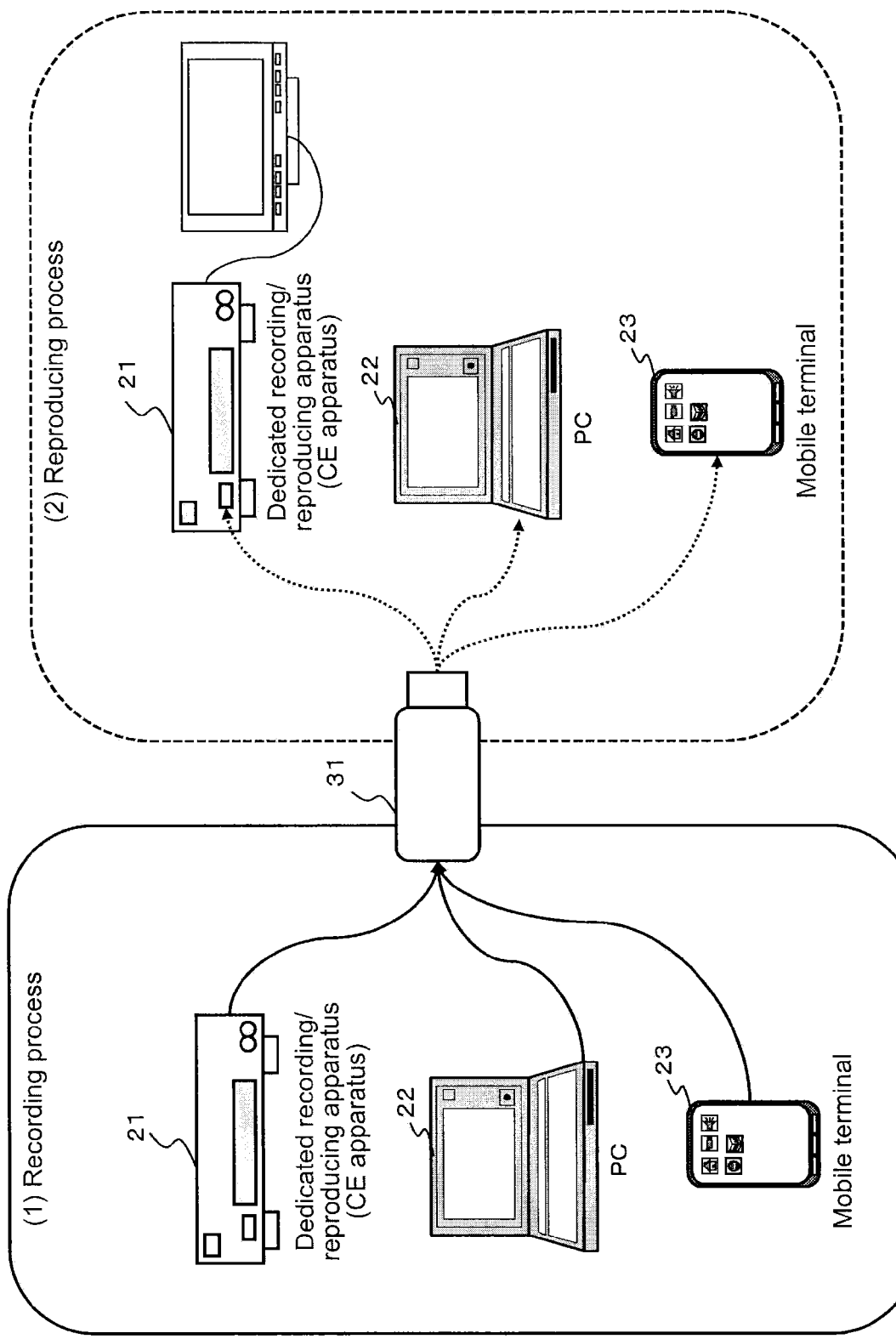
FIG. 2 is an explanatory diagram of a usage mode of contents recorded in a memory card.

Specifically, as illustrated in FIG. 2, the following processes are executed.

(1) Recording process (2) Reproducing process

Note that, some devices execute only one of recording and reproduction.

Further, it is not necessary that the recording process and the reproducing process be executed by the same apparatus, and hence the user can freely select and use a recording apparatus or a reproducing apparatus.

Note that, in many cases, the usage controlled contents recorded in the memory card 31 are recorded as encrypted contents. A content reproducing apparatus such as the dedicated recording/reproducing apparatus 21, the PC 22, and the mobile terminal 23 executes a decryption process based on a predetermined sequence, and then reproduces the contents.

Further, the reproducing process and the like are executed in usage permitting modes recorded in the usage control information items (usage rule) that have been set correspondingly to the contents.

The (b) content recording/reproducing apparatus (host) stores programs (host applications) configured to execute a content usage process and the content decryption process based on the usage control information items (usage rules). The contents are reproduced based on the programs (host applications).

[2. Configuration Example and Usage Example of Memory Card]

Next, a configuration example and a usage example of the memory card such as a flash memory used as a recording medium for contents recording are described.

Figure 3:
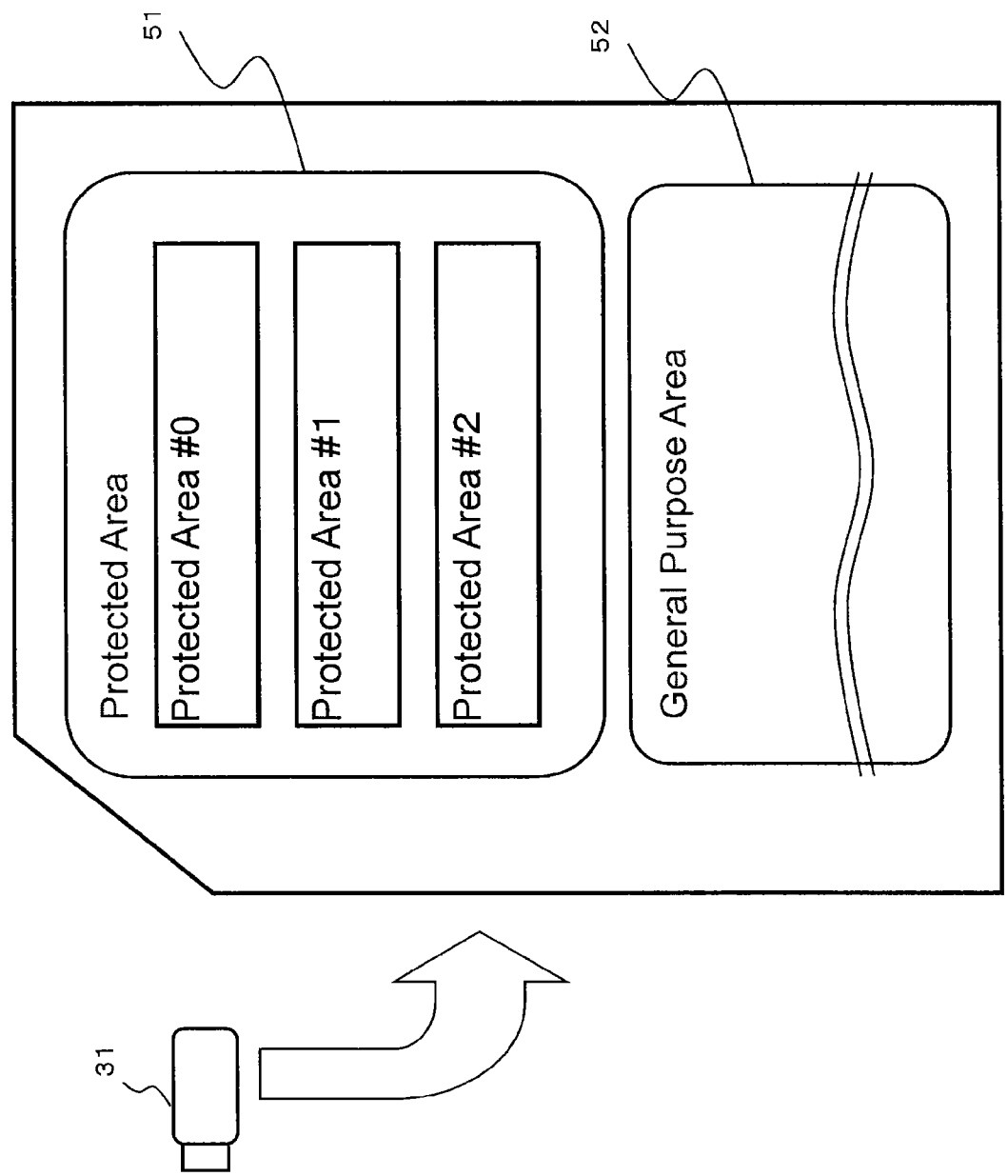
FIG. 3 is an explanatory diagram of a specific configuration example of a storage area in the memory card.

FIG. 3 illustrates a specific configuration example of a storage area in the memory card 31.

As shown in FIG. 3, the storage area in the memory card 31 is formed of the following two areas.

(a) Protected area 51

(b) General purpose area 52

The (b) general purpose area 52 is a freely accessible area from the recording/reproducing apparatus used by the user, and records contents, usage control information items (usage rules) corresponding to the contents, other general content management data items, and the like.

In the general purpose area 52, data can be freely written and read, for example, by the server or the recording/reproducing apparatus of the user.

Meanwhile, the (a) protected area 51 is an area to which free access is not permitted.

The protected area 51 is divided into blocks (#0, #1, #2, . . . ) as a plurality of segment areas, and an access right is set in block units.

For example, when data is written or read, for example, with the recording/reproducing apparatus used by the user or by the server connected via a network, a data processing unit of the memory card 31 determines whether or not reading or writing can be executed in block units correspondingly to apparatuses based on the programs pre-stored in the memory card 31.

The memory card 31 includes not only the data processing unit configured to execute the pre-stored programs but also an authentication processing unit configured to execute an authentication process. First, the memory card 31 executes the authentication process with respect to an apparatus to write or read data with respect to the memory card 31.

At a phase of the authentication process, an apparatus certificate including a public key certificate and the like is received from a counterpart apparatus, in other words, an access requesting apparatus.

For example, when the access requesting apparatus is a server, a server certificate held by the server is received. Then, whether or not access in units of the blocks (segment areas) in the protected area 51 is permitted is judged based on information contained in the certificate.

Meanwhile, when the access requesting apparatus is a host apparatus such as a recording/reproducing apparatus (host) as a user apparatus configured to record and reproduce contents, a host certificate held by the recording/reproducing apparatus (host) is received. Then, whether or not access to the blocks (segment areas) of the protected area 51 is permitted is judged based on information contained in the certificate.

Such access right judgment processes are executed in units of the blocks (areas #0, #1, #2, . . . shown in FIG. 3) in the protected area 51 shown in FIG. 3. The memory card 31 causes the server or the host to execute only a process permitted in units of the blocks (process such as data reading/writing).

Reading/writing restriction information items with respect to a medium (PAD read/PAD write) are set in units of apparatuses to make access to the medium, such as the content server or the recording/reproducing apparatus (host). Those information items are recorded in server certificates and host certificates corresponding to the apparatuses.

Note that, the term "certificate" is abbreviated as "cert" hereinafter.

As described above, the memory card 31 verifies recorded data items in the server certs and the host certs based on the regulatory programs pre-stored in the memory card 31, and then executes a process of permitting access only to access permitted areas.

[3. Certificate Containing Access Permission Information Item with Respect to Protected Area]

Next, a configuration example of a cert required to be presented to a memory card when the server or the host apparatus (in other words, recording/reproducing apparatus) as a user apparatus makes access to the above-mentioned protected area 51 in the memory card 31 is described with reference to FIGS. 4 and 5.

As described above, the memory card 31 executes the authentication process with respect to an apparatus to write or read data with respect to the memory card 31. At the phase of the authentication process, the apparatus cert such as a server cert or a host cert including a public key cert and the like is received from a counterpart apparatus, in other words, an access requesting apparatus. Then, whether or not access to the segment areas of the protected area 51 is permitted is judged based on information contained in the cert.

As an example of the apparatus cert used in this authentication process, a configuration example of the host cert to be stored in the user apparatus (host apparatus) such as the dedicated recording/reproducing apparatus 21, the PC 22, and the mobile terminal 23 illustrated in FIG. 1 is described with reference to FIG. 4.

The host cert is provided to a corresponding user apparatus (host apparatus), for example, by a certificate authority as a subject of issuing the public key cert. For example, the host cert is a cert issued from the certificate authority to a user apparatus (host apparatus) permitted to execute a content usage process by the certificate authority, in other words, a cert storing a public key and the like. A signature of the host cert is set with a certificate authority secret key. In this way, the host cert is configured as a tamper-proof data item.

Note that, the apparatus cert can be pre-stored in a memory in an apparatus based on confirmation results of a type and the like of the apparatus at the time of manufacture of the apparatus. In order to acquire the cert after purchase by a user, there may be employed a configuration in which a process of confirming a type of an apparatus, a type of a usable content, and the like is performed based on a predetermined sequence between the apparatus and the certificate authority or other management stations and then a cert is issued to the apparatus and stored in a memory of the apparatus.

Note that, the server to make access to the protected area in the memory card 31 holds a server public key having the same structure as that of the host cert, and a server cert in which information items for permitting access to the memory card are recorded.

Figure 4:
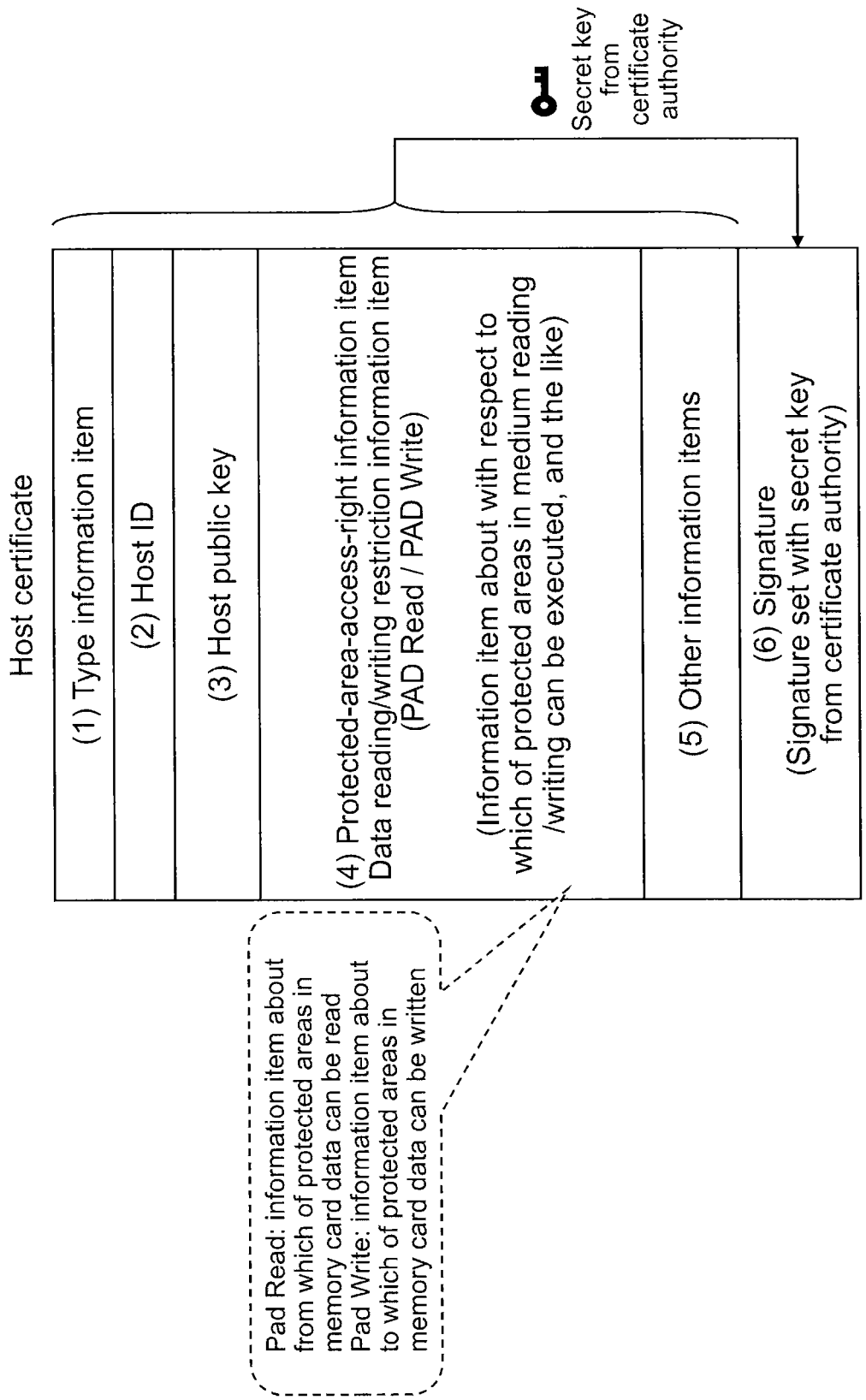
FIG. 4 is an explanatory diagram of a host certificate.

FIG. 4 illustrates a specific example of the host cert provided from the certificate authority to a host apparatus (user apparatus).

As shown in FIG. 4, the host cert contains the following data items.

(1) Type information item
(2) Host ID (user apparatus ID)
(3) Host public key
(4) Protected-area-access-right information item (reading/writing restriction information item (PAD read/PAD write) with respect to a protected area in a medium)
(5) Other information items
(6) Signature Hereinafter, data items of the items (1) to (6) are described.

(1) Type information item

The type information item is an information item indicating a type of the cert and a type of the user apparatus. For example, in the type information item, there are recorded a data item indicating that the cert is a host cert, and a data item indicating a type of the apparatus, specifically, indicating that the apparatus is a PC, a music player, or the like.

(2) Host ID

The host ID is an area in which an apparatus ID as an apparatus identification information item is recorded.

(3) Host public key

The host public key is a public key to the host apparatus, and configures, together with the secret key provided to the host apparatus (user apparatus), a key pair based on a public key encryption method.

(4) Protected-area-access-right information item (reading/writing restriction information item (PAD read/PAD write) with respect to a protected area in a medium)

In the protected-area-access-right information item, there are recorded information items in units of the blocks (segment areas) in the protected area (PDA) 51 set in the storage area in a medium configured to record contents, for example, of the memory card 31 shown in FIG. 3, the reading and writing of data items being permitted in the blocks (segment areas).

The access right is recorded as access rights in units of the blocks (segment areas) in the protected area.

(5) Other information items and (6) Signature

In the host cert, there are recorded various other information items than those described in the above-mentioned data items (1) to (4), such as signature data items with respect to the information items (1) to (5).

The signature is executed with the secret key from the certificate authority. When the information item recorded in the host cert such as the host public key, is extracted to be used, first, a signature verification process applying the public key issued from the certificate authority is executed to confirm that the host cert has not been tampered. The data items stored in the cert, such as the host public key, are used provided that no tampering has been confirmed.

FIG. 4 shows the host cert recording the information items for permitting access from the user apparatus (host apparatus) to the protected area in the memory card. For example, with respect to a server required to make access to the protected area, such as the content providing server configured to provide contents to the memory card, there is provided a cert recording information items for permitting access to the protected area in the memory card [server cert (for example, public key cert storing a server public key)] similar to the host cert shown in FIG. 4.

A configuration example of the server cert to be provided to the server is described with reference to FIG. 5. Note that, in the description hereinafter, the term "server" includes all the content providing apparatuses illustrated in FIG. 1, specifically, apparatuses configured to provide contents to user apparatuses, such as the broadcaster 11 and the content server 12.

The server cert is provided from the certificate authority as the subject of issuing the public key cert, for example, to apparatuses such as the content server configured to provide contents. For example, the server cert is a cert which is issued from the certificate authority to a server permitted to execute a content providing process by the certificate authority and which stores the server public key and the like. A signature of the server cert is set with a certificate authority secret key. In this way, the server cert is configured as a tamper-proof data item.

Figure 5:
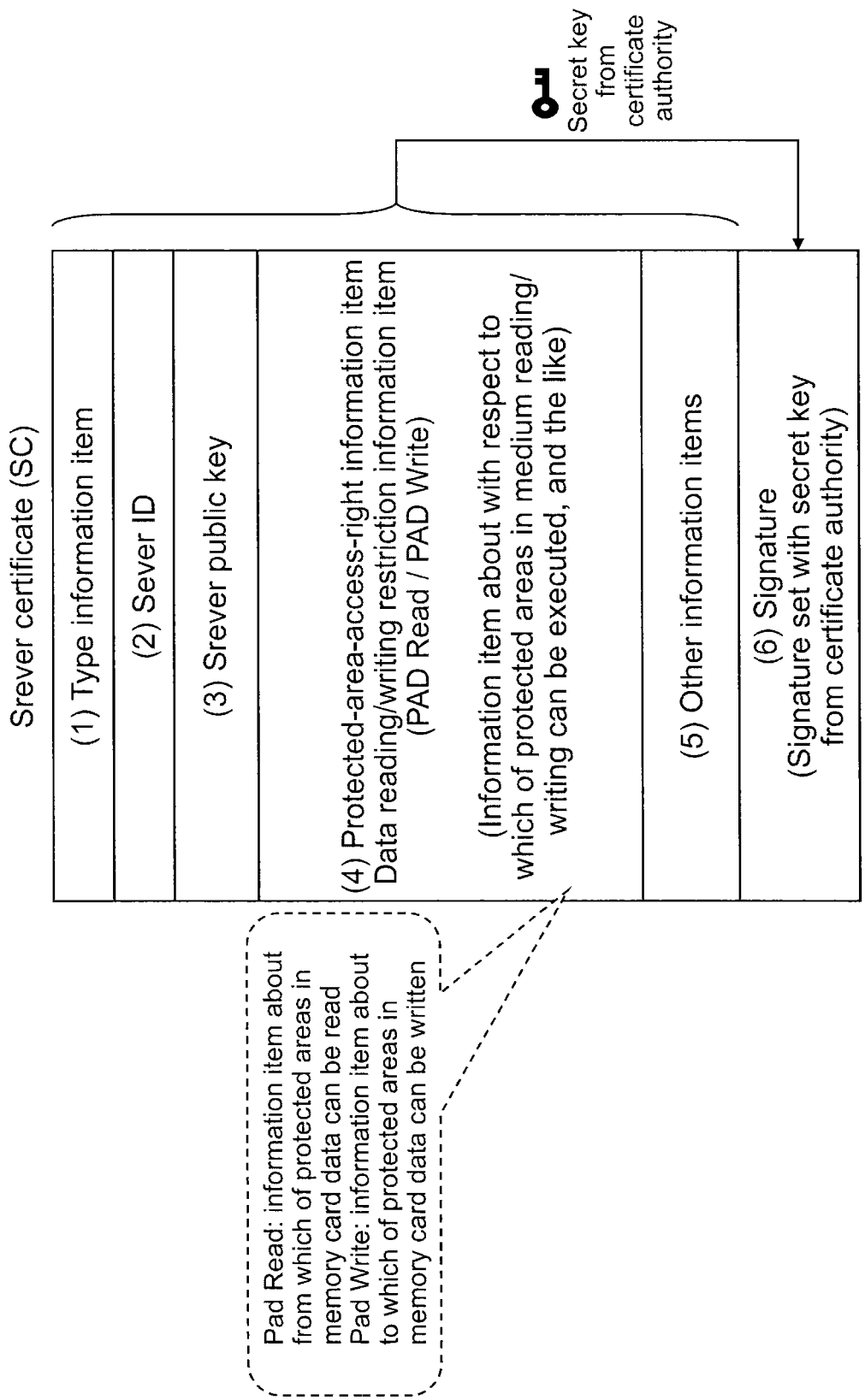
FIG. 5 is an explanatory diagram of a server certificate.

FIG. 5 illustrates a specific example of the server cert to be provided from the certificate authority to a content server.

As shown in FIG. 5, the server cert contains the following data items similar to the host cert described with reference to FIG. 4.

(1) Type information item
(2) Server ID
(3) Server public key
(4) Reading/writing restriction information item (PAD read/PAD write) with respect to a medium
(5) Other information items
(6) Signature These information items are similar to the information items described with reference to FIG. 4, and hence are not described in detail here.

Note that, in the "(4) reading/writing restriction information item (PAD read/PAD write) with respect to a medium," there are recorded access rights (data reading/writing permission information items) in units of the blocks (segment areas) in the protected area 51 in the memory card 31 with respect to each server.

Note that, when the information item recorded in the server cert, such as the server public key, is extracted to be used, first, a signature verification process applying the public key from the certificate authority is executed to confirm that the server cert has not been tampered. The data items stored in the cert, such as the server public key, is used provided that no tampering has been confirmed.

[4. Example of Process of Making Access to Memory Card with Reference to Certificates of Apparatuses]

As described with reference to FIGS. 4 and 5, when the server or the host apparatus (user apparatus such as the recording/reproducing apparatus) makes access to the blocks in the protected area 51 in the memory card 31, it is necessary to present the certs as shown in FIGS. 4 and 5 to the memory card.

The memory card confirms the certs as shown in FIGS. 4 and 5 so as to judge whether or not access in units of the blocks in the protected area 51 in the memory card 31 shown in FIG. 3 is permitted.

The host apparatus holds, for example, the host cert described with reference to FIG. 4, and the server to perform content provision or the like holds the server cert described with reference to FIG. 5.

When those apparatuses make access to the protected area in the memory card, it is necessary for those apparatuses to provide their certs to the memory card and to be judged whether or not the access is permitted based on verification on the memory card side.

Examples of setting access restrictions in cases where an access requesting apparatus with respect to the memory card is the server and is the host apparatus such as the recording/reproducing apparatus are described with reference to FIG. 6.

Figure 6:
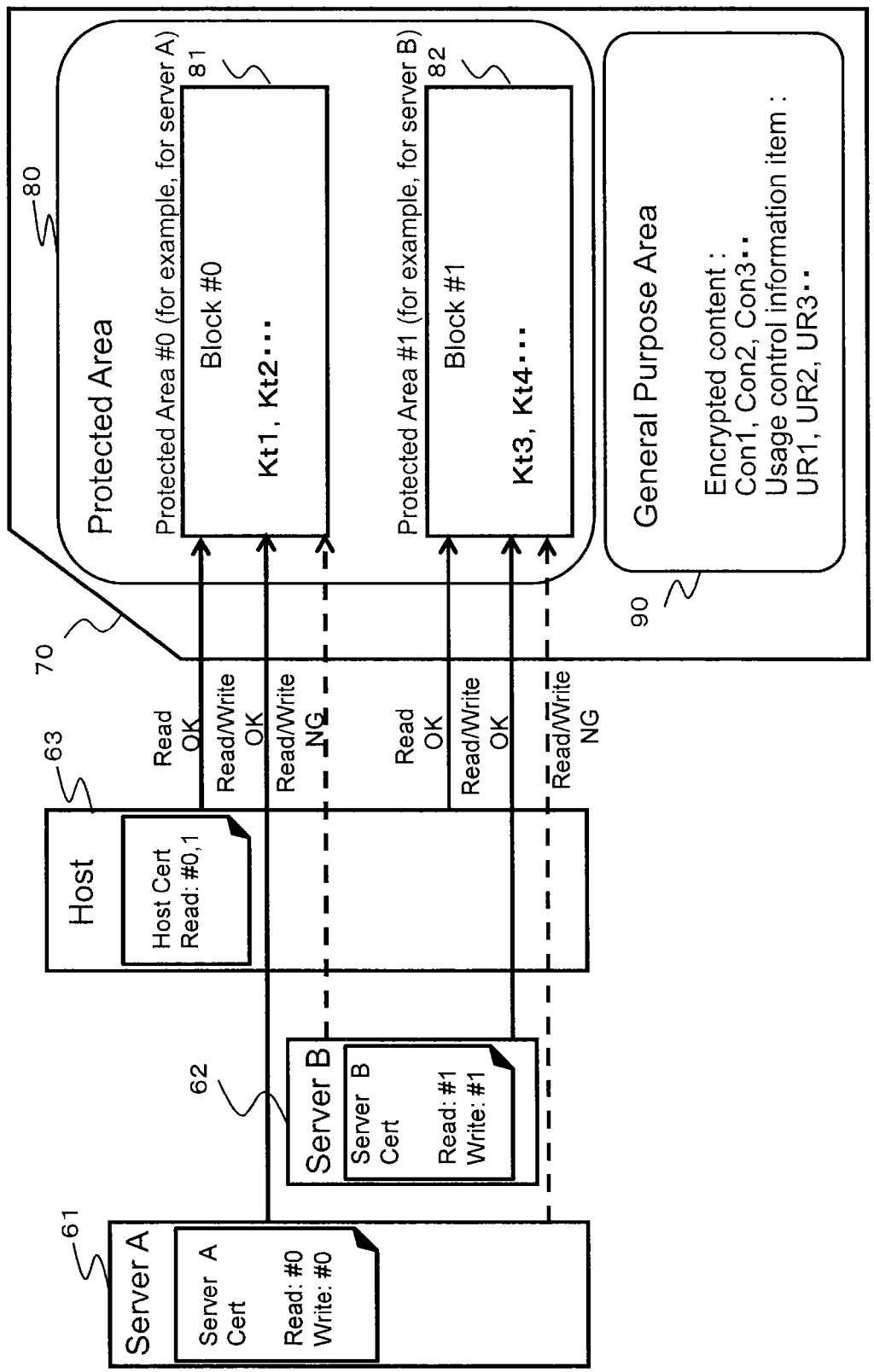
FIG. 6 is an explanatory diagram of a specific configuration example of stored data in the memory card and an example of an access control process.

FIG. 6 shows, from the left, a server A61, a server B62, and a host apparatus 63 as access requesting apparatuses with respect to a memory card, and a memory card 70.

The server A61 and the server B62 provide, for example, encrypted contents (Con1, Con2, Con3, as contents to be recorded to the memory card 70.

These servers further provide title keys (Kt1, Kt2, . . . ) as keys to decryption of the encrypted contents and usage control information items (usage rules: UR1, UR2, . . . ) corresponding to the contents.

The host apparatus 63 is an apparatus to execute the process of reproducing the contents stored in the memory card 70.

The host apparatus 63 reads the encrypted contents (Con1, Con2, Con3, . . . ) and the usage control information items (usage rules: UR1, UR2, . . . ) stored in a general purpose area 90 in the memory card 70. Further, the host apparatus 63 reads the title keys (Kt1, Kt2, . . . ) to be applied to a content decryption process from blocks (segment areas) 81 and 82 in a protected area 80, and then executes the decryption process with reference to the title keys. In this way, the host apparatus 63 uses the contents based on the usage control information items (usage rules).

The memory card 70 includes the protected area 80 and the general purpose area 90. The encrypted contents, the usage control information items (usage rules), and the like are recorded in the general purpose area 90.

The title keys as the keys required for content reproduction are recorded in the protected area 80.

As described above with reference to FIG. 3, the protected area 80 is divided into a plurality of blocks (segment areas).

The example illustrated in FIG. 6 shows only the following two blocks.

Block #0 (protected area #0) 81
Block #1 (protected area #1) 82

In the protected area 80, there are set a large number of other blocks.

There may be employed various setting modes of the blocks.

In the example shown in FIG. 6, the block #0 (protected area #0) 81 is set as a block dedicated for the server A61, in other words, an area for storing title keys to decryption of contents to be provided from the server A61, and the block #1 (protected area #1) 82 is set as a block dedicated for the server B62, in other words, an area for storing title keys to decryption of contents to be provided from the server B62.

Under such settings, the server A61 to provide contents records the title keys required for decrypting the contents to be provided therefrom in the block #0 (protected area #0) 81.

In this case, a writing-permitted-area information item (PAD write) to be recorded in a server cert of the server A61 is configured as a cert in which writing permission with respect to the block #0 (protected area #0) 81 is set.

Note that, under the setting in the example shown in FIG. 6, reading is also permitted with respect to the block to which writing is permitted.

Further, the server B62 records the title keys required for decrypting contents to be provided therefrom in the block #1 (protected area #1) 82.

In this case, a writing-permitted-area information item (PAD write) to be recorded in a server cert of the server B62 is configured as a cert in which writing permission with respect to the block #1 (protected area #1) 82 is set.

Further, a host cert held by the host apparatus 63 as a reproducing apparatus configured to execute content reproduction by reading the title keys recorded in the blocks #0 and #1 is configured as a cert in which reading permission with respect to the blocks #0 and #1 is set.

In this example, writing permission with respect to both the blocks #0 and #1 is not set in the host cert.

Note that, at the time of deleting the contents, in order that title keys corresponding to the contents to be deleted also can be deleted, permission of a process of deleting both the blocks #0 and #1 may be set.

Further, in other processes, when it is necessary for the host apparatus 63 to write data to the protected area, writing permission may be set in the host cert.

A data processing unit in the memory card 70 receives access requests with respect to the protected area 80 from the access requesting apparatuses such as a server to provide contents or a host to use contents. Then, the data processing unit confirms information items for permitting access in block units with reference to apparatus certs of these apparatuses. In this way, the data processing unit judges whether or not access to the blocks is permitted.

The memory card 70 distinguishes types of data items of a writing request or a reading request in response to inputs of data writing or reading from the access requesting apparatus, and selects the blocks (#0, #1, #2, . . . ) as a data write destination or a data read source.

As described with reference to FIGS. 4 and 5, access control information items are recorded in the certs (server cert, host cert, and the like) of the access requesting apparatuses. The memory card first verifies the signatures of these certs received from the access requesting apparatuses so as to confirm validities of the certs. Then, the memory card reads the access control information items contained in the certs, in other words, the following information items.

Reading-permitted-area information item (PAD read)
Writing-permitted-area information item (PAD write)

Based on these information items, only processes permitted to be executed by the access requesting apparatuses are permitted and executed.

[5. Content Providing System Using Encrypted Content Signature (ECS) Issuer]

As described above with reference to FIG. 1, contents to be provided to user apparatuses are provided from a content providing apparatus. However, in some cases, the content providing apparatus itself provides illegally copied contents. Hereinafter, a configuration to prevent fraudulence to be performed with a configuration other than those of the user apparatuses, such as the fraudulent process by a server, is described.

Figure 7:
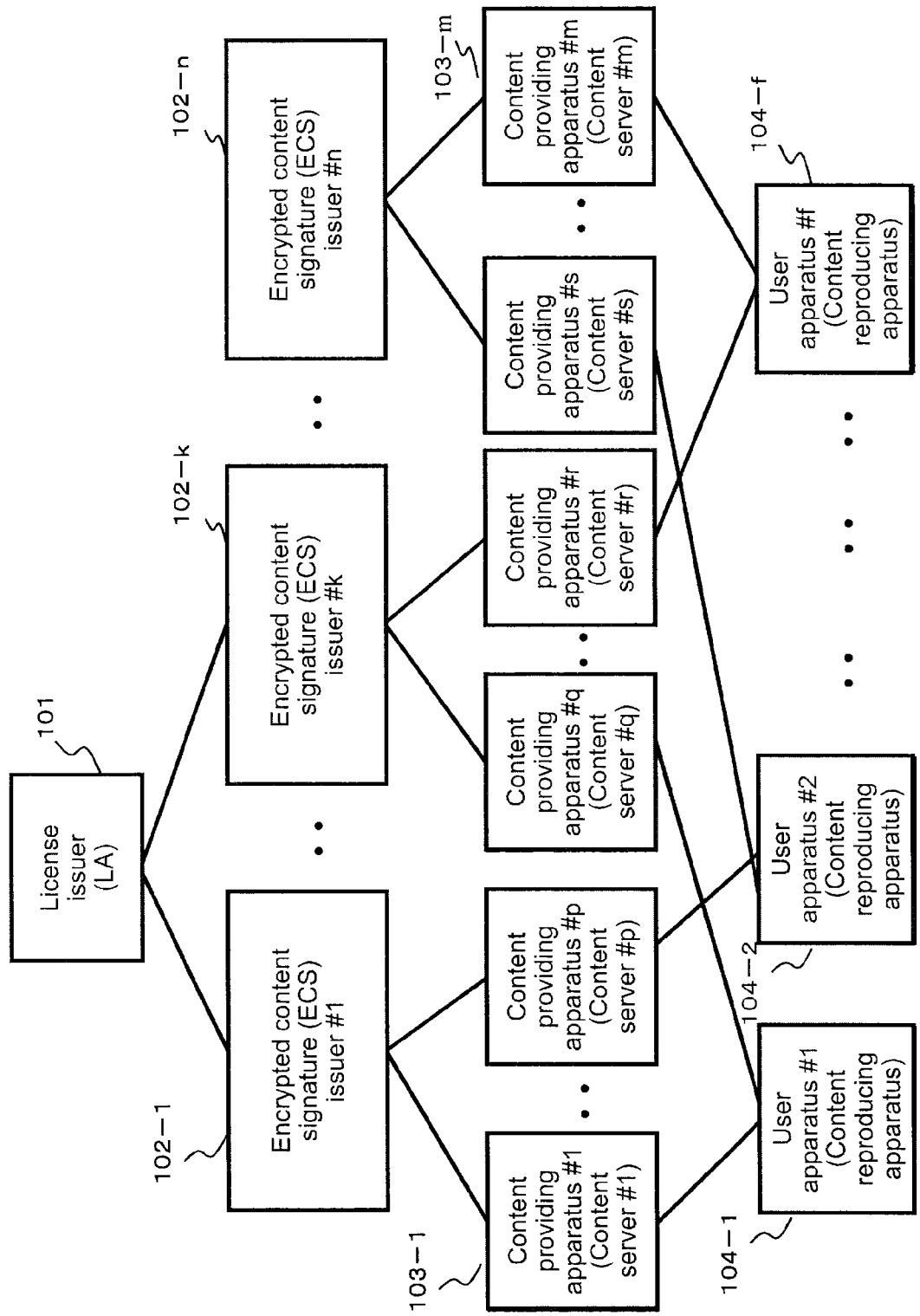
FIG. 7 is an explanatory diagram of an overall configuration of an information processing system of an embodiment of the present disclosure, which is configured to prevent fraudulent usage of contents.

With reference to FIG. 7, an overall configuration of an information processing system according to embodiments of the present disclosure, which is configured to prevent fraudulent usage of contents, is described.

FIG. 7 illustrates an example of the overall configuration of the information processing system. FIG. 7 shows a hierarchical structure formed of apparatuses of the following four types.

(A) License issuer (LA) 101
(B) Encrypted content signature (ECS) issuers 102-1 to 102-n
(C) Content providing apparatuses (content servers) 103-1 to 103-m
(D) User apparatuses (content reproducing apparatuses) 104-1 to 104-f The (C) content providing apparatuses (content servers) 103-1 to 103-m shown in FIG. 7 correspond to the broadcaster 11, the content server 12, and the like illustrated in FIG. 1.

Further, the (D) user apparatuses (content reproducing apparatuses) 104-1 to 104-f shown in FIG. 7 correspond to the user apparatuses such as the dedicated recording/reproducing apparatus 21, the PC 22, and the mobile terminal 23 shown in FIG. 1.

The (C) content providing apparatuses (content servers) 103-1 to 103-m include various information processing apparatuses such as an apparatus to send contents, more specifically, a content server and a broadcaster, and such as an apparatus to record contents in media, and further include a medium providing company who provides media such as disc storing contents. These apparatuses exist in large numbers.

The (D) user apparatuses (content reproducing apparatuses) 104-1 to 104-f are apparatuses configured to execute a reproducing process by receiving or reading, from the (C) content providing apparatuses (content servers) 103-1 to 103-m, contents such as a movie, a music piece, and other contents via the Internet, a broadcast wave, or a medium such as a disc. Specifically, the (D) user apparatuses (content reproducing apparatuses) 104-1 to 104-f include various information processing apparatuses capable of content reproduction, such as a PC, a mobile terminal, a DVD player, a BD player, and a television.

The (B) encrypted content signature (ECS) issuers 102-1 to 102-n create encrypted content signature files (ECS files) corresponding to the contents provided from the (C) content providing apparatuses (content servers) 103-1 to 103-m.

The (C) content providing apparatuses (content servers) 103-1 to 103-m issue requests for creation of such encrypted content signature files (ECS files) corresponding to contents to be newly provided to the user apparatuses 104, such as a movie content, with respect to the (B) encrypted content signature (ECS) issuers 102-1 to 102-n.

In response to these requests, the (B) encrypted content signature (ECS) issuers 102-1 to 102-n create and provide encrypted content signature files (ECS files) to the (C) content providing apparatuses (content servers) 103-1 to 103-m.

Note that, a specific configuration and a creation process of the encrypted content signature file (ECS file) are described in detail below.

The (C) content providing apparatuses (content servers) 103-1 to 103-m receive the encrypted content signature files (ECS files) from the (B) encrypted content signature (ECS) issuers 102-1 to 102-n, and provide the encrypted content signature files (ECS files) together with encrypted contents, to the (D) user apparatuses (content reproducing apparatuses) 104-1 to 104-f.

Prior to reproduction of the contents, the (D) user apparatuses (content reproducing apparatuses) 104-1 to 104-f each execute a signature verification process on the encrypted content signature file (ECS file). Only in a case where no tampering has been confirmed through the signature verification process, the contents are permitted to be decrypted and reproduced.

Note that, the (D) user apparatuses (content reproducing apparatuses) 104-1 to 104-f each stores a reproduction process program based on a sequence of executing decryption and reproduction of contents provided that no tampering has been confirmed through signature verification on the encrypted content signature file (ECS file). Based on the reproduction process program, a content reproduction possibility judgment process such as the signature verification on the encrypted content signature file (ECS file) and content reproduction are executed.

For example, in a case where some tampering has been confirmed through the signature verification on the encrypted content signature file (ECS file), reproduction of the contents is prohibited.

The (A) license issuer (LA) 101 provides licenses as licenses to issue the ECS files to the (B) encrypted content signature (ECS) issuers 102-1 to 102-n.

The (A) license issuer (LA) 101 issues licenses to the (B) encrypted content signature (ECS) issuers 102-1 to 102-n after confirming validities of these encrypted content signature (ECS) issuers through confirmation of whether or not these encrypted content signature (ECS) issuers are valid based on a preset license issuance sequence.

Note that, specifically, the licenses are public key certs each signed with a secret key from the license issuer (LA) 101. The public key certs store public keys for the (B) encrypted content signature (ECS) issuers 102-1 to 102-n. Note that, the (A) license issuer (LA) 101 also provides secret keys corresponding to the public keys stored in the public key certs to the (B) encrypted content signature (ECS) issuers 102-1 to 102-n.

Next, processes to be executed among the following three apparatuses are described with reference to FIG. 8.

(A) License issuer (LA) 101
(B) Encrypted content signature (ECS) issuer 102
(C) Content providing apparatus (content server) 103

Figure 8:
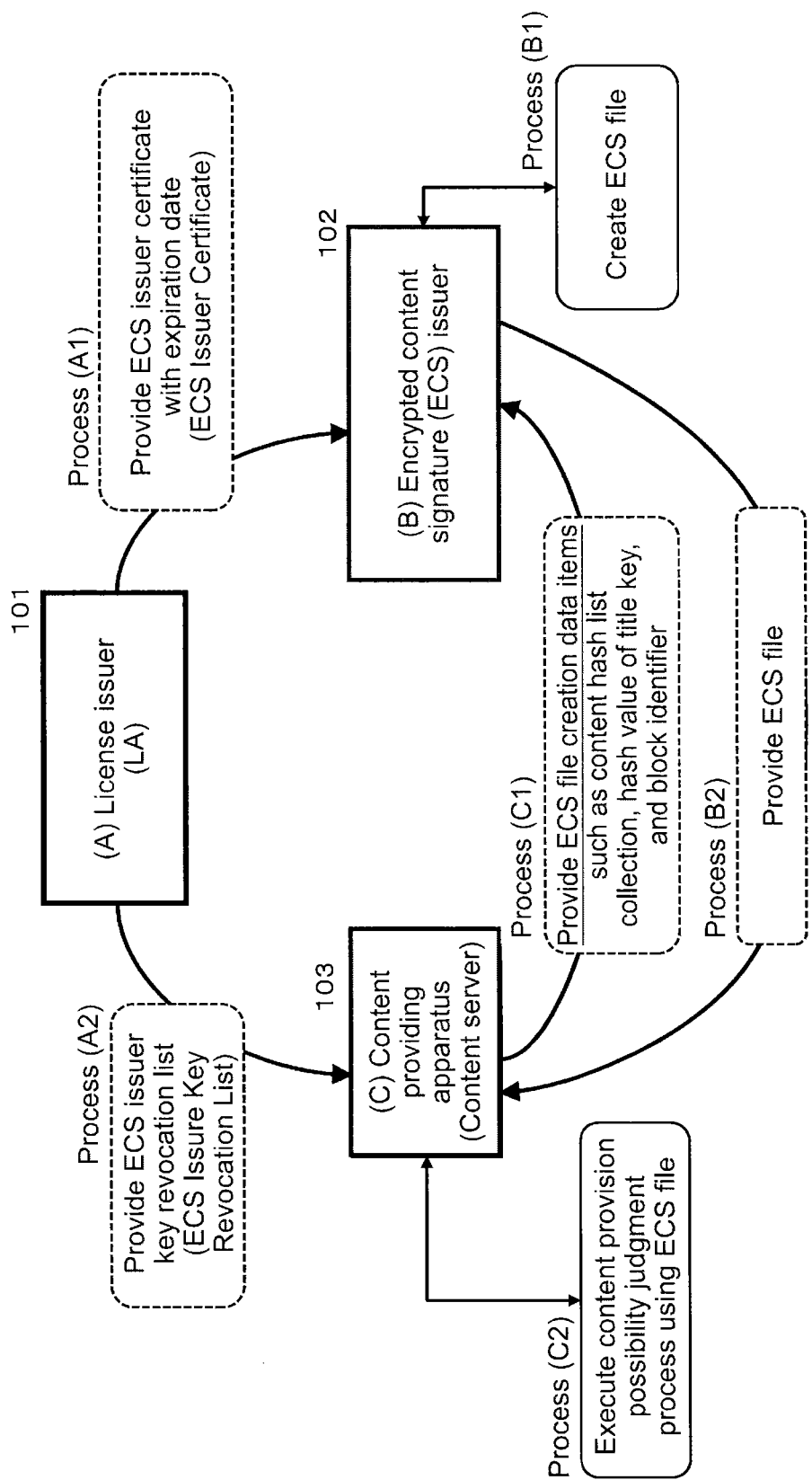
FIG. 8 is an explanatory diagram of exchange of data items applied to prevent fraudulent usage of the contents among apparatuses.

FIG. 8 shows the following three apparatuses and main processes to be executed in these apparatuses.

(A) License issuer (LA) 101
(B) Encrypted content signature (ECS) issuer 102
(C) Content providing apparatus (content server) 103

Processes to be executed by the license issuer (LA) 101 are indicated as processes (A1) and (A2).

Specifically, contents of the processes (A1) and (A2) to be executed by the license issuer (LA) 101 are as follows.

Process (A1): providing an ECS issuer cert with an expiration date to the encrypted content signature (ECS) issuer 102.

Process (A2): providing an ECS issuer key revocation list to the content providing apparatus 103.

Processes to be executed by the encrypted content signature (ECS) issuer 102 are indicated as processes (B1) and (B2).

Specifically, contents of the processes (B1) and (B2) to be executed by the encrypted content signature (ECS) issuer 102 are as follows.

Process (B1): creating an encrypted content signature file (ECS file).

Process (B2): providing the encrypted content signature file (ECS file) to the content providing apparatus 103.

Processes to be executed by the content providing apparatus 103 are indicated as processes (C1) and (C2).

Specifically, contents of the processes (C1) and (C2) to be executed by the content providing apparatus 103 are as follows.

Process (C1): providing ECS file creation data items to the encrypted content signature (ECS) issuer 102. For example, providing content hash list collections, a hash value of a title key, and a block identifier.

Process (C2): executing a content provision possibility judgment process using the ECS file.

[6. Configuration Example of ECS File]

Next, a configuration example of the ECS file created by the encrypted content signature (ECS) issuer 102 is described.

Figure 9:
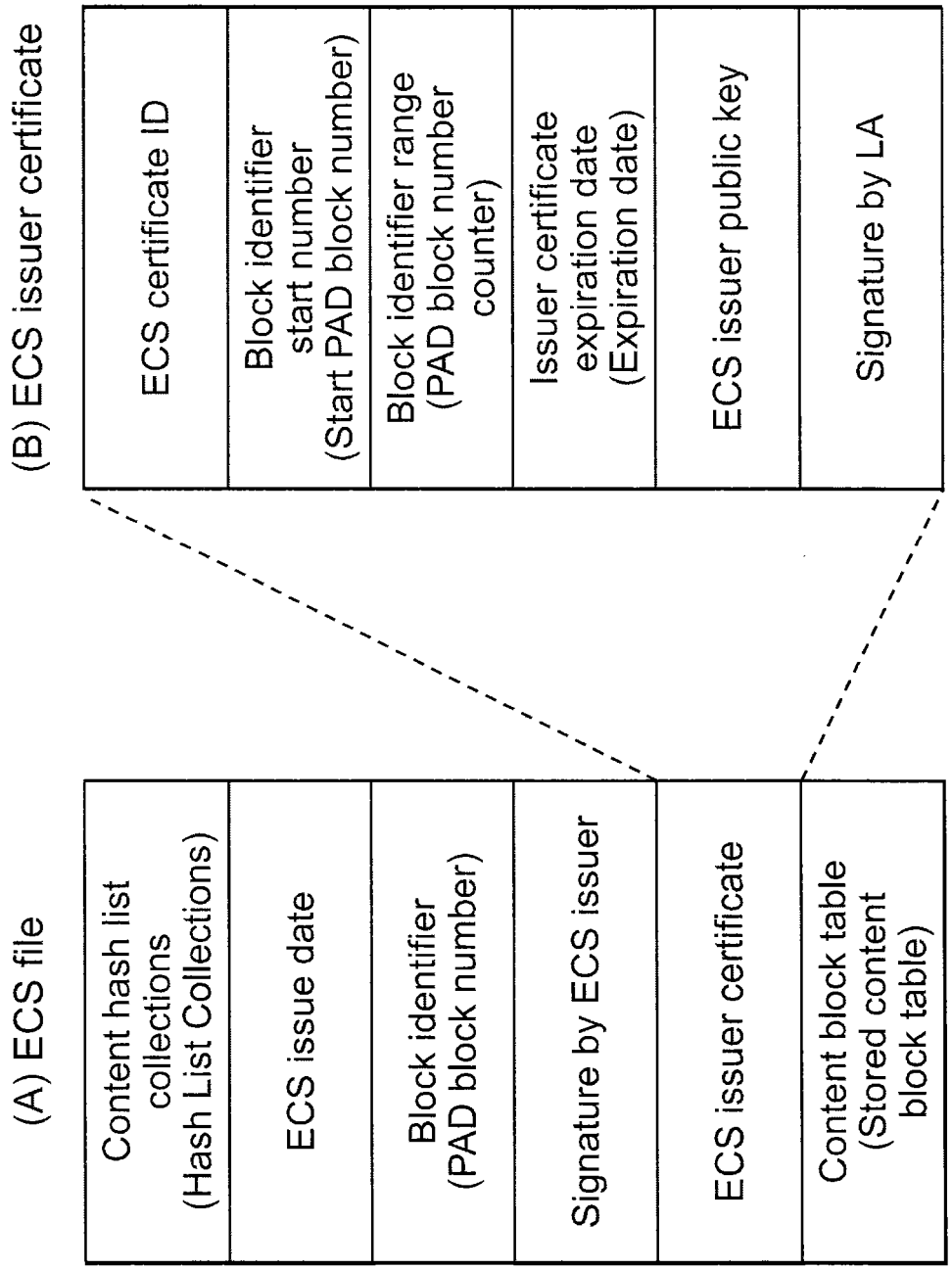
FIG. 9 is an explanatory diagram of a configuration example of an encrypted content signature file (ECS file)

FIG. 9 illustrates configuration examples of the ECS file and a data item of the ECS issuer cert set also as one constituent data item of the ECS file.

The ECS file is a file created by the encrypted content signature (ECS) issuer 102, and stores, as constituent data items, the content hash list collections, the hash value of a title key, the block identifier, and the like received from the content providing apparatus 103.

As shown in (A) of FIG. 9, the ECS file is a file containing the following data items.

(1) Content hash list collections (hash list collections)
(2) ECS issue date
(3) Block identifier (PAD block number)
(4) Signature by an ECS issuer
(5) ECS issuer cert
(6) Content block table (stored content block table)

The (1) content hash list collections (hash list collections) are data items created by the content providing apparatus (content server) 103 and received by the encrypted content signature (ECS) issuer 102. Specifically, the (1) content hash list collections (hash list collections) are data items containing hash values created based on constituent data items of contents to be provided to a user apparatus, specifically, contents to be reproduced by the user apparatus, such as a movie, and attribute information items of the hash values (information items of an offset, a length, and the like indicating, for example, a position of a content block as a source of the hash value).

The (2) ECS issue date is an information item of a date of creating the ECS file in the encrypted content signature (ECS) issuer 102.

This information item of a date corresponds, for example, to a creation date of the (4) signature by an ECS issuer.

The (3) block identifier (PAD block number) is a data item to be notified from the content providing apparatus (content server) 103 to the encrypted content signature (ECS) issuer 102, more specifically, an identifier indicating in which of blocks in a protected area in a medium a title key as an encryption key corresponding to a content provided from the content providing apparatus 103 to the user apparatus 104 is stored. In other words, the (3) block identifier (PAD block number) is an identifier indicating which of blocks in a protected area in a medium the content providing apparatus 103 can use.

As described above with reference, for example, to FIGS. 3 and 6, which of the blocks in the protected area in the medium the content providing apparatus 103 can use is set in advance, and an information item of such an access permitted block is recorded.

The (4) signature by an ECS issuer is an electronic signature by an ECS issuer.

Data items to be signed include constituent data items such as the content hash list collections, the ECS issue date, the block identifier, and the title key (hash value).

The (5) ECS issuer cert is a public key cert corresponding to the ECS issuer 102, and as shown in (B) of FIG. 9, stores a public key of the ECS issuer 102, and the like. This configuration is described in detail below.

The (6) content block table (stored content block table) is set as a field in which, when hash lists corresponding to a plurality of contents are recorded in the above-mentioned content hash list collections (hash list collections), corresponding information items between the hash lists and the plurality of contents are recorded.

Next, a data structure of the ECS issuer cert shown in (B) of FIG. 9 is described.

The ECS issuer cert is created by the license issuer (LA) 101 and provided to the ECS issuer 102. The ECS issuer 102 requests creation of the ECS issuer cert by providing data items required for creation of the ECS issuer cert to the license issuer (LA) 101.

The license issuer (LA) 101 creates the ECS issuer cert in response to this request.

As shown in (B) of FIG. 9, the ECS issuer cert is a file containing the following data items.

(1) ECS cert ID
(2) Block identifier start number (start PAD block number)
(3) Block identifier range (PAD block number counter)
(4) Issuer cert expiration date (expiration date)
(5) ECS issuer public key
(6) Signature by LA The (1) ECS cert ID is an identifier of the ECS cert.

The (2) block identifier start number (start PAD block number) is a start number of an access permitted block in a protected area in a medium, to which the content providing apparatus 103 permits the ECS issuer 102 to make access.

The (3) block identifier range (PAD block number counter) is an information item indicating a range from the start number of the access permitted block in the protected area in the medium, to which the content providing apparatus 103 permits the ECS issuer 102 to make access.

The (4) issuer cert expiration date (expiration date) is an information item of an expiration date of this issuer cert.

The (5) ECS issuer public key is a public key of the ECS issuer.

The (6) signature by LA is an electronic signature issued by the license issuer (LA) shown in FIGS. 7 and 8. Specifically, the (6) signature by LA is an electronic signature created based on the above-mentioned constituent data items (1) to (5) of the ECS issuer cert.

Figure 10:
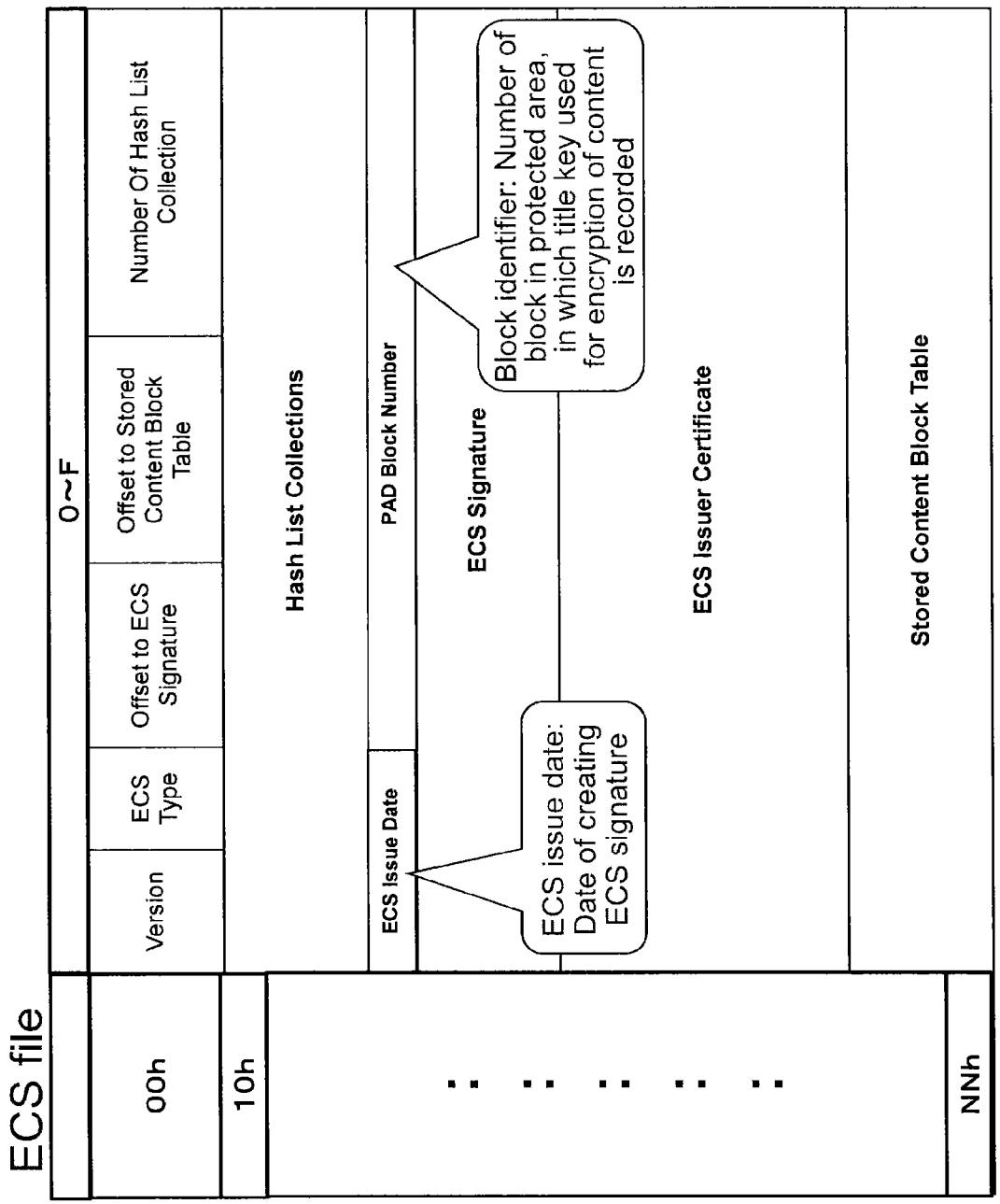
FIG. 10 is another explanatory diagram of the configuration example of the encrypted content signature file (ECS file)
Figure 11:
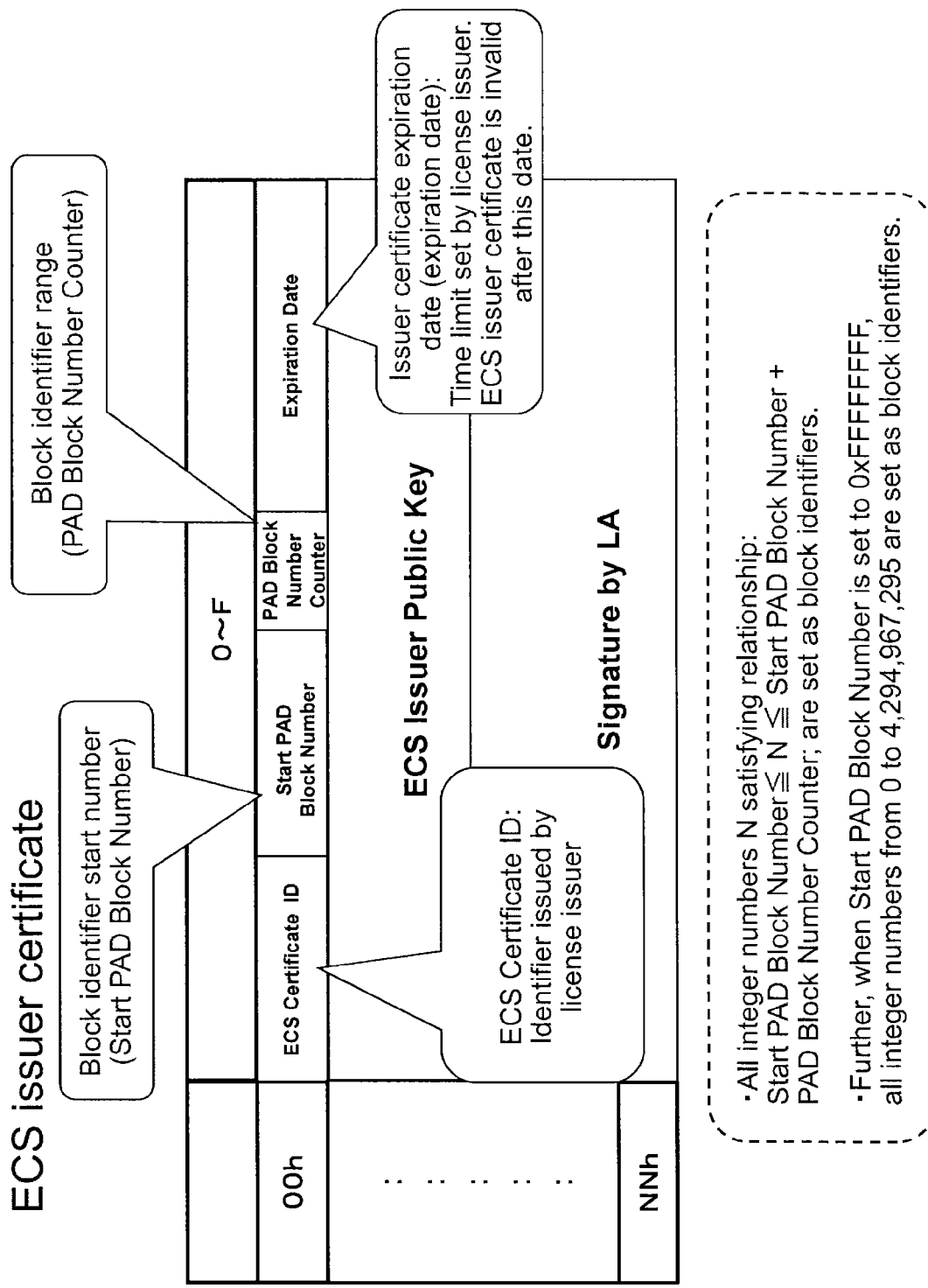
FIG. 11 is an explanatory diagram of a configuration example of an ECS issuer certificate contained in the encrypted content signature file (ECS file)

FIG. 10 shows syntax of the ECS file.
FIG. 11 shows syntax of the ECS issuer cert.
Note that, the following two data items:
the (2) block identifier start number (start PAD block number); and
the (3) block identifier range (PAD block number counter)
recorded in the ECS issuer cert are information items indicating, as described above, the access permitted block in the protected area in the medium, to which the content providing apparatus 103 permits the ECS issuer 102 to make access.

Specifically, when the relationship: the block identifier start number≤N≤ the block identifier start number+ the block identifier range; is set, all the integer numbers N satisfying this relationship are set as block identifiers.

Further, when the block identifier start number is set to 0xFFFFFFFF, all the blocks in the protected area in the medium are access permitted blocks.

Note that, although the ECS file contains the ECS issuer cert in the example illustrated with reference to FIGS. 9 to 11, the ECS file does not need to contain the ECS issuer cert, and the ECS file and the ECS issuer cert may be configured as individual files.

[7. Structure of ECS Issuer Key Revocation List]

Next, a structure of the ECS issuer key revocation list is described with reference to FIG. 12.

As described above with reference to FIG. 8, the ECS issuer key revocation list is a list issued by the license issuer (LA) 101. This list is used, for example, in the content providing apparatus 103.

The license issuer (LA) 101 invalidates an ECS issuer cert (refer to (B) of FIG. 9) storing a public key of an ECS issuer judged to be fraudulent, and then creates the ECS issuer key revocation list as a list registering an identifier (ID) of the invalidated ECS issuer (specifically, invalidated ECS issuer cert).

As shown in FIG. 12, the ECS issuer key revocation list stores the following data items.

(1) Version
(2) Number of entries
(3) ID of a revoked (invalidated) ECS issuer cert
(4) Revocation date of the revoked (invalidated) ECS issuer cert
(5) Electronic signature by the license issuer (LA) 101

The (5) electronic signature by the license issuer (LA) 101 is an electronic signature with respect to each of the data items (1) to (4).

Note that, when fraudulent ECS issuers are newly found, the ECS issuer key revocation list is updated as a new version by adding IDs of the fraudulent ECS issuers and sequentially issued to be provided to the content providing apparatus 103.

[8. Creation Process of Encrypted Content Signature File (ECS File)]

Next, a creation process of the encrypted content signature file (the ECS file) is described with reference to FIG. 13.

The encrypted content signature file (ECS file) is created based on the creation request from the content providing apparatus (content server) 103 by the encrypted content signature (ECS) issuer 102.

The content providing apparatus (content server) 103 issues a request for creation of such an encrypted content signature file (ECS file) corresponding to a content to be newly provided to the user apparatus 104, such as a movie content, with respect to the encrypted content signature (ECS) issuer 102.

In response to this request, the encrypted content signature (ECS) issuer 102 creates and provides an encrypted content signature file (ECS file) to the content providing apparatus (content server) 103.

Figure 13:
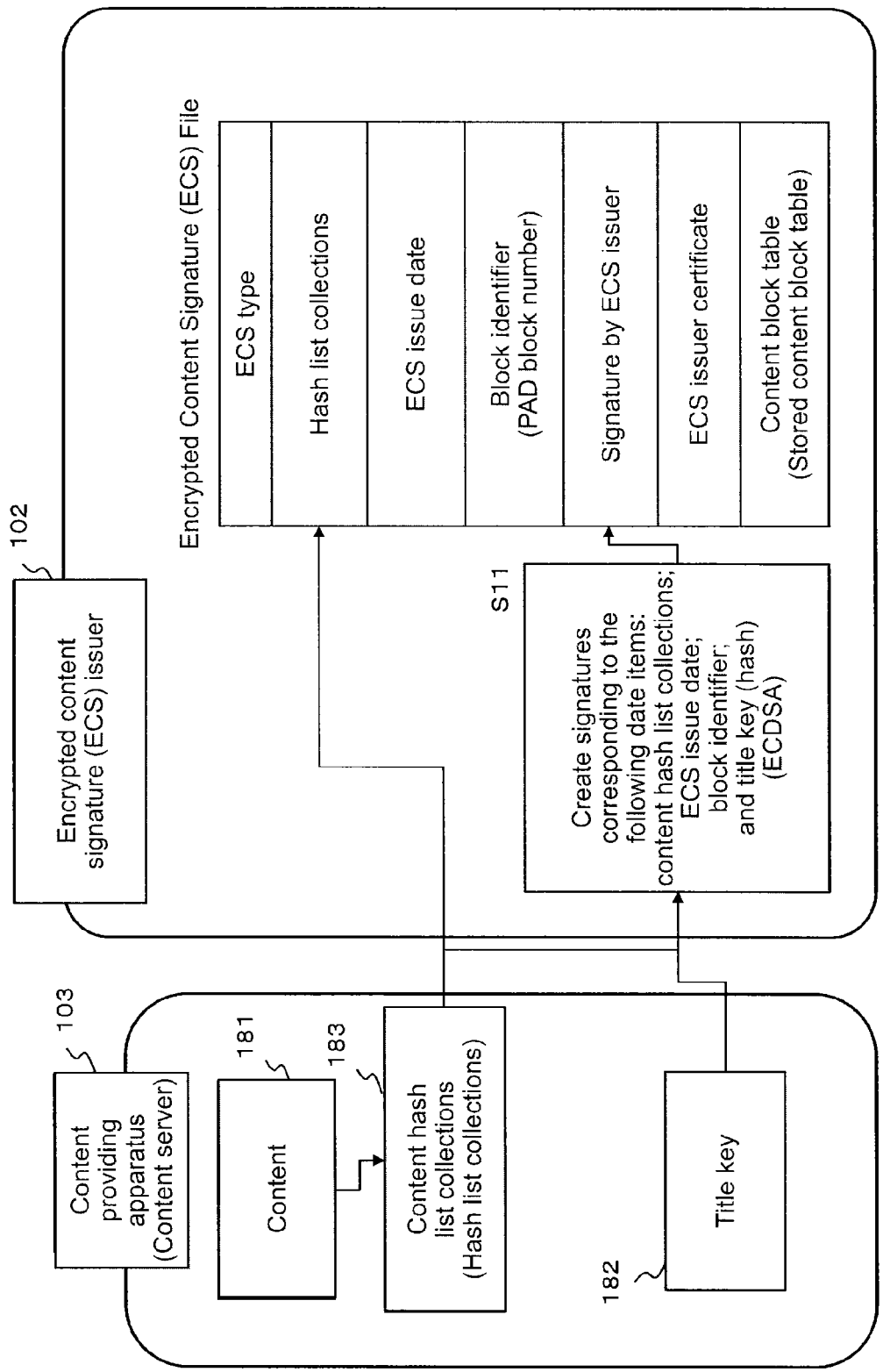
FIG. 13 is an explanatory diagram of an overview of a creation process and a data structure of the encrypted content signature file (ECS file)

FIG. 13 is an explanatory diagram of processes to be executed by the content providing apparatus (content server) 103 and the encrypted content signature (ECS) issuer 102 during the creation process of this encrypted content signature (ECS).

At the time of issuing a request for creation of a new encrypted content signature file (ECS file), as shown in FIG. 13, the content providing apparatus (content server) 103 creates content hash list collections (hash list collections) 183 containing hash values created based on constituent data items (content blocks) of a content 181.

Note that, the content hash list collections (hash list collections) 183 are created as content hash list collections storing hash values created based on constituent data items (content blocks) of an encrypted content to be provided to the user apparatus 104.

The content providing apparatus (content server) 103 provides the content hash list collections (hash list collections) 183 thus created to the encrypted content signature (ECS) issuer 102.

Further, a title key 182 as an encryption key to be applied to encryption of the content 181, or a hash value of the title key is also provided to the encrypted content signature (ECS) issuer 102.

The content hash list collections (hash list collections) 183 are data items containing hash values created based on constituent data items of contents to be provided to a user apparatus, specifically, contents to be reproduced by the user apparatus, such as a movie, and attribute information items of the hash values.

Note that, the attribute information items include, for example, attribute information items such as position information of a content block whose hash value has been calculated.

In Step S11 shown in FIG. 13, the encrypted content signature (ECS) issuer 102 creates signatures corresponding to data items received from the content providing apparatus (content server) 103 and the constituent data items of the ECS file, specifically, signatures corresponding to the following data items.

Content hash list collections
ECS issue date
Block identifier
Title key (hash)

At the time of creation of data items of these signatures, a secret key held by the encrypted content signature (ECS) issuer 102 is applied. For example, the signatures are created based on an ECDSA algorithm.

As shown in FIG. 13, the signatures thus created are set as constituent data items of the encrypted content signature file (ECS file).

As described above with reference to (A) of FIG. 9, an encrypted content signature file (ECS file) 200 created by the encrypted content signature (ECS) issuer 102 contains the following data items as constituent data items.

(1) Content hash list collections (hash list collections)
(2) ECS issue date
(3) Block identifier (PAD block number)
(4) Signature by an ECS issuer
(5) ECS issuer cert
(6) Content block table (stored content block table)

[9. Processes Applying Date Information Items of ECS File and ECS Issuer Certificate]

Next, processes applying the date information items of the ECS file and the ECS issuer cert are described.

As described with reference to FIG. 9, various date information items are recorded in the following.

(1) ECS file created by the ECS issuer 102 and provided to a content providing apparatus
(2) ECS issuer cert created by the license issuer (LA) 101 and provided to the ECS issuer 102

For example, an ECS issue date is recorded in the ECS file.

Further, an issuer cert expiration date (expiration date) is recorded in the ECS issuer cert.

The content providing apparatus 103 executes the process of judging possibility of a content providing process with respect to the user apparatus 104 by applying the date information items recorded in these ECS file and ECS issuer cert, and the ECS issuer key revocation list described above with reference to FIG. 12.

Meanwhile, the user apparatus 104, which receives a content from the content providing apparatus 103, executes the process of judging possibility of a content reproduction process in the user apparatus 104 by applying the date information items recorded in the ECS file and the ECS issuer cert and the ECS issuer key revocation list described above with reference to FIG. 12.

Hereinafter, these processes are described.

First, creation of the encrypted content signature file (ECS file), content provision, and a usage processing sequence are described with reference to sequence diagrams of FIGS. 14 and 15.

Figure 14:
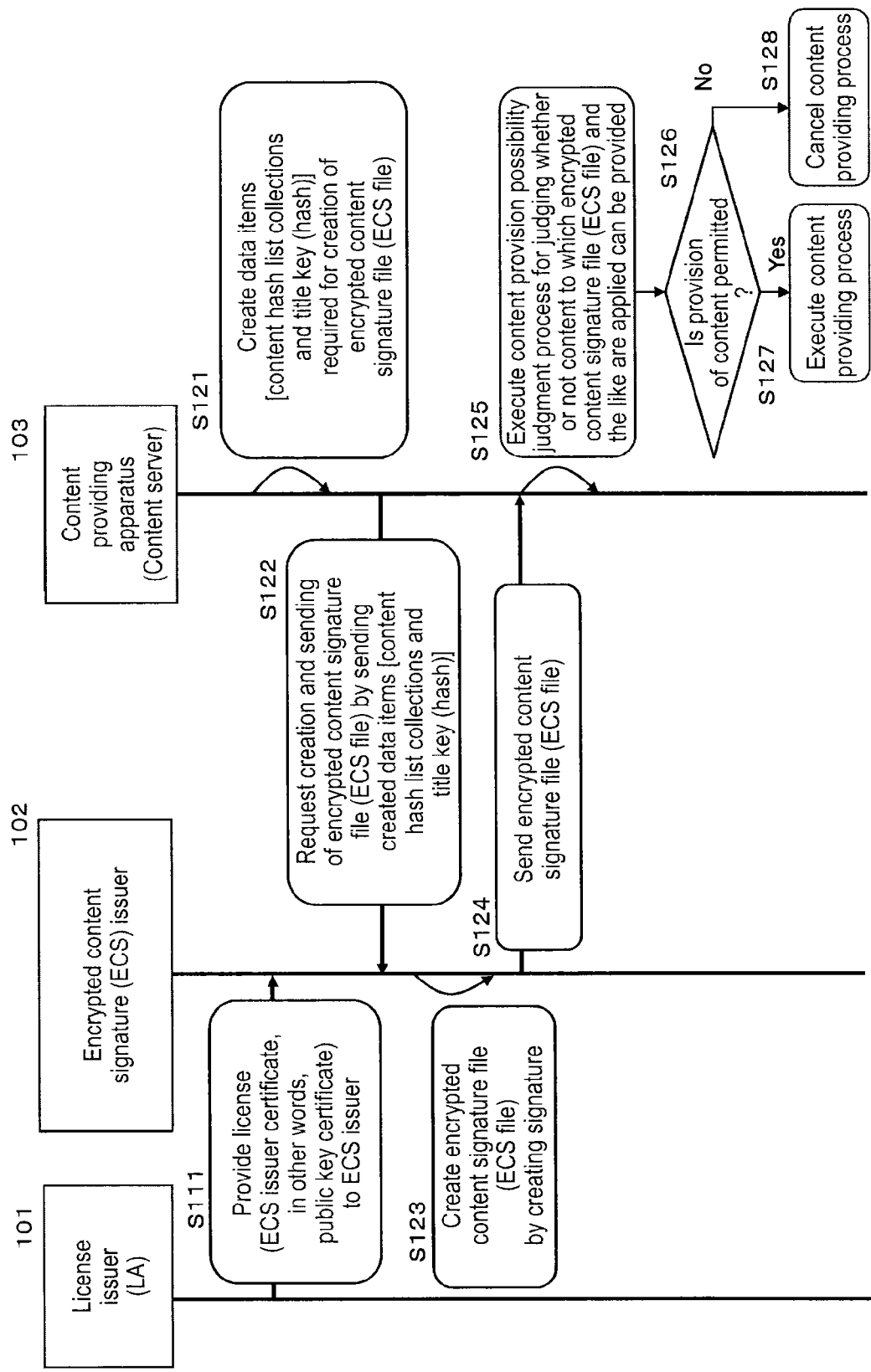
FIG. 14 is an explanatory sequence diagram of creation of the encrypted content signature file (ECS file), content provision, and a usage processing sequence.

FIG. 14 shows the following apparatuses from the left-hand side thereof.

License issuer 101

Encrypted content signature (ECS) issuer 102

Content providing apparatus 103

Processes of Steps S111 and S121 to S128 are shown as time-series processes.

The processes of these Steps are described.

Step S111

In Step S111, the license issuer 101 issues a license (ECS issuer cert) to the encrypted content signature (ECS) issuer 102.

As described above with reference, for example, to FIG. 8, the license issuer 101 provides a license as a license to issue an ECS file, in other words, an ECS issuer cert with respect to the encrypted content signature (ECS) issuer 102.

The license issuer (LA) 101 issues the ECS issuer cert to the encrypted content signature (ECS) issuer 102 after confirming a validity of the encrypted content signature (ECS) issuer 102 through confirmation of whether or not the encrypted content signature (ECS) issuer 102 is valid based on a preset license issuance sequence.

The ECS issuer cert is a public key cert having the data structure described with reference to (B) of FIG. 9. The ECS issuer cert stores a public key to the encrypted content signature (ECS) issuer 102. Note that, the license issuer (LA) 101 also provides a secret key corresponding to the public key stored in this ECS issuer cert to the encrypted content signature (ECS) issuer 102.

Steps S121 to S124 correspond to a sequence of the creation process of the encrypted content signature file (ECS file) described with reference to FIG. 13.

This process is sequentially executed with respect to each content to be newly provided by the content providing apparatus 103 to a user apparatus so as to acquire an encrypted content signature file (ECS file) corresponding to each of the contents to be newly provided.

This process is executed between the encrypted content signature (ECS) issuer 102 and the content providing apparatus 103.

First, in Step S121, the content providing apparatus 103 creates data items required for creation of the encrypted content signature file (ECS file).

Specifically, as described with reference to FIG. 13, the creation process of the content hash list collections (hash list collections) 183 and the like are executed.

As described above, the content hash list collections (hash list collections) are data items containing hash values created based on constituent data items of contents to be provided to a user apparatus, specifically, contents to be reproduced by the user apparatus, such as a movie, and attribute information items of the hash values.

Note that, the attribute information items include, for example, attribute information items such as position information of a content block whose hash value has been calculated.

Note that, the content providing apparatus 103 creates, as data items to be provided to the encrypted content signature (ECS) issuer 102, a title key to be applied to an encryption process and a decryption process of a content, and a hash value of the title key.

Next, in Step S122, the content providing apparatus 103 requests creation and sending of the encrypted content signature file (ECS file) by sending the created data items to the encrypted content signature (ECS) issuer 102.

Next, in Step S123, the encrypted content signature (ECS) issuer 102 executes a signature creation process with respect to the data items received from the content providing apparatus 103.

In other words, the encrypted content signature (ECS) issuer 102 executes the signature creation process of Step S11 described with reference to FIG. 13.

Further, the encrypted content signature (ECS) issuer 102 creates the encrypted content signature file (ECS file) having the data structure described above with reference to (A) of FIG. 9, and in Step S124, sends the encrypted content signature file (ECS file) thus created to the content providing apparatus 103.

As described above with reference to (A) of FIG. 9, the encrypted content signature file (ECS file) contains the following data items.

(1) Content hash list collections (hash list collections)

(2) ECS issue date (3) Block identifier (PAD block number)

(4) Signature by an ECS issuer (5) ECS issuer cert (6) Content block table (stored content block table)

After receiving the encrypted content signature file (ECS file), the content providing apparatus 103 executes, in Step S125, the content provision possibility judgment process of judging whether or not provision of a content to which the encrypted content signature file (ECS file) is applied is permitted.

In Step S126, in a case where it has been judged that provision of the content is permitted, a content providing process with respect to a user apparatus is executed in Step S127.

Meanwhile, in Step S126, in a case where it has been judged that provision of the content is not permitted, the flow proceeds to Step S128 to cancel the content providing process.

Note that, the processes of Steps S125 to S128 are described in more detail below with reference to FIG. 16 and subsequent drawings.

Next, provision of the content from the content providing apparatus 103 to the user apparatus 104 and a content reproduction sequence in the user apparatus 104 are described with reference to FIG. 15.

Figure 15:
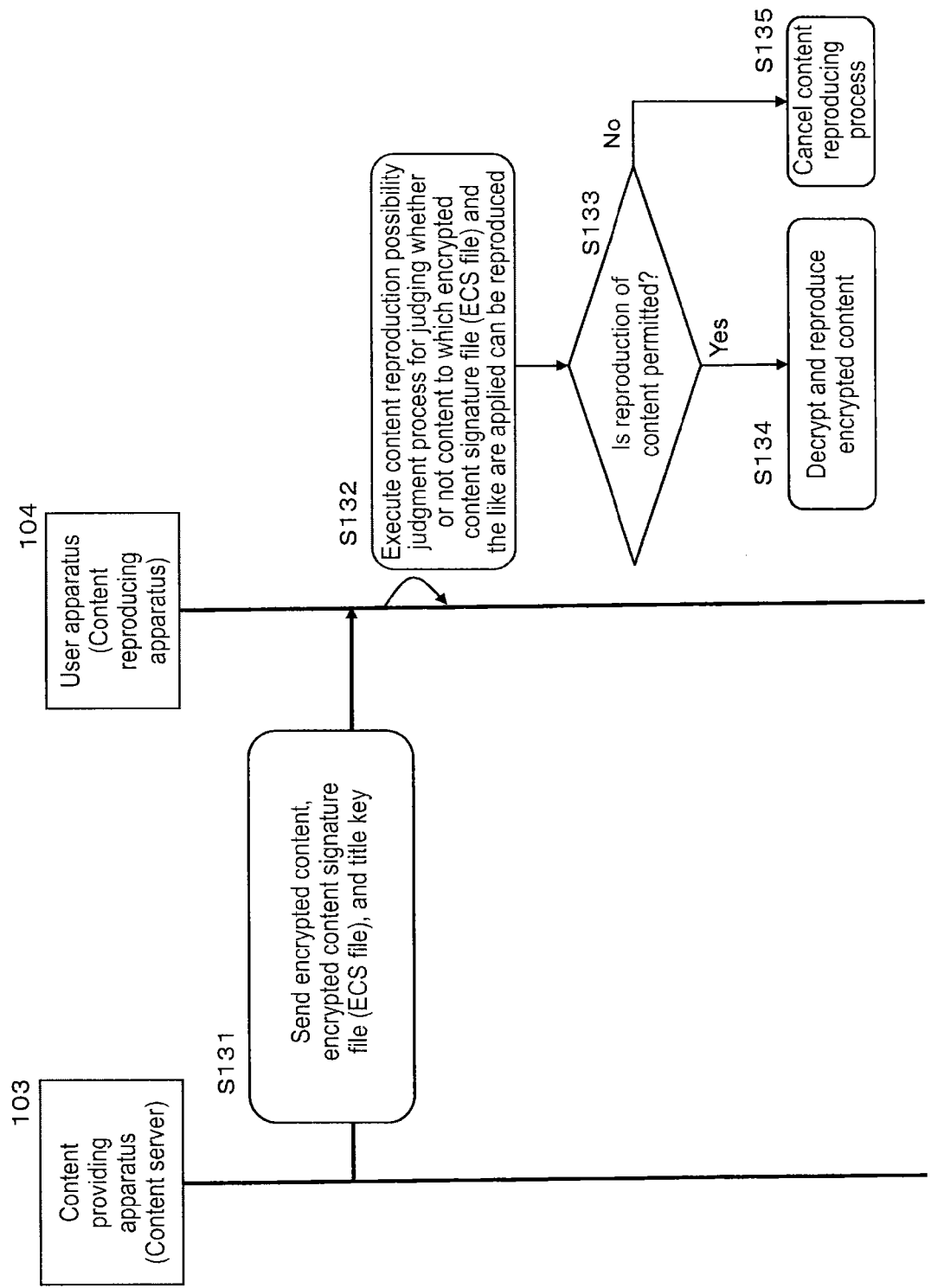
FIG. 15 is another explanatory sequence diagram of creation of the encrypted content signature file (ECS file), the content provision, and the usage processing sequence.

FIG. 15 shows the following from the left-hand side thereof.

Content providing apparatus 103
User apparatus 104

First, in Step S131, the content providing apparatus 103 sends the following data items to the user apparatus 104.
(1) Encrypted content
(2) Encrypted content signature file (ECS file)
(3) Title key Note that, as a pre-process of a process of Step S131, for example, a request for sending the content to the user apparatus 104 has been issued from the user apparatus 104 to the content providing apparatus 103. The content providing apparatus 103 provides a content in accordance with a request from the user apparatus 104.

Note that,
the (1) encrypted content
to be sent from the content providing apparatus 103 in Step S131 is a content encrypted with the above-mentioned "(3) title key" set correspondingly to the content.

Further,
the (2) encrypted content signature file (ECS file) is a file created correspondingly to the above-mentioned (1) encrypted content, and stores the constituent data items of the encrypted content signature file (ECS file), which are described above with reference to FIG. 9

The user apparatus 104 receives and stores these data items into a medium such as a hard disc.

After that, at the time of executing a process of reproducing the content, processes of Step S132 and subsequent Steps shown in FIG. 15 are executed.

In Step S132, the user apparatus 104 reads the encrypted content signature file (ECS file) corresponding to the content to be reproduced, and applies the encrypted content signature file (ECS file) so as to execute the content reproduction possibility judgment process of judging whether or not reproduction of the content is permitted.

In Step S133, in a case where it has been judged that reproduction of the content is permitted, a content reproduction process is executed in Step S134.

Meanwhile, in Step S133, in a case where it has been judged that reproduction of the content is not permitted, the flow proceeds to Step S135 to cancel the content reproduction process.

Note that, the processes of Steps S132 to S135 are described in more detail below with reference to FIG. 18.

Next, subroutines of Steps S125|S128 in the content providing apparatus, which are described with reference to FIG. 14, in other words, detailed sequences of the content provision possibility judgment process applying the encrypted content signature file (ECS file) are described with reference to the flowcharts shown in FIGS. 16 and 17.

Figure 16:
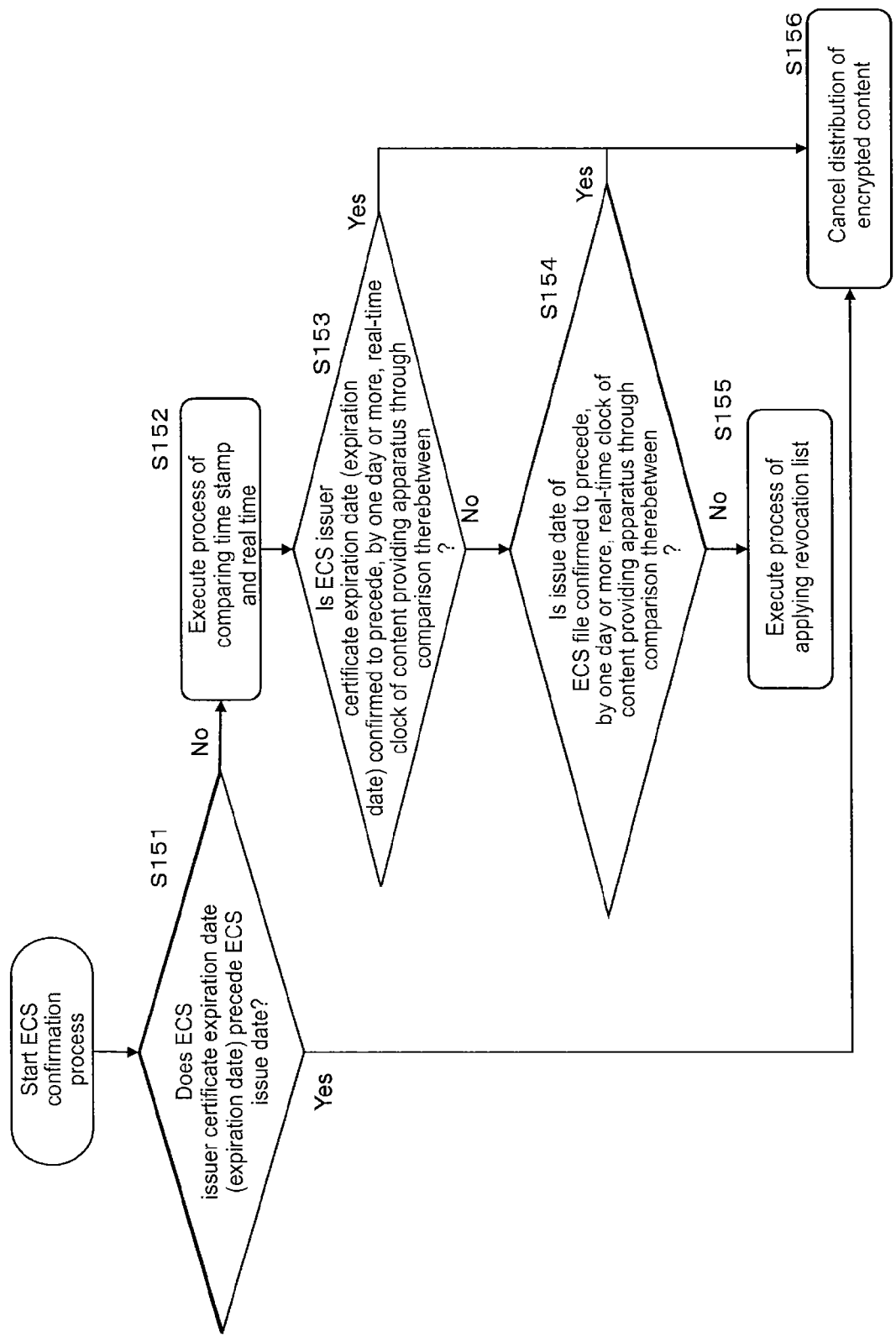
FIG. 16 is an explanatory flowchart showing a sequence of a content provision possibility judgment process with reference to date data recorded in the encrypted content signature file (ECS file)
Figure 17:
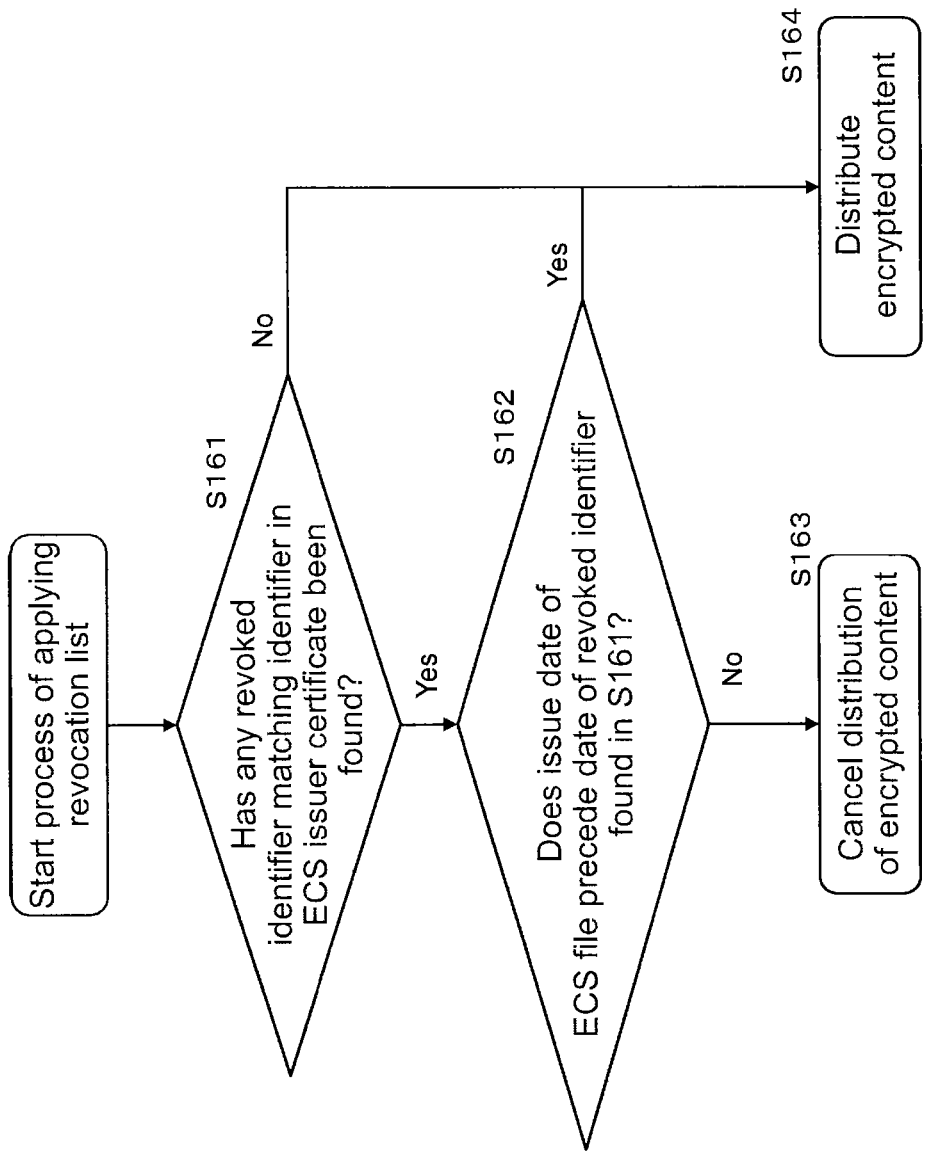
FIG. 17 is an explanatory flowchart showing another sequence of the content provision possibility judgment process with reference to date data recorded in the encrypted content signature file (ECS file)

As a pre-process of Step S151 in the flowchart shown in FIG. 16, the content providing apparatus executes signature verification applying a signature by an ECS issuer, which is set in the encrypted content signature file (ECS file) received from the encrypted content signature (ECS) issuer.

In a case where no tampering has been confirmed through this signature verification, in other words, validity of the encrypted content signature file (ECS file) has been confirmed, another signature verification of an ECS issuer cert stored in the encrypted content signature file (ECS file) is executed. The processes of Step S151 and subsequent Steps are executed provided that no tampering has been confirmed in either of the two signature verification processes.

In a case where some tampering has been confirmed in at least one of the two signature verification processes, validity of the encrypted content signature file (ECS file) or validity of the ECS issuer cert is not confirmed. Thus, the processes of Step S151 and subsequent Steps are not executed. In this case, the content providing process is not executed as well.

In the case where no tampering has been confirmed through either of the two signature verification processes of the encrypted content signature file (ECS file) and the ECS issuer cert, in other words, validities of the encrypted content signature file (ECS file) and the ECS issuer cert have been confirmed, the content providing apparatus executes the process of Step S151.

The content providing apparatus reads the ECS issue date which is a data item recorded in the encrypted content signature file (ECS file), and then reads the ECS issuer cert expiration date (expiration date) which is a data item recorded in the ECS issuer cert.

Further, through comparison of these date information items, the content providing apparatus judges whether or not the ECS issuer cert expiration date (expiration date) precedes the ECS issue date.

In a case where it has been judged that the ECS issuer cert expiration date (expiration date) precedes the ECS issue date (Yes), the flow proceeds to Step S156 to cancel distribution of the encrypted content.

Meanwhile, in a case where it has been judged that the ECS issuer cert expiration date (expiration date) does not precede the ECS issue date (No), the flow proceeds to Step S152 to start, in Step S153 and subsequent Steps, the content provision possibility judgment process applying the date information items (time stamps) recorded in the encrypted content signature file (ECS file) and the ECS issuer cert.

In Step S153, the ECS issuer cert expiration date (expiration date) is compared with a time clock of the content providing apparatus or real time acquired from a reliable time information providing server.

In a case where it has been judged that the ECS issuer cert expiration date (expiration date) precedes, by one day or more, the real time, the flow proceeds to Step S156 to cancel the content providing process.

Meanwhile, in a case where it has been judged that the ECS issuer cert expiration date (expiration date) does not precede, by one day or more, the real time, the flow proceeds to Step S154.

In Step S154, the ECS issue date is compared with the time clock of the content providing apparatus or the real time acquired from the reliable time information providing server.

In a case where it has been judged that the ECS issue date precedes, by one day or more, the real time, the flow proceeds to Step S156 to cancel the content providing process.

Meanwhile, in a case where it has been judged that the ECS issue date does not precede, by one day or more, the real time, the flow proceeds to Step S155.

Next, the content provision possibility judgment process applying the revocation list, which is to be executed in Step S155 and subsequent Steps, is described with reference to the flowchart shown in FIG. 17.

Note that, the content providing apparatus has acquired in advance the ECS issuer key revocation list described with reference to FIG. 12. The ECS issuer key revocation list can be acquired, for example, from the license issuer (LA) 101.

In Step S161, the content providing apparatus acquires the ECS cert ID from the ECS issuer cert, and judges whether or not this ID has been registered in the ECS issuer key revocation list.

In a case where this ID has not been registered in the ECS issuer key revocation list (No), it is confirmed that the ECS issuer cert has been valid without being invalidated (revoked). In this case, the flow proceeds to Step S164 to execute the content providing process.

Meanwhile, in Step S161, in a case where it has been judged that the ECS cert ID is registered in the ECS issuer key revocation list (Yes), the flow proceeds to Step S162.

In Step S162, the following two date data items are compared with each other.

Date when the ECS issuer cert registered in the ECS issuer key revocation list is invalidated (revoked), in other words, a revocation date ECS issue date as a data item recorded in the encrypted content signature file (ECS file)

In a case where it has been judged that the ECS issue date as a data item recorded in the encrypted content signature file (ECS file) precedes the revocation date (Yes), the flow proceeds to Step S164 to execute the content providing process.

This is because the content providing process can be judged as a process based on an unrevoked valid ECS issuer cert.

Meanwhile, in Step S162, in a case where it has been judged that the ECS issue date as a data item recorded in the encrypted content signature file (ECS file) does not precede the revocation date (No), the flow proceeds to Step S163 to cancel the content providing process.

This is because the content providing process can be judged as a process based on a revoked invalid ECS issuer cert.

Next, the content reproduction possibility judgment process applying the encrypted content signature file (ECS file) in the user apparatus 104, which is described above with reference to Steps S132 to S135 of FIG. 14, is described in detail with reference to the flowchart shown in FIG. 18.

Figure 18:
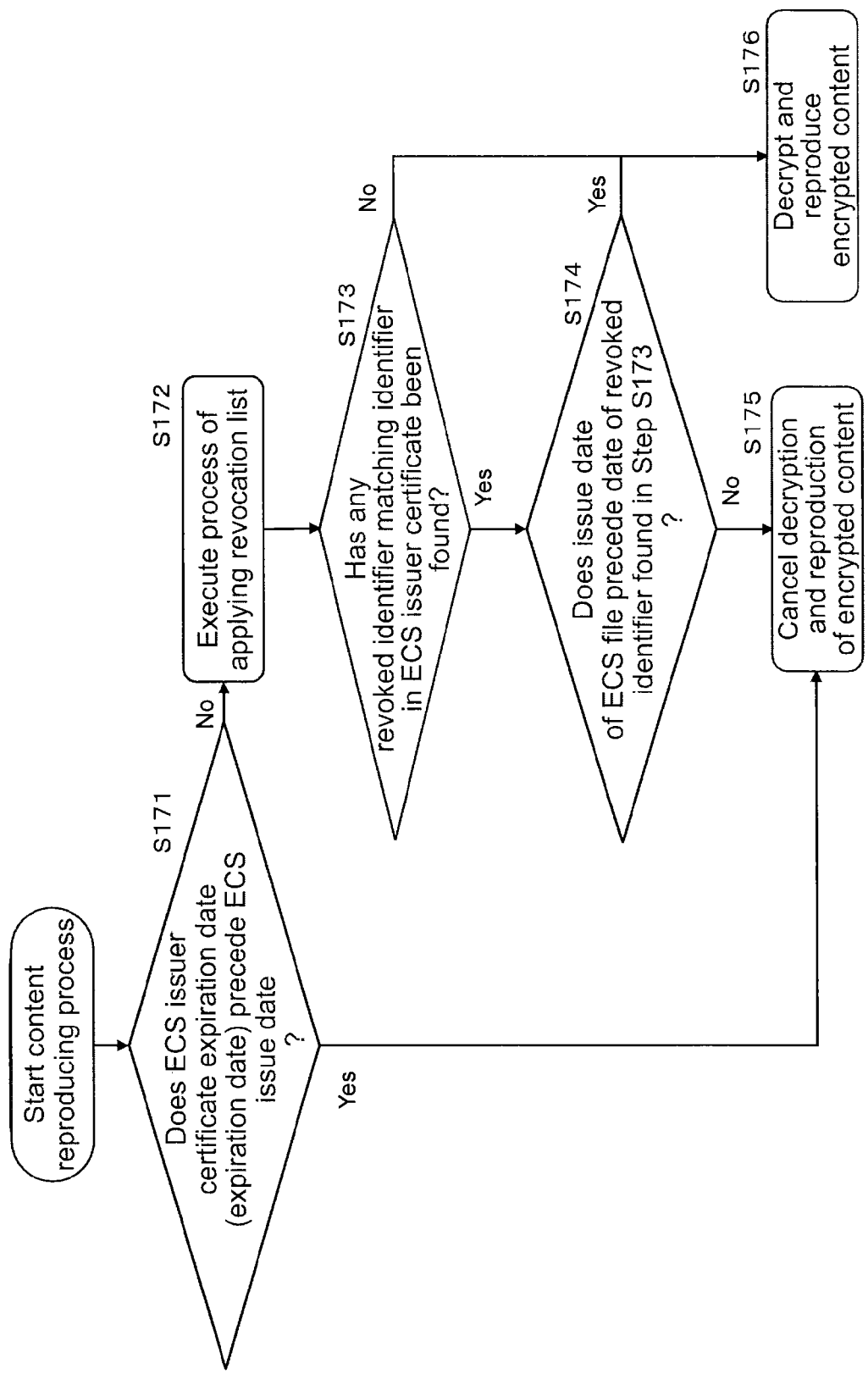
FIG. 18 is an explanatory flowchart showing a sequence of a content reproduction possibility judgment process with reference to date data recorded in the encrypted content signature file (ECS file)

Note that, prior to Step S171 shown in FIG. 18, the user apparatus executes the signature verification applying the signature by an ECS issuer, which is set in the encrypted content signature file (ECS file) received from the content providing apparatus.

In a case where no tampering has been confirmed through this signature verification, in other words, validity of the encrypted content signature file (ECS file) has been confirmed, another signature verification of the ECS issuer cert stored in the encrypted content signature file (ECS file) is executed. The processes of Step S171 and subsequent Steps are executed provided that no tampering has been confirmed in either of the two signature verification processes.

In a case where some tampering has been confirmed in at least one of the two signature verification processes, validity of the encrypted content signature file (ECS file) or validity of the ECS issuer cert is not confirmed. Thus, the processes of Step S171 and subsequent Steps are not executed. In this case, the content reproduction process is not executed as well.

In the case where no tampering has been confirmed through either of the two signature verification processes of the encrypted content signature file (ECS file) and the ECS issuer cert, in other words, validities of the encrypted content signature file (ECS file) and the ECS issuer cert have been confirmed, the user apparatus executes the process of Step S171.

In Step S171, the user apparatus reads the ECS issue date which is a data item recorded in the encrypted content signature file (ECS file), and then reads the ECS issuer cert expiration date (expiration date) which is a data item recorded in the ECS issuer cert.

Further, through comparison of these date information items, the user apparatus judges whether or not the ECS issuer cert expiration date (expiration date) precedes the ECS issue date.

In a case where it has been judged that the ECS issuer cert expiration date (expiration date) precedes the ECS issue date (Yes), the flow proceeds to Step S175 to cancel a decryption process and a reproducing process of the content.

This is because it has been confirmed that the ECS issuer cert is already expired.

Meanwhile, in Step S171, in a case where it has been judged that the ECS issuer cert expiration date (expiration date) does not precede the ECS issue date (No), the flow proceeds to Step S172 to execute the content provision possibility judgment process applying the revocation list in Step S173 and subsequent Steps.

Note that, the user apparatus has acquired in advance the ECS issuer key revocation list described with reference to FIG. 12. The ECS issuer key revocation list can be acquired, for example, from the license issuer (LA) 101.

In Step S173, the user apparatus acquires the ECS cert ID from the ECS issuer cert, and judges whether or not this ID has been registered in the ECS issuer key revocation list.

In a case where this ID has not been registered in the ECS issuer key revocation list (No), it is confirmed that the ECS issuer cert has been valid without being invalidated (revoked). In this case, the flow proceeds to Step S176 to execute the content reproduction process.

Note that, before starting the content reproduction process, not only processes of acquiring and creating the title key to be applied to decryption of the encrypted content, but also a hash value verification process applying the content hash list collections contained in the encrypted content signature file are executed. In a case where no tampering has been confirmed in the content through the hash value verification, reproduction of the content is permitted.

Meanwhile, in Step S173, in a case where it has been judged that the ECS cert ID is registered in the ECS issuer key revocation list (Yes), the flow proceeds to Step S174.

In Step S174, the following two date data items are compared with each other.

Date when the ECS issuer cert registered in the ECS issuer key revocation list is invalidated (revoked), in other words, a revocation date ECS issue date as a data item recorded in the encrypted content signature file (ECS file)

In a case where it has been judged that the ECS issue date as a data item recorded in the encrypted content signature file (ECS file) precedes the revocation date (Yes), the flow proceeds to Step S176 to execute the content reproduction process.

This is because the content reproduction process can be judged as a process based on an unrevoked valid ECS issuer cert.

Meanwhile, in Step S173, in a case where it has been judged that the ECS issue date as a data item recorded in the encrypted content signature file (ECS file) does not precede the revocation date (No), the flow proceeds to Step S175 to cancel the content reproduction process.

This is because the content reproduction process can be judged as a process based on a revoked invalid ECS issuer cert.

[10. Configuration of Relating Encryption Key and Signature by ECS Issuer]

Next, a configuration of relating an encryption key and a signature by an ECS issuer to each other is described.

As describe above with reference to FIGS. 3 and 6, in the user apparatus 104, a content and the like are used while being recorded, for example, in a memory card and the like formed of a flash memory or the like.

As described above with reference to FIG. 3, the storage area in the memory card 31 is formed of the following two areas.

(a) Protected area 51

(b) General purpose area 52

The (b) general purpose area 52 is a freely accessible area from the recording/reproducing apparatus used by the user, and records contents, usage control information items (usage rules) corresponding to the contents, other general content management data items, and the like.

In the general purpose area 52, data can be freely written and read, for example, by the server or the recording/reproducing apparatus of the user.

Meanwhile, the (a) protected area 51 is an area to which free access is not permitted.

The protected area 51 is divided into blocks (#0, #1, #2, . . . ) as a plurality of segment areas, and an access right is set in block units.

For example, when data is written or read, for example, with the recording/reproducing apparatus used by the user or by the server connected via a network, a data processing unit of the memory card 31 determines whether or not reading or writing can be executed in block units correspondingly to apparatuses based on the programs pre-stored in the memory card 31.

The memory card 31 includes not only the data processing unit configured to execute the pre-stored programs but also an authentication processing unit configured to execute an authentication process. First, the memory card 31 executes the authentication process with respect to an apparatus to write or read data with respect to the memory card 31.

At a phase of the authentication process, an apparatus cert including a public key cert and the like is received from a counterpart apparatus, in other words, an access requesting apparatus.

For example, when the access requesting apparatus is a server, a server cert held by the server, which is descried with reference to FIG. 5, is received. Then, whether or not access in units of the blocks (segment areas) in the protected area 51 is permitted is judged based on information contained in the cert.

Meanwhile, when the access requesting apparatus is a host apparatus such as a recording/reproducing apparatus (host) as a user apparatus configured to record and reproduce contents, a host cert held by the recording/reproducing apparatus (host), which is described with reference to FIG. 4, is received. Then, whether or not access to the blocks (segment areas) of the protected area 51 is permitted is judged based on information contained in the cert.

Such access right judgment processes are executed in units of the blocks (areas #0, #1, #2, . . . shown in FIG. 3) in the protected area 51 shown in FIG. 3. The memory card 31 causes the server or the host to execute only a process permitted in units of the blocks (process such as data reading/writing).

A configuration example of data in a case where the user apparatus 104 accepts a medium to record contents received from the content providing apparatus 103 is described with reference to FIG. 19.

Figure 19:
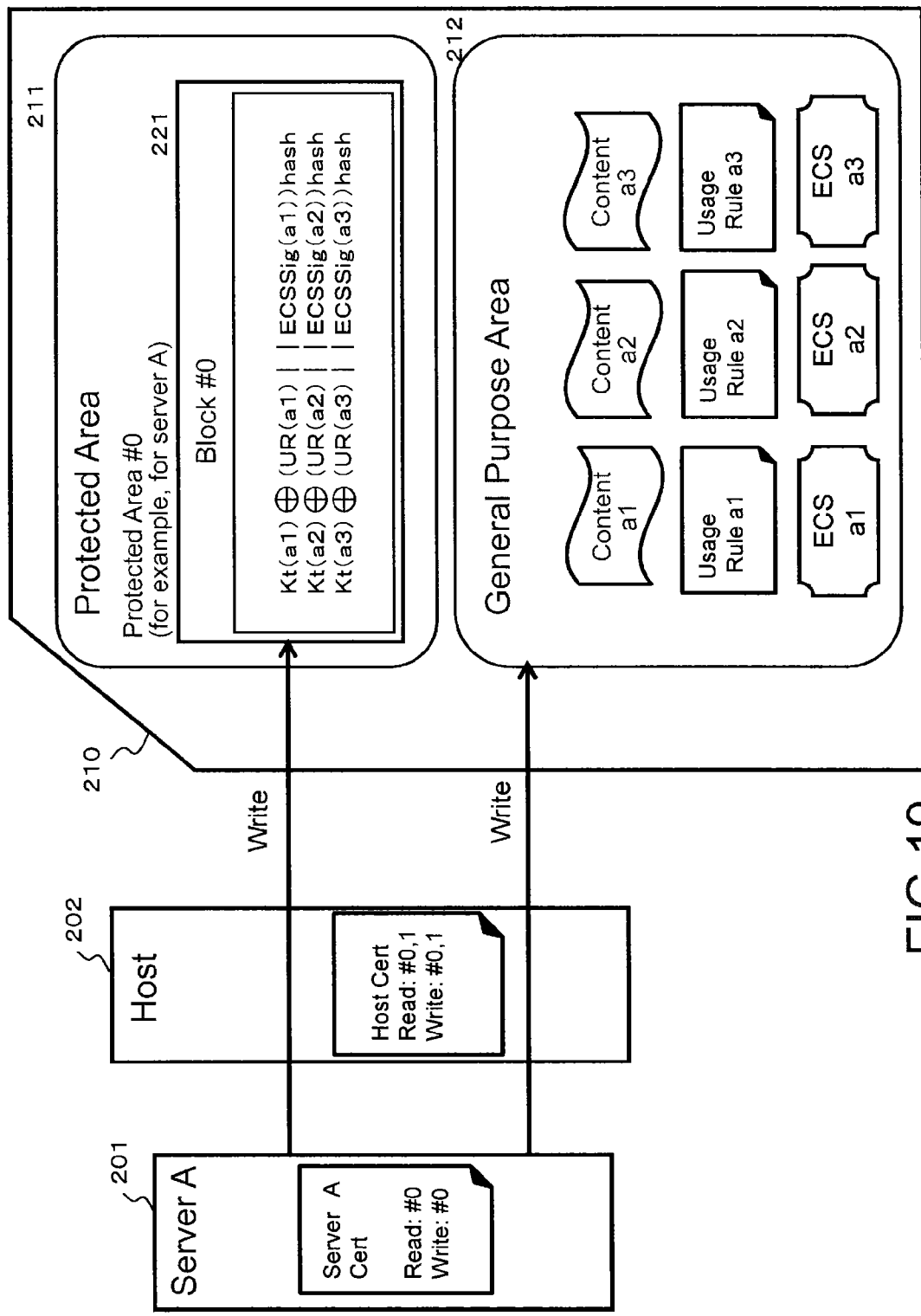
FIG. 19 is an explanatory diagram of an example of a data recording process by a server with respect to a memory card.

FIG. 19 illustrates an example of a process in which a server A 201 as a content providing apparatus provides and records an encrypted content to a memory card 210 inserted into a host 202 as a user apparatus.

The memory card 210 includes a protected area 211, and a general purpose area 212.

At the time of a process of providing an encrypted content, the server A 201 as a content providing apparatus records, to a predetermined block in the protected area, a title key to be applied to encryption and decryption of a content to be provided.

The server A 201 holds the server cert described above with reference to FIG. 5.

First, the server A 201 executes a mutual authentication process with respect to the memory card 210, and simultaneously, outputs the server cert to the memory card 210.

The memory card 210 confirms a protected-area-access-right information item recorded in the server cert received from the server A 201.

Only in a case where it has been judged that the server A 201 has an access right (right to execute writing) to a block #0 through this confirmation process, the server A 201 is permitted to write data to the block #0 in the protected area 211 set in the memory card 210.

As shown in FIG. 19, the server A 201 stores, in the block #0, 221 in the protected area 211, the title key to be applied to decryption of the content to be provided.

Note that, the title key itself is stored not as it is in the protected area, but as a result of an exclusive-OR operation of a hash value of a concatenated data item of the following information items (a) and (b) with respect to a title key Kt.

(a) Usage control information item (UR: usage rule)

(b) Signature by an ECS issuer, which is a constituent data item of the ECS file described with reference to (A) of FIG. 9

For example, a title key: Kt(a1) corresponding to a content (a1) is stored as the following title key conversion data item in the protected area.

Kt(a1)(+)(UR(a1)||ECSSig(a1))hash

Note that,

UR(a1) represents a usage control information item corresponding to the content a1, and ECSSig(a1) represents a signature by an ECS issuer, which is a constituent data item of the ECS file and corresponds to the content a1.

Further, meanings of the symbols as operators are defined as follows.

(+): exclusive-OR operation

||: concatenation of data items, for example, a||b represents a concatenated data item of a data item a and a data item b.

Hash: hash value, for example, (a||b)hash represents a hash value of a concatenated data item of the data item a and the data item b.

In the example illustrated in FIG. 19, the server A 201 records, in the general purpose area 212 in the memory card 210, the following contents, usage control information items, and ECS files.

Contents: Con(a1), Con(a2), and Con(a3)

Usage control information items (usage rules) corresponding to the contents: UR(a1), UR(a2), and UR(a3)

ECS files corresponding to the contents: ECS(a1), ECS(a2), and ECS(a3)

Sets of these contents, usage control information items, and ECS files are recorded.

Further, the server A 201 records the following data items in the block #0, 221 in the protected area 211 of the memory card 210, in other words, records results of exclusive-OR (XOR) operations between the following.

Title keys corresponding respectively to contents

Hash values of concatenated data items of usage control information items (usage rules), and signatures by an ECS issuer (ECSSigs), which correspond respectively to the contents.

Kt(a1)(+)(UR(a1)||ECSSig(a1))hash

Kt(a2)(+)(UR(a2)||ECSSig(a2))hash

Kt(a3)(+)(UR(a3)||ECSSig(a3))hash

Note that, as in the example of the process by the server A 201, which is shown in FIG. 19, for example, another server B stores a similar title key conversion data item:

Kt(bx)(+)(UR(bx)‖ECSSig(bx))hash in a predetermined block in the protected area, which is permitted as a storage area for a title key corresponding to a content (bx) to be provided from the server B, for example, in a block #1.

Figure 20:
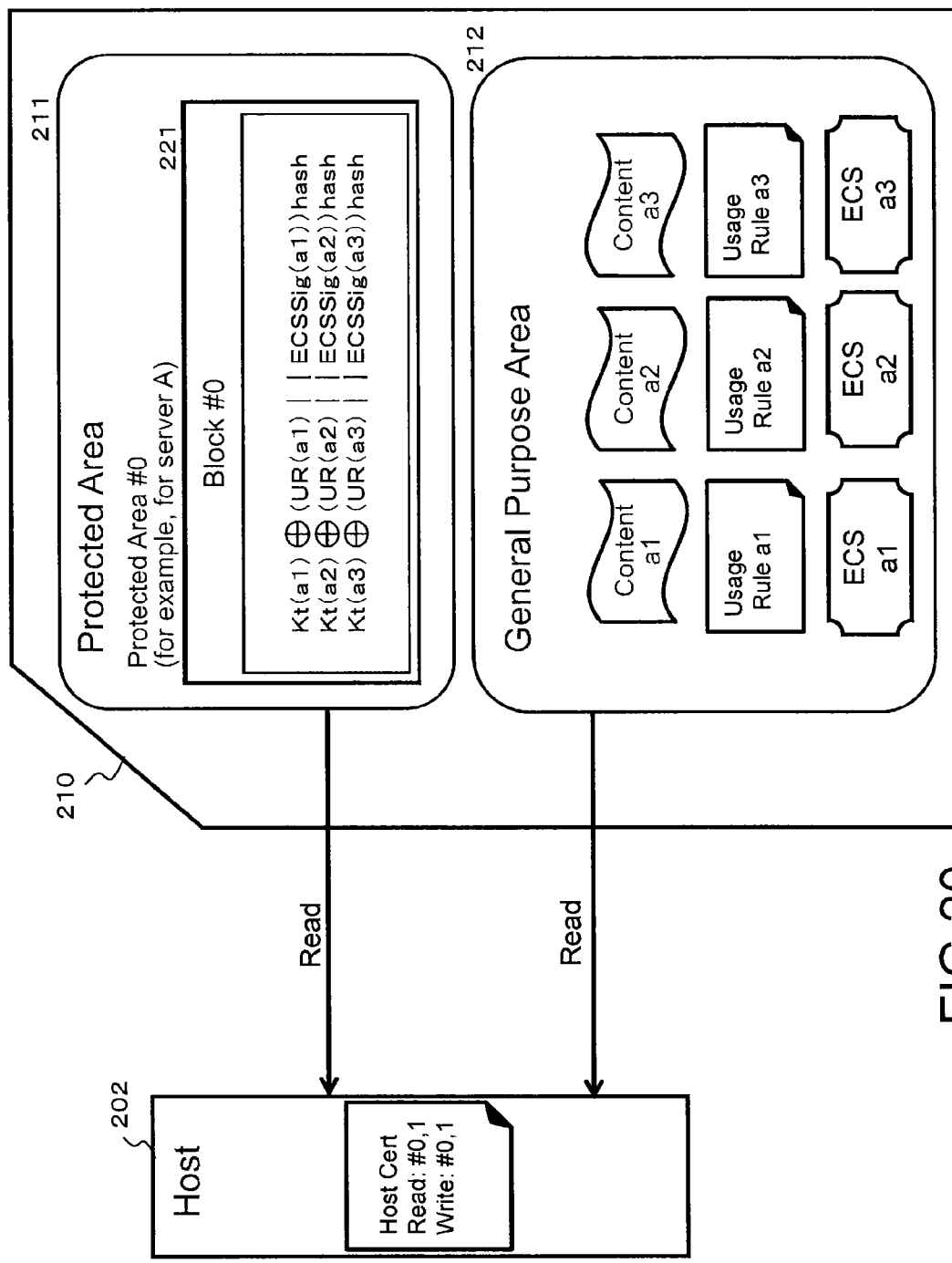
FIG. 20 is an explanatory diagram of an example of a reading process by a host with respect to recorded data in the memory card.

FIG. 20 shows a user apparatus (host) 202 to use contents and the memory card 210 storing the contents and the like.

The user apparatus (host) 202 holds the host cert described above with reference to FIG. 4.

First, the user apparatus (host) 202 executes a mutual authentication process with respect to the memory card 210, and simultaneously, outputs the host cert to the memory card 210.

The memory card 210 confirms a protected-area-access-right information item recorded in the host cert received from the user apparatus (host) 202.

Only in a case where it has been judged that the user apparatus (host) 202 has an access right (right to execute reading) to the block #0 through this confirmation process, the user apparatus (host) 202 is permitted to read data from the block #0 in the protected area 211 set in the memory card 210.

After the access right has been confirmed through the mutual authentication, the user apparatus (host) 202 executes the following processes to use contents.

First, the user apparatus (host) 202 acquires a usage target content: Con(xy), a corresponding usage control information item: UR(xy), and a corresponding ECS file: ECS(xy) from the general purpose area 212 in the memory card.

Next, the user apparatus (host) 202 refers to the usage control information item: UR(xy) to confirm in which of blocks in the protected area a title key of the usage target content: Con(xy) is stored.

An identifier of the block storing the title key of the usage target content: Con(xy) is recorded in the usage control information item: UR(xy).

After specifying which of the blocks in the protected area 211 stores the title key, the user apparatus (host) 202 executes a process of reading data items recorded in the block.

For example, the following data item is read from the selected block.

Kt(xy)(+)(UP(xy)‖ECSSig(xy))hash

Next, the user apparatus (host) 202 executes a process of concatenating the usage control information item: UR(xy) and the signature by an ECS issuer (ECSSig(xy)), which is stored in the ECS file: ECS(xy), which have been read from the general purpose area 212, and a process of calculating a hash value thereof.

In other words, the user apparatus (host) 202 calculates (UR(xy)‖ECSSig(xy))hash to obtain a calculation result P(xy).

After that, the title key Kt(xy) is acquired through the following calculation.

[Data item read from a block (title key conversion data item)] (+)

$P(xy) = (Kt(xy) (+) (UR(xy) \| ECSSig(xy))\text{hash}) (+) P(xy) =$ $(Kt(xy) (+) (UR(xy) \| ECSSig(xy))\text{hash})$ $(+) (UR(xy) \| ECSSig(xy))\text{hash}) = Kt(xy)$ Through such a calculation process, the title key Kt(xy) is acquired, and an encrypted content is used by decrypting the encrypted content with the title key thus acquired.

An example of data items recorded in the memory card is described with reference to FIG. 21.

FIG. 21 shows an example of data items to be written by the two different servers, in other words, the server A and the server B to the memory card.

The server A has an access right to the block #0 in the protected area in the memory card.

Meanwhile, the server B has an access right to the block #1 in the protected area in the memory card.

The servers each record contents and other data items to the memory card inserted into the host apparatus as a user apparatus.

The contents to be provided from the server A are represented as Con(a1), Con(a2), and Con(a3).

The contents to be provided from the server B are represented as Con(b1) and Con(b2).

As shown in FIG. 21, the server A records the following data items to the general purpose area in the memory card.

Contents: Con(a1), Con(a2), and Con(a3)

Usage control information items (usage rules) corresponding respectively to the contents: UR(a1), UR(a2), and UR(a3)

ECS files corresponding respectively to the contents: ECS(a1), ECS(a2), and ECS(a3)

Further, the server A records the following data items to the block #0 in the protected area in the memory card.

Data items acquired through conversion of the title keys: Kt(a1), Kt(a2), and Kt(a3) to be applied to decryption of the above-mentioned contents, in other words, Kt(a1)(+)(UR(a1)‖ECSSig(a1))hash Kt(a2)(+)(UR(a2)‖ECSSig(a2))hash Kt(a3)(+)(UR(a3)‖ECSSig(a3))hash Meanwhile, the server B records the following data items to the general purpose area in the memory card.

Contents: Con(b1) and Con(b2)

Usage control information items (usage rules) corresponding respectively to the contents: UR(b1) and UR(b2)

ECS files corresponding respectively to the contents: ECS(b1) and ECS(b2)

Further, the server B records the following data items to block #1 in the protected area in the memory card.

Data items acquired through conversion of the title keys: Kt(b1) and Kt(b2) to be applied to decryption of the above-mentioned contents, in other words, Kt(b1)(+)(UR(b1)‖ECSSig(b1))hash Kt(b2)(+)(UR(b2)‖ECSSig(b2))hash When the servers each record data items to the protected area in the memory card, the memory card executes the confirmation of the access right based on records in the server certs, in other words, confirmation of the right to execute writing with respect to the block. Only in the case where the access right has been confirmed, data writing is executed.

FIG. 22 shows a data recording example in which the server A and the server B each have the access right to the block #0 in the protected area in the memory card, and a server C and a server D each have an access right to the block #1 in the protected area in the memory card.

The server A records the following data items to the general purpose area in the memory card.

Contents: Con(a1), Con(a2), and Con(a3)

Usage control information items (usage rules) corresponding respectively to the contents: UR(a1), UR(a2), and UR(a3)

ECS files corresponding respectively to the contents: ECS(a1), ECS(a2), and ECS(a3)

Further, the server A records the following data items to the block #0 in the protected area in the memory card.

Data items acquired through conversion of the title keys: Kt(a1), Kt(a2), and Kt(a3) to be applied to decryption of the above-mentioned contents, in other words, Kt(a1)(+)(UR(a1)||ECSSig(a1))hash
Kt(a2)(+)(UR(a2)||ECSSig(a2))hash
Kt(a3)(+)(UR(a3)||ECSSig(a3))hash The server B records the following data items to the general purpose area in the memory card.

Contents: Con(b1) and Con(b2)

Usage control information items (usage rules) corresponding respectively to the contents: UR(b1) and UR(b2)

ECS files corresponding respectively to the contents: ECS(b1) and ECS(b2)

Further, the server B records the following data items to the block #0 in the protected area in the memory card.

Data items acquired through conversion of the title keys: Kt(b1) and Kt(b2) to be applied to decryption of the above-mentioned contents, in other words, Kt(b1)(+)(UR(b1)||ECSSig(b1))hash
Kt(b2)(+)(UR(b2)||ECSSig(b2))hash The server C records the following data items to the general purpose area in the memory card.

Content: Con(c1)

Usage control information item (usage rule) corresponding to the content: UR(c1)

ECS file corresponding to the content: ECS(c1)

Further, the server C records the following data item to the block #1 in the protected area in the memory card.

Data item acquired through conversion of a title key: Kt(c1) to be applied to decryption of the above-mentioned content, in other words, Kt(c1)(+)(UR(c1)||ECSSig(c1))hash The server D records the following data items to the general purpose area in the memory card.

Contents: Con(d1) and Con(d2)

Usage control information items (usage rules) corresponding respectively to the contents: UR(d1) and UR(d2)

ECS files corresponding respectively to the contents: ECS(d1) and ECS(d2)

Further, the server D records the following data items to the block #1 in the protected area in the memory card.

Data items acquired through conversion of title keys: Kt(d1) and Kt(d2) to be applied to decryption of the above-mentioned contents, in other words, Kt(d1)(+)(UR(d1)||ECSSig(d1))hash
Kt(d2)(+)(UR(d2)||ECSSig(d2))hash Note that, when the user apparatus (host) to execute reproduction of contents selects a content to be reproduced from the general purpose area, it is necessary for the user apparatus (host) to specify in which of the blocks in the protected area a title key of the content to be reproduced is stored.

An information item for specifying the block is acquired from the usage control information item (UR) corresponding to each of the contents.

Figure 23:
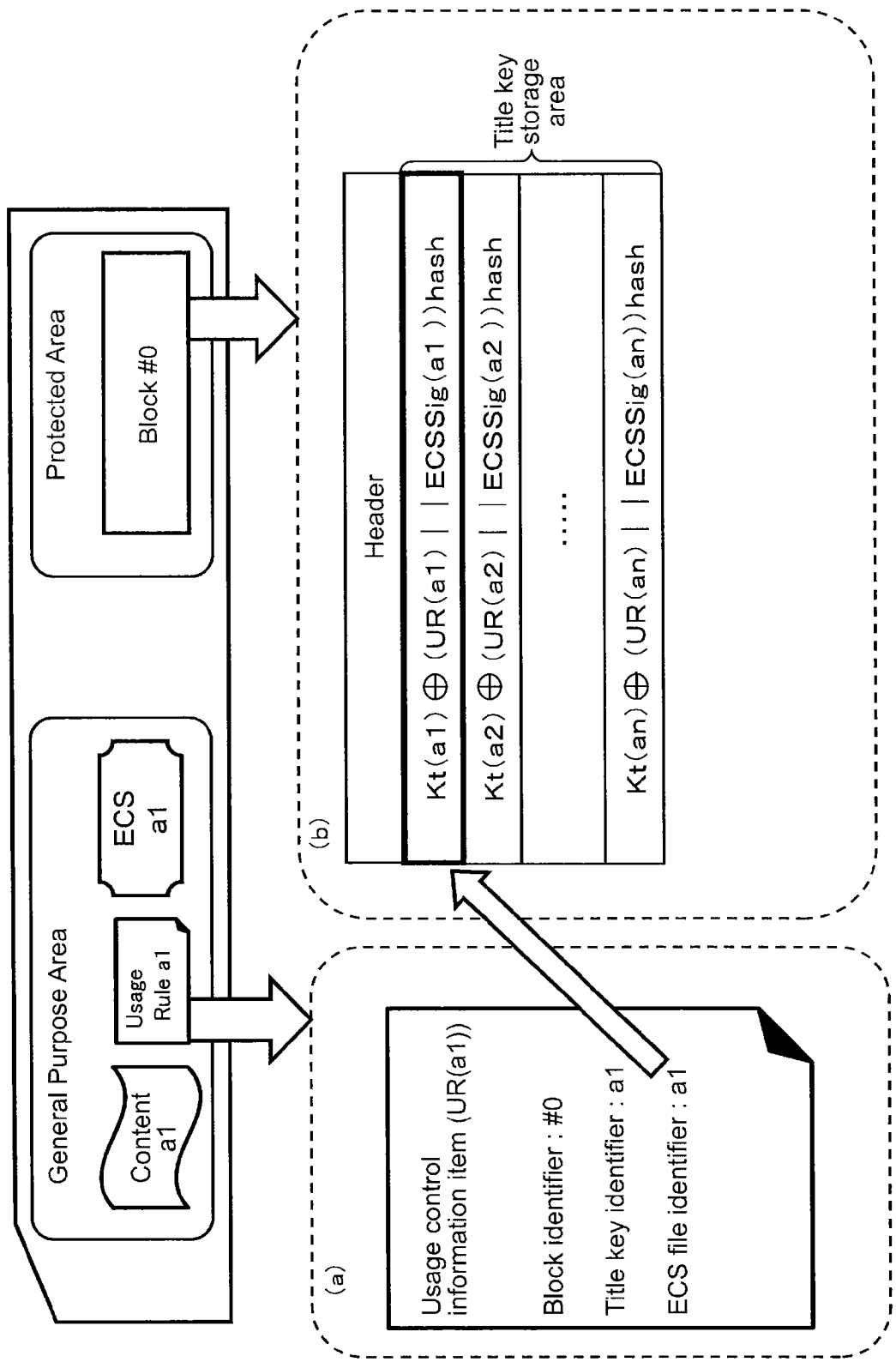
FIG. 23 is an explanatory diagram of a configuration example of a data item of usage control information recorded in a general purpose area in the memory card.

A usage example of the usage control information item is described with reference to FIG. 23. FIG. 23(*a*) shows a specific example of a usage control information item (usage rule) a1 corresponding to the content a1 recorded in the general purpose area in the memory card.

The following data items are recorded in the usage control information item (usage rule)

(1) Block identifier (#0)
(2) Title key identifier (a1)
(3) ECS file identifier (a1)

The (1) block identifier is an information item indicating a block storing the title key Kt(a1) of the content: Con(a1) corresponding to the usage control information item (usage rule) UR(a1).

In this example, the block identifier is #0, and hence a user apparatus (host apparatus) to execute reproduction of the content is permitted to select the block #0.

The (2) title key identifier is an information item indicating which of the large number of title keys stored in the block #0 is a title key of the content: Con(a1) corresponding to the usage control information item (usage rule) UR(a1).

In this example, the title key identifier is a1, and hence the user apparatus (host apparatus) is permitted to select the title key Kt(a1).

The (3) ECS file identifier (a1) is an information item for identifying which of the ECS files corresponds to the content (a1).

The user apparatus (host) refers to the usage control information item: UR(a1) to confirm in which of the blocks in the protected area a title key corresponding to the usage target content: Con(a1) is stored. Then, the user apparatus (host) reads the following data item from the specified block.

Kt(a1)(+)(UR(a1)||ECSSig(a1))hash

Next, the user apparatus (host) executes a process of concatenating the usage control information item: UR(a1) and the signature by an ECS issuer (ECSSig(a1)), which is stored in the ECS file: ECS(a1), which have been read from the general purpose area, and a process of calculating a hash value thereof.

In other words, the user apparatus (host) calculates the following.

P(a1)=(UR(a1)||ECSSig(a1))hash

After that, the user apparatus (host) executes the following calculation to obtain a title key Kt(xy).

[Data item read from a block (title key conversion data item)] (+)

$$P(a1) = (Kt(a1)(+)(UR(a1) \| ECSSig(a1))\text{hash})(+) P(a1) =$$
$$(Kt(a1)(+)(UR(a1) \| ECSSig(a1))\text{hash})$$
$$(+)(UR(a1) \| ECSSig(a1))\text{hash}) = Kt(a1)$$

Through such a calculation process, the title key Kt(a1) is acquired, and an encrypted content is used by decrypting the encrypted content with the title key thus acquired.

As described above, the title key to be recorded to the protected area in the memory card is stored as a result of an exclusive-OR (XOR) operation between a hash value of a concatenated data item of the usage control information item (UR) and the signature by an ECS issuer (ECSSig) and the title key.

Such a process can prevent fraudulent usage of contents even in a case where a signature key (secret key) from an ECS issuer, which is to be applied to a signature by the ECS issuer (ECSSig), has leaked.

For example, such a process enables a content providing server or a user apparatus to prevent contents from being fraudulently used by a fraudulent process applying the leaked signature key (secret key) of the ECS issuer, specifically, a process of replacing encrypted contents.

Note that, replacement means, for example, a process of encrypting other contents (C2), (C3), (C4), . . . with use of a different title key (Kt1) corresponding to a certain content (C1) and providing the contents thus encrypted to a user.

Such a process allows a user apparatus holding the title key (Kt1) to decrypt and reproduce the other contents (C2), (C3), (C4), . . . without legal purchase of these contents.

By storing the title key recorded in the protected area in the memory card as a result of an exclusive-OR (XOR) operation between a hash value of a concatenated data item of the usage control information item (UR) and the signature by an ECS issuer (ECSSig) and the title key, the replacement as described above can be prevented.

Such an advantage of preventing the replacement is described with reference to FIG. 24 and subsequent drawings.

Figure 24:
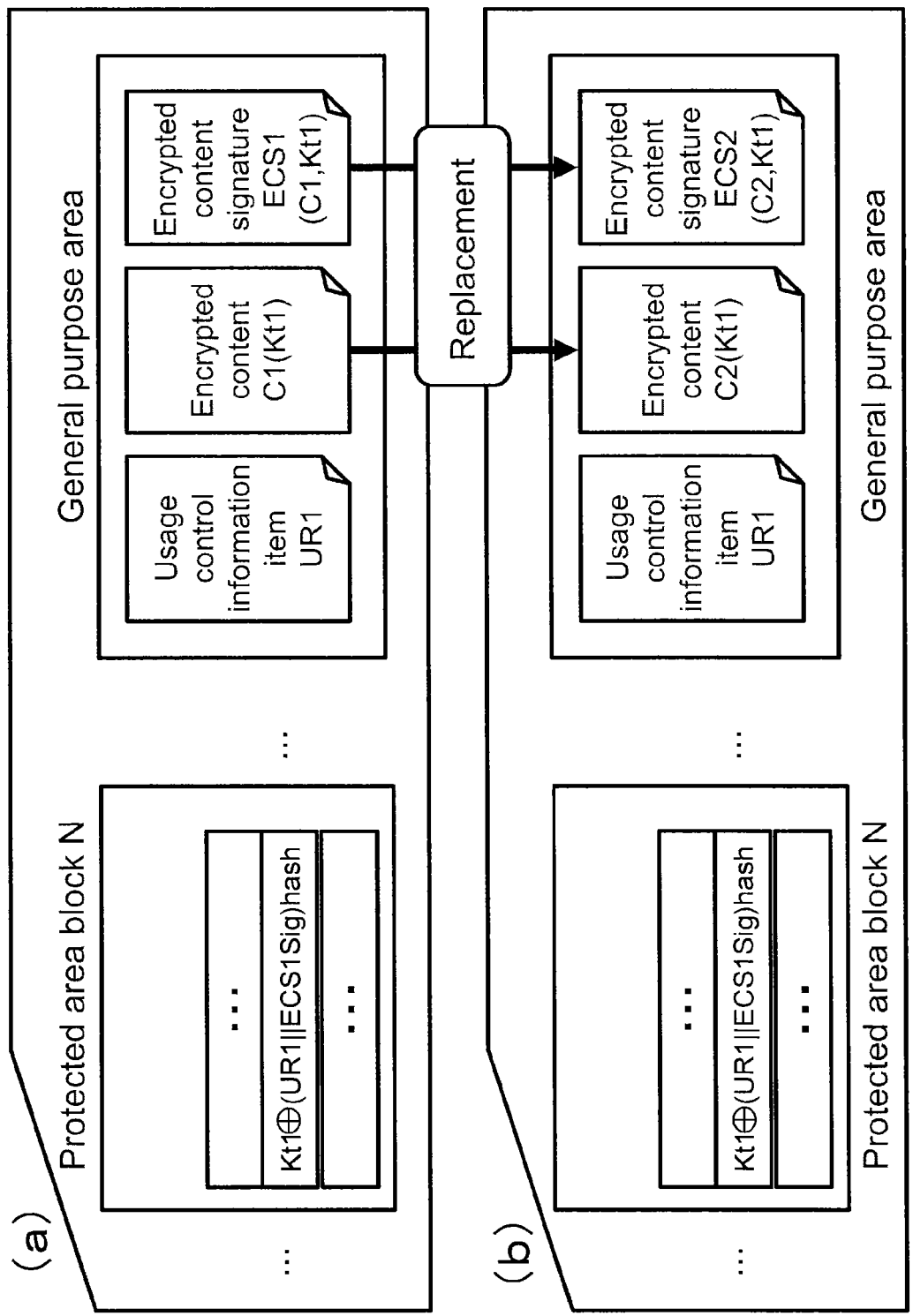
FIG. 24 is an explanatory diagram of an example of fraudulent usage of contents by a replacement process.

(a) of FIG. 24 shows a valid data storage structure corresponding to the content (C1), and (b) of FIG. 24 shows a data storage structure of replaced data items created by encryption of the content (C2) with use of the title key (Kt') corresponding to the content (C1).

In the valid data storage structure shown in (a) of FIG. 24, the general purpose area in the memory card stores the following data items.

(a1) Encrypted content (C1(Kt1)) encrypted with the valid title key (Kt1) corresponding to the content(C1)

(a2) Valid usage control information item (UR1) contents (C1) corresponding to the content (C1)

(a3) Valid ECS file ECS1(C1, Kt1) corresponding to the content (C1)

Note that, the ECS file stores the signature by an ECS issuer (ECSSig), which contains, as described above with reference to FIG. 13, electronic signatures created based on data items of hash list collections of the content (C1) and a hash value of the title key (Kt1). In order to clarify a source data item of this signature data item, the ECS file ECS1 is represented as (C1, Kt1).

Further, in the valid data storage structure shown in (a) of FIG. 24, a data item acquired through conversion of the title key (Kt1), in other words, the following data item is recorded to a block N in the protected area in the memory card.

Kt1(+)(UR1∥ECS1Sig)hash

Note that,

UR1 represents a usage control information item corresponding to the content (C1), and ECS1Sig represents a signature by an ECS issuer, which is a constituent data item of the ECS file and corresponds to the content (C1).

Further, meanings of the symbols as operators are defined as follows.

(+): exclusive-OR operation

∥: concatenation of data items, for example, a∥b represents a concatenated data item of a data item a and a data item b.

Hash: hash value, for example, (a∥b)hash represents a hash value of a concatenated data item of the data item a and the data item b.

For example, a malicious content providing server may use the title key (Kt1) to this content (C1) as an encryption key to another content (C2), and provide this title key (Kt1) to the user.

As a result of distribution of such an illegal content, "replaced data items" shown in (b) of FIG. 24 are stored in the memory card.

In the "replaced data" storage structure shown in (b) of FIG. 24, the general purpose area in the memory card stores the following data items.

(b1) Fraudulent encrypted content (C2(Kt1)) encrypted with the fraudulent title key (Kt1) with respect to the content (C2)

(b2) Usage control information item (UR1) fraudulently corresponded to the content (C2) [usage control information item (UR1) which should correspond to the content (C1)]

(b3) Fraudulent ECS file ECS2(C2, Kt1) fraudulently created correspondingly to the content (C2)

Note that, the fraudulent ECS file ECS2 stores a signature by an ECS issuer (ECSSig), which contains electronic signatures created based on the data items of hash list collections of the content (C2) and the hash value of the title key (Kt1) corresponding to the content (C1) with reference to the leaked signature key (secret key) issued from the ECS issuer. In order to clarify a source data item of this signature data item, the ECS file ECS2 is represented as (C2, Kt1).

Further, in the "replaced data" storage structure shown in (b) of FIG. 24, a data item acquired through conversion of the title key (Kt1), in other words, the following data item is recorded to the block N in the protected area in the memory card.

Kt1(+)(UR1∥ECS1Sig)hash

A sequence of a recording process of these "replaced data items" shown in (b) of FIG. 24 is described with reference to a flowchart shown in FIG. 25.

Figure 25:
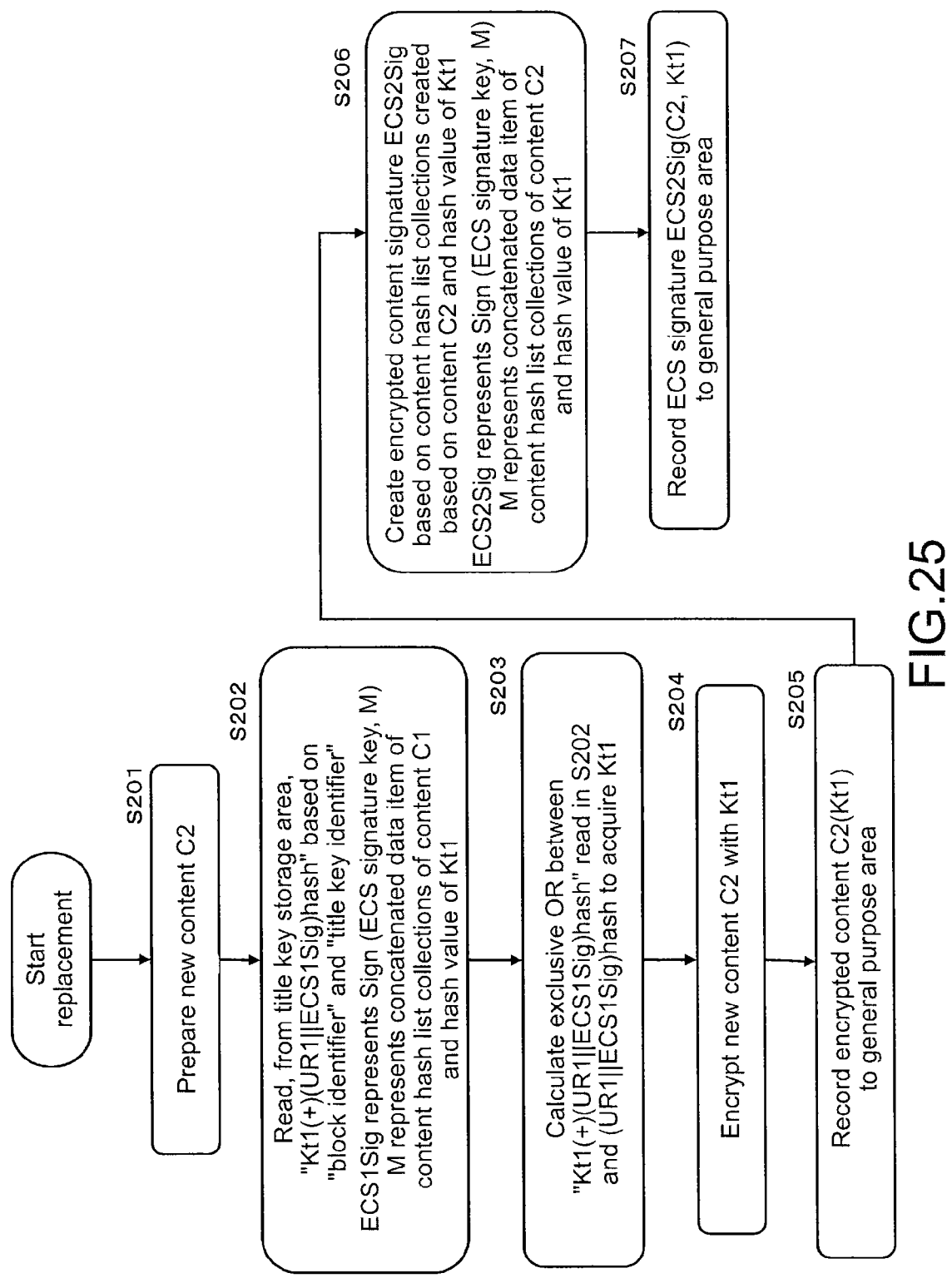
FIG. 25 is an explanatory flowchart showing an example of a fraudulent recording process of contents by the replacement process.

Note that, the process shown in FIG. 25 is a process executed by using a memory card storing a valid data set corresponding to the content (C1) shown in (a) of FIG. 24, more specifically, a process executed, for example, by a content providing server or a user apparatus which has, as an access right with respect to the block N in the protected area in the memory card, a right to execute a data reading process.

First, in Step S201, the new content C2 is prepared.

Next, in Step S202, the "block identifier" and the "title key identifier" are acquired from the usage control information item (UR1) of the content (C1) recorded in the general purpose area in the memory card. Based on these acquired information items, the regular content (C1) corresponding to the following title key conversion data item is read from a predetermined block in the protected area, in other words, a title key storage block.

Kt1(+)(UR1∥ECS1Sig)hash

Note that, ECS1Sig represents Sign (ECS signature key, M), and M represents a concatenated data item of the content hash list collections of the content C1 and the hash value of Kt1.

Next, in Step S203, a hash value of a concatenated data item of the usage control information item (UR1) and the ECS file (ECS1(C1, Kt1)) corresponding to the regular content (C1), which have been read from the general purpose area, is calculated. Then, an exclusive-OR (XOR) operation between the calculation result and the above-mentioned title key conversion data item that has been read from the protected area is executed to acquire the regular title key (Kt1) corresponding to the content (C1).

In other words, the title key (Kt1) is acquired based on the following equation.

$$Kt1 = \text{(data item read from the protected area)}$$
$$(+)\text{ (data item read from the general purpose area)} =$$
$$Kt1\ (+)\ (UR1 \parallel ECS1Sig)\text{hash}\ (+)\ (UR1 \parallel ECS1Sig)\text{hash}$$

Note that, (+) represents an exclusive-OR operation (XOR).

Next, in Step S204, the new content C2 is encrypted with application of the title key (Kt1) acquired in Step S203.

In this way, an encrypted content C2(Kt1) is created.

Next, in Step S205, the encrypted content C2(Kt1) is recorded to the general purpose area in the memory card.

Next, in Step S206, an encrypted content signature ECS2Sig corresponding to the content hash list collections created based on the content C2 and the hash value of Kt1 is created. In other words, the following signature data item is created.

ECS2Sig=Sign(ECS signature key, M)

Note that, M represents a concatenated data item of the content hash list collections of the content C2 and the hash value of Kt1.

Further, a leaked signature key (secret key) issued from an encrypted content signature issuer is applied to this signature creation.

Lastly, in Step S207, the ECS file containing the ECS signature (ECS2Sig(C2, Kt1)) fraudulently created in Step S206 is created and recorded to the general purpose area in the memory card.

By the series of processes shown in FIG. 25, the process of recording the "replaced data items" shown (b) of FIG. 24 is completed.

By such a replacement process, the content C2(Kt1) encrypted through application of the title key (Kt1) corresponding to the different content (C1) is created.

Note that, in this example, the usage control information item (UR1) corresponding to the content C1 is used as it is as a usage control information item corresponding to the illegally recorded content C2(Kt1).

Next, how the user apparatus executes a process of reproducing the content C2 by using the "replaced data items" shown in (b) of FIG. 24 is described with reference to a flowchart shown in FIG. 26.

First, in Step S221, the user apparatus reads the encrypted content C2(Kt1) to be reproduced and the ECS file (ECS2 (C2, Kt1)) created correspondingly thereto from the general purpose area in the memory card.

Next, in Step S222, a block identifier indicating in which of the blocks the title key is stored is read from the usage control information item (UR1) recorded correspondingly to the content C2 in the general purpose area in the memory card.

As described above, in this example, the usage control information item (UR1) corresponding to the content C1 is used as it is as a usage control information item corresponding to the illegally recorded content C2(Kt1).

As described above with reference to FIG. 23, the usage control information item (UR) records the identifier indicating which of the blocks stores the title key, the title key identifier, and the like.

In Step S222, the block identifier and the title key identifier are read from the usage control information item (UR1) corresponding to the content C1.

These block identifier and title key identifier are identifiers corresponding respectively to the block in which the regular title key Kt1 corresponding to the content C1 is stored and the title key stored in the same block.

Thus, data items thus read correspond to the title key conversion data item corresponding to the content C1, in other words, Kt1(+)(UR1∥ECS1Sig)hash.

Next, in Step S223, a hash value of a concatenated data item of the usage control information item (UR1) read from the general purpose area and the ECS file (ECS2(C2, Kt1)) fraudulently created correspondingly to the content C2 is calculated. Then, an exclusive-OR (XOR) operation between the calculation result and the above-mentioned title key conversion data item that has been read from the protected area is executed so as to acquire the decryption title key Kt2 corresponding to the content C2.

In this case, title key acquisition succeeds when the title key Kt2 thus acquired is equal to Kt1.

In other words, an attempt to execute a title key calculation process based on the following equation is made.

$$Kt2 = \text{(data item read from the protected area)}$$
$$(+) \text{ (data item read from general purpose area)} =$$
$$Kt1\ (+)\ (UR1 \parallel ECS2Sig)\text{hash}\ (+)\ (UR1 \parallel ECS1Sig)\text{hash}$$

An attempt to acquire the title key (Kt2) based on this title key calculation equation is made.

Note that, (+) represents an exclusive-OR operation (XOR).

However, the relationship

ECS2Sig≠ECS1Sig is established in the above-mentioned title key calculation equation. Thus, the value acquired based on the above-mentioned calculation equation: Kt2 is not equal to Kt1, in other words, the following relationship is established.

Kt2≠Kt1

As a result, as described in Step S224, the user apparatus cannot acquire the title key Kt1 applied to encryption of the content C2, and decryption and reproduction of the content C2 fail.

Further, in Step S225, based on a preset reproduction sequence, the user apparatus executes a process of verifying the signature by an ECS issuer (ECSSig), which is contained in the ECS file read from the general purpose area.

The signature verification process is executed based on the following formula.

Verify (ECS issuer public key, ECS2Sig, M)

Note that, Verify (k, S, M) represents a process of verifying an electronic signature S corresponding to a data item M with a verification key k.

M represents a concatenated data item of the content hash list collections of the content C2 and the hash value of Kt2.

The value calculated in Step S223 is used as Kt2.

ECS2Sig stored in the ECS file is a fraudulent signature created in Step S206 of the flow shown in FIG. 25, in other words, the following data item.

ECS2Sig=Sign(ECS signature key, M)

Note that,

M represents a concatenated data item of the content hash list collections of the content C2 and the hash value of Kt1.

As described above, the data item M to be applied to the signature verification is a data item containing the hash value of Kt2. Meanwhile, the signature data item ECS2Sig stored in the ECS file is created correspondingly to M containing the hash value of Kt1.

Figure 26:
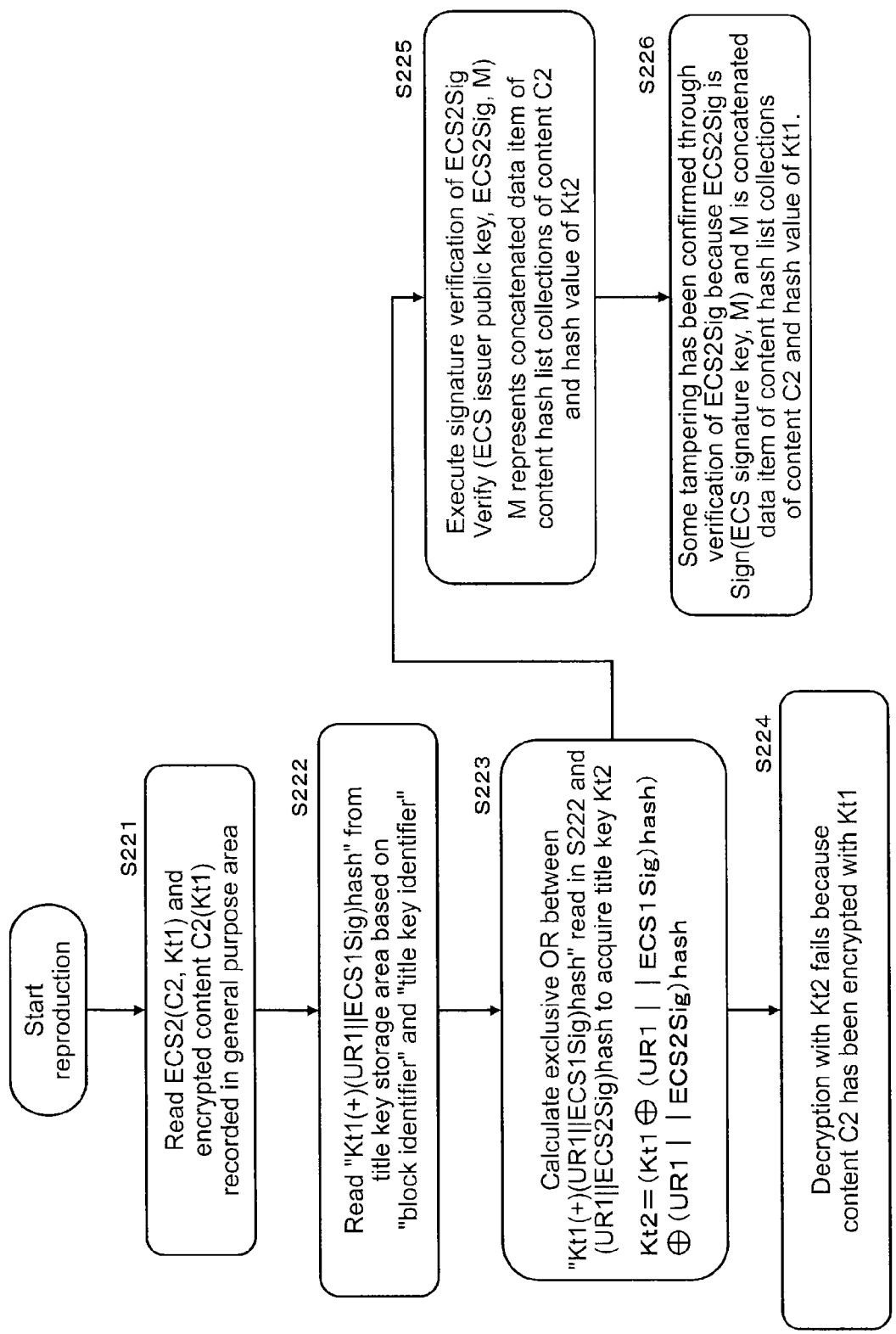
FIG. 26 is an explanatory flowchart showing that fraudulent contents recorded by the replacement process cannot be reproduced.

Thus, as described in Step S226 in FIG. 26, some tampering has been confirmed through the signature verification in Step S225.

In this way, even when trying to decrypt and reproduce the content C2 by using the "replaced data items" shown in (b) of FIG. 24, the user apparatus has the following results.

Fail to decryption of the content C2

Some tampering confirmed through signature verification of the ECS file

As a result, the content C2 cannot be used.

The processing example described with reference to FIGS. 24 to 26 is a processing example of trying to encrypt and decrypt the new content C2 by applying the title key Kt1 corresponding to the content C1.

Next, an example of a case where the regular usage control information item (UR1) corresponding to the content C1 is fraudulently tampered to create a new usage control information item (UR2) is described with reference to FIG. 27 and subsequent drawings.

The usage control information item records information items of usable time periods of contents, copy restriction information items, and the like. Thus, fraudulence such as extension of usage expiration dates may be performed by rewriting this usage control information item.

Similar to FIG. 24 described above, FIG. 27 includes the following.

Figure 27:
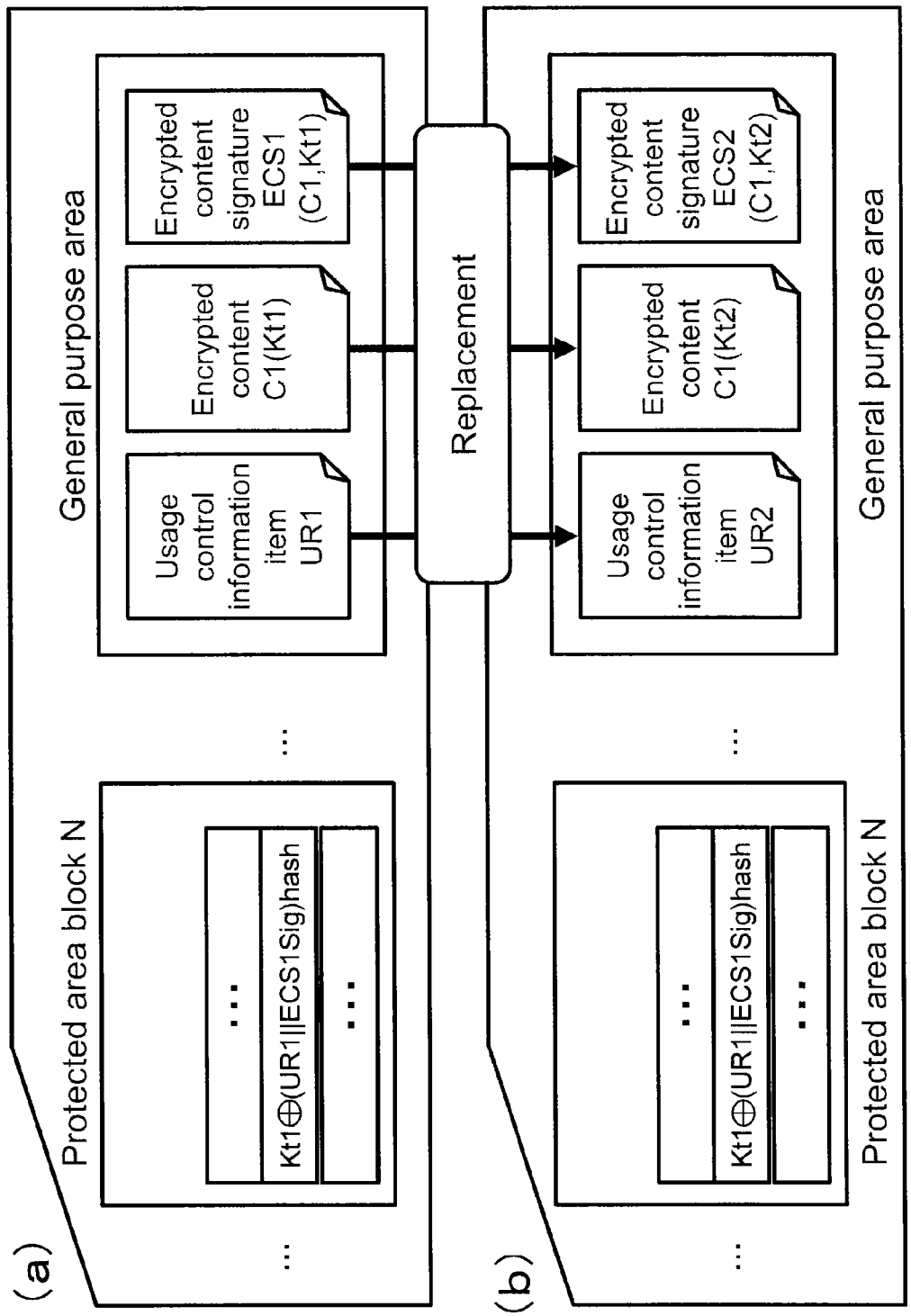
FIG. 27 is an explanatory diagram of another example of fraudulent usage of contents by a replacement process.

(a) of FIG. 27 shows a valid data storage structure corresponding to the content (C1), and (b) of FIG. 27 shows a data storage structure of replaced data items created by encryption of the content (C2) with use of the title key (Kt1) corresponding to the content (C1).

In the valid data storage structure shown in (a) of FIG. 27, the general purpose area in the memory card stores the following data items.

(a1) Encrypted content (C1(Kt1)) encrypted with the valid title key (Kt1) corresponding to the content(C1)

(a2) Valid usage control information item (UR1) corresponding to the content (C1)

(a3) Valid ECS file ECS1(C1, Kt1) corresponding to the content (C1)

Note that, the ECS file stores the signature by an ECS issuer (ECSSig), which contains, as described above with reference to FIG. 13, electronic signatures created based on data items of hash list collections of the content (C1) and a hash value of the title key (Kt1). In order to clarify a source data item of this signature data item, the ECS file ECS1 is represented as (C1, Kt1).

Further, in the valid data storage structure shown in (a) of FIG. 27, a data item acquired through conversion of the title key (Kt1), in other words, the following data item is recorded to a block N in the protected area in the memory card.

Kt1(+)(UR1∥ECS1Sig)hash

Note that,

UR1 represents a usage control information item corresponding to the content (C1), and ECS1Sig represents a signature by an ECS issuer, which is a constituent data item of the ECS file and corresponds to the content (C1).

Further, meanings of the symbols as operators are defined as follows.

(+): exclusive-OR operation

∥: concatenation of data items, for example, a∥b represents a concatenated data item of a data item a and a data item b.

Hash: hash value, for example, (a∥b)hash represents a hash value of a concatenated data item of the data item a and the data item b.

For example, a malicious content providing server or a user apparatus may rewrite the usage control information item (UR1) corresponding to this content (C1).

As a result of such a fraudulent process, "replaced data items" shown in (b) of FIG. 27 are stored in the memory card.

In the "replaced data" storage structure shown in (b) of FIG. 27, the general purpose area in the memory card stores the following data items.

(b1) Fraudulent encrypted content (C1(Kt2)) encrypted with the fraudulent created title key (Kt2) with respect to the content (C1)

(b2) Usage control information item (UR2) fraudulently created correspondingly to the content (C1)

(b3) Fraudulent ECS file ECS2(C1, Kt2) fraudulently created correspondingly to the content (C1)

Note that, the fraudulent ECS file ECS2 stores a signature by an ECS issuer (ECSSig), which contains electronic signatures created based on the data items of hash list collections of the content (C1) and the hash value of the fraudulently created title key (Kt2) with reference to the leaked signature key (secret key) issued from the ECS issuer. In order to clarify a source data item of this signature data item, the ECS file ECS2 is represented as (C1, Kt2).

Further, in the "replaced data" storage structure shown in (b) of FIG. 27, a data item acquired through conversion of the title key (Kt1), in other words, the following data item is recorded to the block N in the protected area in the memory card.

Kt1(+)(UR1∥ECS1Sig)hash

A sequence of a recording process of these "replaced data items" shown in (b) of FIG. 27 is described with reference to a flowchart shown in FIG. 28.

Figure 28:
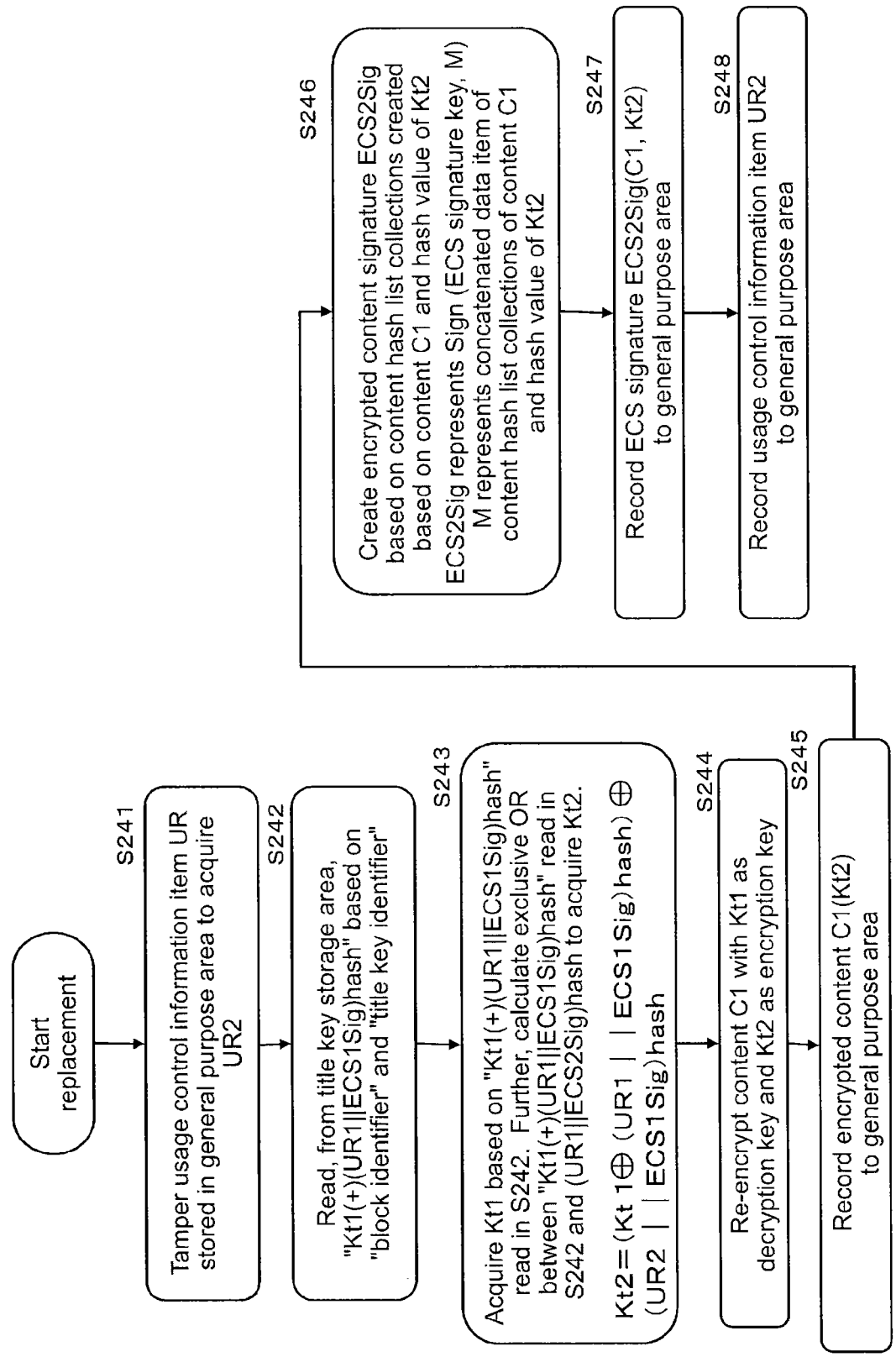
FIG. 28 is an explanatory flowchart showing another example of the fraudulent recording process of contents by the replacement process.

Note that, the process shown in FIG. 28 is a process executed by using a memory card storing a valid data set corresponding to the content (C1) shown in (a) of FIG. 27, more specifically, a process executed, for example, by a content providing server or a user apparatus which has, as an access right with respect to the block N in the protected area in the memory card, a right to execute a data recording process.

First, in Step S241, the usage control information item UR1 corresponding to the content C1 is read from the general purpose area, and then tampering such as rewriting of the usable time periods information item is performed to acquire the fraudulent usage control information item (UR2).

Next, in Step S242, the "block identifier" and the "title key identifier" are acquired from the usage control information item (UR1) of the content (C1) recorded in the general purpose area in the memory card. Based on these acquired information items, the regular content (C1) corresponding to the following title key conversion data item is read from a predetermined block in the protected area, in other words, a title key storage block.

Kt1(+)(UR1∥ECS1Sig)hash

Note that, ECS1Sig represents Sign (ECS signature key, M), and M represents a concatenated data item of the content hash list collections of the content C1 and the hash value of Kt1.

Next, in Step S243, a hash value of a concatenated data item of the usage control information item (UR1) and the ECS file (ECS1(C1, Kt1)) corresponding to the regular content (C1), which have been read from the general purpose area, is calculated. Then, an exclusive-OR (XOR) operation between the calculation result and the above-mentioned title key conversion data item that has been read from the protected area is executed to acquire the regular title key (Kt1) corresponding to the content (C1).

In other words, the title key (Kt1) is acquired based on the following equation.

$$Kt1 = (\text{data item read from the general purpose area})$$
$$(+) (\text{data item read from the protected area}) =$$
$$(UR1 \parallel ECS1Sig)\text{hash} (+) Kt1 (+) (UR1 \parallel ECS1Sig)\text{hash}$$

Note that, (+) represents an exclusive-OR operation (XOR).

Further, the title key K2 to be applied to encryption and decryption of the content C2 is calculated based on the following equation.

$$Kt2=(Kt1(+)(UR1\|ECS1Sig)\text{hash}(+)(UR2\|ECS1Sig)\text{hash}$$

Next, in Step S244, the title key Kt1 created in Step S243 is applied to decrypt the content C1 (Kt1). Further, the new title key Kt2 created in Step S243 is applied to encrypt the content C1 to create the encrypted content C1(Kt2).

Next, in Step S245, the encrypted content C1(Kt2) is recorded to the general purpose area in the memory card.

Next, in Step S246, an encrypted content signature ECS2Sig corresponding to the content hash list collections created based on the content C1 and the hash value of Kt2 is created. In other words, the following signature data item is created.

ECS2Sig=Sign(ECS signature key, M)

Note that, M represents a concatenated data item of the content hash list collections of the content C1 and the hash value of Kt2.

Further, a leaked signature key (secret key) issued from an encrypted content signature issuer is applied to this signature creation.

Next, in Step S247, the ECS file containing the ECS signature (ECS2Sig(C1, Kt2)) fraudulently created in Step S246 is created and recorded to the general purpose area in the memory card.

Lastly, in Step S248, the usage control information item (UR2) created in Step S241 is recorded to the general purpose area.

By the series of processes shown in FIG. 28, the process of recording the "replaced data items" shown (b) of FIG. 27 is completed.

By such a replacement process, the fraudulently created usage control information item (UR2) is corresponded to the content C1.

Note that, the content C1 is recorded while being encrypted with the new title key Kt2.

Next, how the user apparatus executes a process of reproducing the content C1 by using the "replaced data items" shown in (b) of FIG. 27 is described with reference to a flowchart shown in FIG. 29.

First, in Step S261, the user apparatus reads the encrypted content C1(Kt2) to be reproduced and the ECS file (ECS2 (C1, Kt2)) created correspondingly thereto from the general purpose area in the memory card.

Next, in Step S262, a block identifier indicating in which of the blocks the title key is stored and a title key identifier are read from the new usage control information item (UR2) fraudulently created correspondingly to the content C1 in the general purpose area in the memory card.

These block identifier and title key identifier are set to remain the same as those in the valid untampered usage control information item (UR1).

In other words, these block identifier and title key identifier are identifiers corresponding respectively to the block in which the regular title key Kt1 corresponding to the content C1 is stored and the title key stored in the same block.

Thus, data items thus read correspond to the title key conversion data item corresponding to the content C1, in other words, Kt1(+)(UR1\|ECS1Sig)hash.

In Step S263, a hash value of a concatenated data item of the usage control information item (UR2) fraudulently created and read from the general purpose area and the illegally created ECS file (ECS2(C1, Kt2)) is calculated. Then, an exclusive-OR (XOR) operation between the calculation result and the above-mentioned title key conversion data item that has been read from the protected area is executed so as to acquire a decryption title key Kt3 corresponding to the content C1.

In this case, title key acquisition succeeds when the title key Kt3 thus acquired is equal to Kt2.

Next, in Step S263, an attempt to execute a title key calculation process based on the following equation is made.

$$Kt3 = \text{(data item read from the protected area)}$$
$$(+) \text{(data item read from general purpose area)} =$$
$$Kt1\ (+)\ (UR1\|ECS1Sig)\text{hash}\ (+)\ (UR2\|ECS2Sig)\text{hash}$$

The title key (Kt3) is created based on this title key calculation equation.

Note that, (+) represents an exclusive-OR operation (XOR).

However, Kt2 cannot be acquired in the above-mentioned title key calculation equation. Thus, the value acquired based on the above-mentioned calculation equation: Kt3 is not equal to Kt1 or Kt2, in other words, the following relationships are established.

Kt3≠Kt2

Kt3≠Kt1

As a result, as described in Step S264, the user apparatus cannot acquire the title key Kt2 applied to re-encryption of the content C1, and decryption and reproduction of the content C1 fail.

Further, in Step S265, based on a preset reproduction sequence, the user apparatus executes a process of verifying the signature by an ECS issuer (ECSSig), which is contained in the ECS file read from the general purpose area.

The signature verification process is executed based on the following formula.

Verify (ECS issuer public key, ECS2Sig, M)

Note that, Verify (k, S, M) represents a process of verifying an electronic signature S corresponding to a data item M with a verification key k.

M represents a concatenated data item of the content hash list collections of the content C1 and the hash value of Kt3.

The value calculated in Step S263 is used as Kt3.

ECS2Sig stored in the ECS file is a fraudulent signature created in Step S246 of the flow shown in FIG. 28, in other words, the following data item.

ECS2Sig=Sign(ECS signature key, M)

Note that,

M represents a concatenated data item of the content hash list collections of the content C1 and the hash value of Kt2.

As described above, the data item M to be applied to the signature verification is a data item containing the hash value of Kt3. Meanwhile, the signature data item ECS2Sig stored in the ECS file is created correspondingly to M containing the hash value of Kt2.

Figure 29:
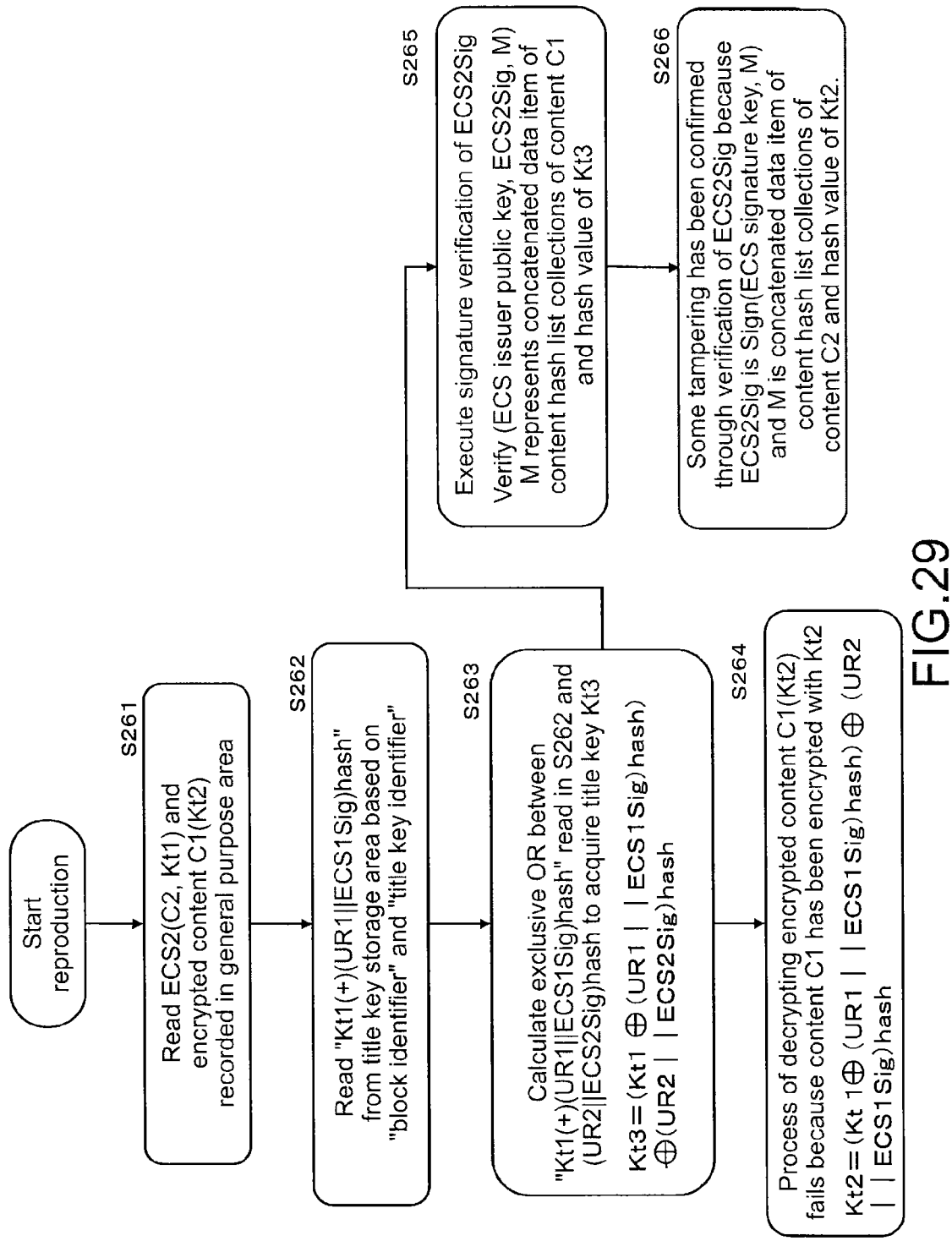
FIG. 29 is another explanatory flowchart showing that fraudulent contents recorded by the replacement process cannot be reproduced.

Thus, as described in Step S266 in FIG. 29, some tampering has been confirmed through the signature verification in Step S265.

In this way, even when trying to decrypt and reproduce the content C1 by using the "replaced data items" shown in (b) of FIG. 27, the user apparatus has the following results.

Fail in decryption of the content C1

Some tampering confirmed through signature verification of the ECS file

As a result, the content C1 cannot be used.

As described above, when the title key to be recorded to the protected area in the memory card is stored as a result of an exclusive-OR (XOR) operation between a hash value of a concatenated data item of the usage control information item (UR) and the signature by an ECS issuer (ECSSig) and the title key, fraudulent usage of contents can be prevented even in a case where a signature key (secret key) issued from an ECS issuer, which is to be applied to a signature by the ECS issuer (ECSSig), has leaked.

For example, such a process enables a content providing server or a user apparatus to prevent contents from being fraudulently used by a fraudulent process applying the leaked signature key (secret key) issued from the ECS issuer, specifically, a process of replacing encryption keys to encrypted contents or tampering of usage control information items.

[11. Process of Applying Block Identifier Recorded in Encrypted Content Signature (ECS) File]

Next, a process of applying a block identifier (PAD block number) recorded in an encrypted content signature (ECS) file is described.

As described above with reference to (A) of FIG. 9, a block identifier (PAD block number) is recorded in an encrypted content signature (ECS) file.

As described with reference to FIG. 13, the block identifier (PAD block number) is a data item to be notified from the content providing apparatus (content server) 103 to the encrypted content signature (ECS) issuer 102, more specifically, an identifier indicating in which of blocks in a protected area in a medium a title key as an encryption key corresponding to a content provided from the content providing apparatus 103 to the user apparatus 104 is stored. In other words, the block identifier (PAD block number) is an identifier indicating which of blocks in a protected area in a medium the content providing apparatus 103 can use.

As described above with reference, for example, to FIGS. 3 and 6, which of the blocks in the protected area in the medium the content providing apparatus 103 can use is set in advance, and an information item of such an access permitted block is recorded.

Further, as described with reference to (B) of FIG. 9, information items corresponding to the block identifier (PAD block number) are recorded also in the ECS issuer cert.

As described above with reference to (B) of FIG. 9, the following data items are recorded.

(a) Block identifier start number (start PAD block number)
(b) Block identifier range (PAD block number counter)

The (a) block identifier start number (start PAD block number) is a start number of an access permitted block in a protected area in a medium, to which the content providing apparatus 103 permits the ECS issuer 102 to make access.

The (b) block identifier range (PAD block number counter) is an information item indicating a range from the start number of the access permitted block in the protected area in the medium, to which the content providing apparatus 103 permits the ECS issuer 102 to make access.

Further, as described above with reference to FIG. 23, a different block identifier is recorded also to the usage control information item (UR) corresponding to a content. The different block identifier recorded in the usage control information item (UR) is an identifier indicating which of the blocks stores a title key corresponding to the content.

Figure 30:
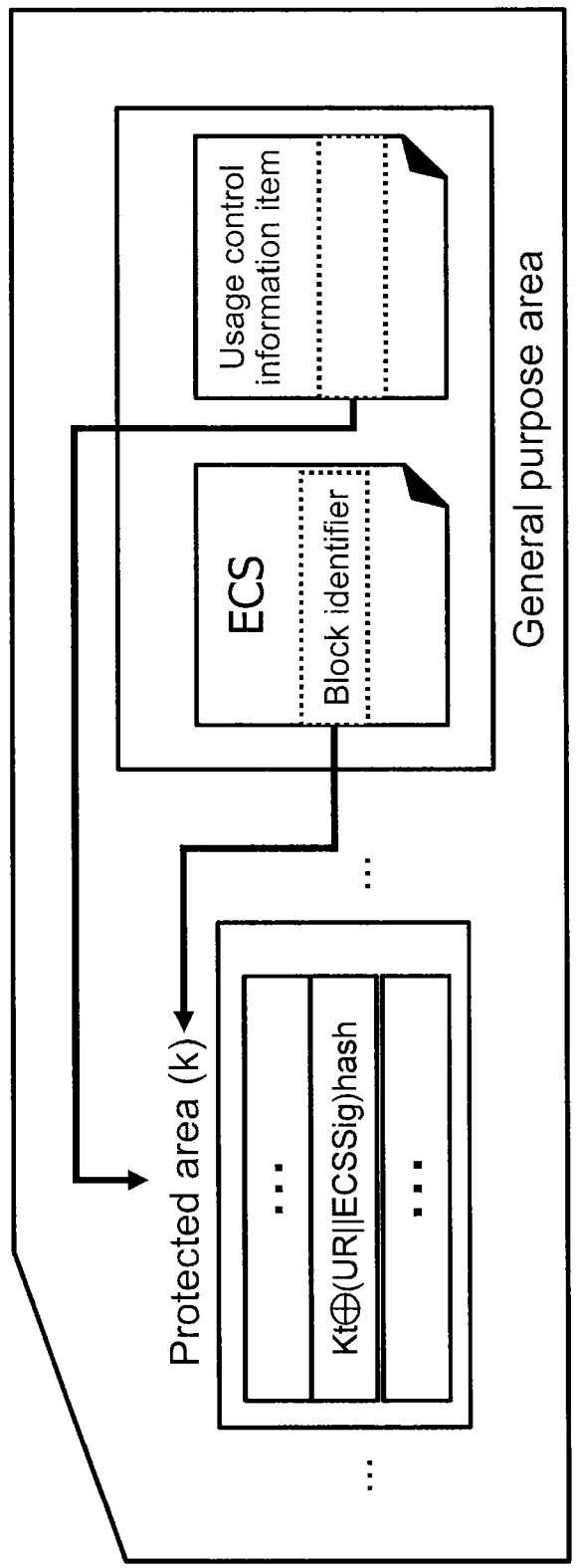
FIG. 30 is an explanatory diagram of a block identifier recorded in the encrypted content signature file (ECS file) and a different block identifier recorded in a usage control information file.

FIG. 30 shows a correspondence among the following.
Encrypted content signature (ECS) file
Usage control information item (UR)
Block identifiers recorded in the encrypted content signature (ECS) file and the usage control information item (UR)
Title key storage block in the protected area (block k in the illustration)

As shown in FIG. 30, the general purpose area in the memory card stores the following data items corresponding to a content.
Encrypted content signature (ECS) file
Usage control information item (UR)

Further, the block k in the protected area stores a data item acquired through conversion of a title key corresponding to the content, in other words, Kt(+)UR||(ECSSig)hash.

A content providing apparatus to provide a content to a user apparatus compares the block identifier as a protected-area-access-right information item recorded in a host cert (refer to FIG. 4) of the content providing apparatus itself with a writing-permitted-area information item as the block identifier in the ECS issuer cert.

Based on results of this comparison, whether or not the content can be provided is judged.

Further, the user apparatus to execute reproduction of the content compares the block identifier in the usage control information item and the block identifier in the ECS file with each other.

Based on results of this comparison, whether or not the content can be reproduced is judged.

First, a sequence of how the content providing apparatus judges, by using the block identifiers, whether or not the content can be provided, is described with reference to a flowchart shown in FIG. 31.

Figure 31:
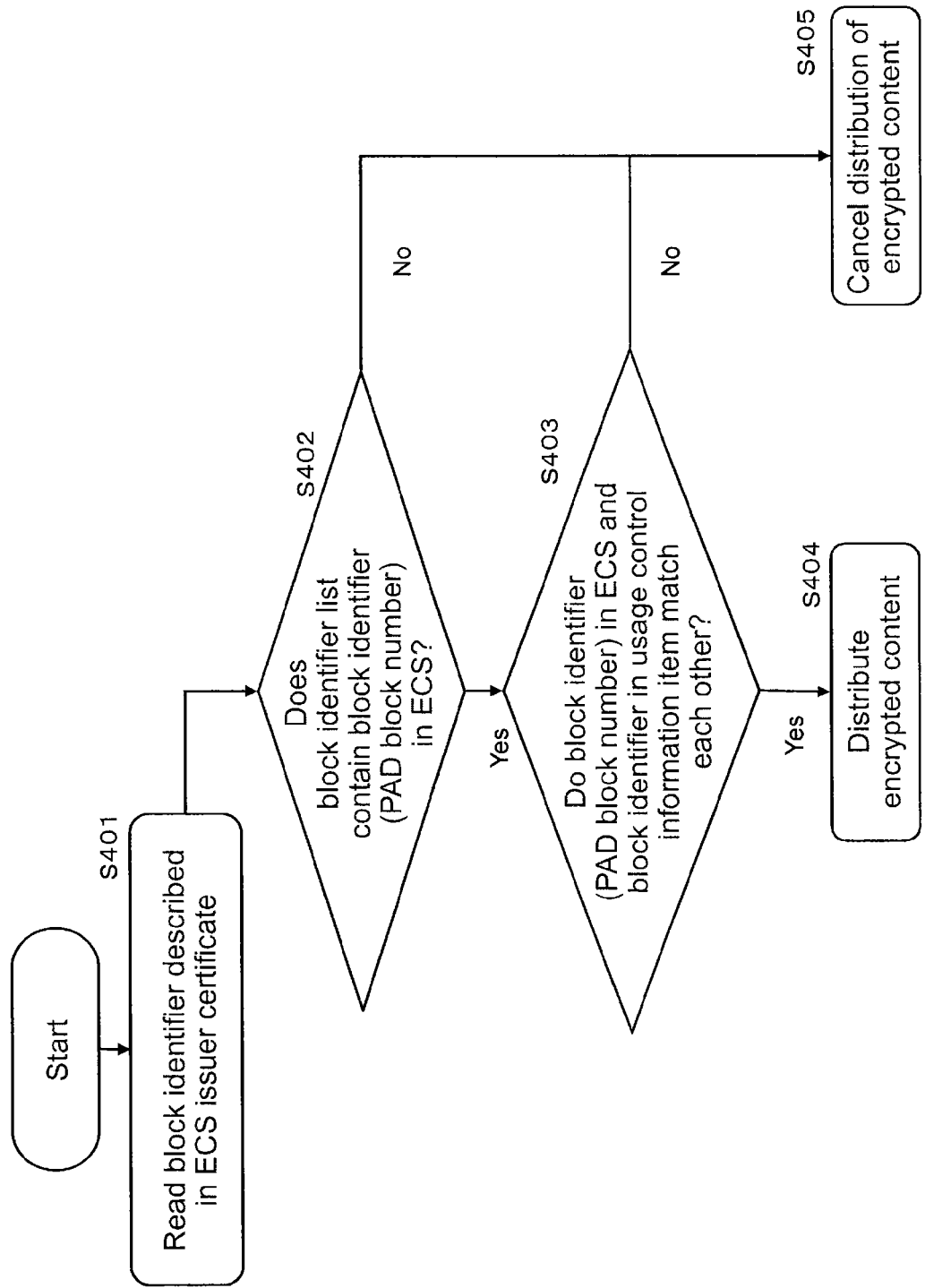
FIG. 31 is an explanatory flowchart showing a content provision possibility judgment sequence with reference to the block identifier recorded in the encrypted content signature file (ECS file) and the different block identifier recorded in the usage control information file.

As a pre-process of Step S401 in the flowchart shown in FIG. 31, the content providing apparatus executes signature verification applying a signature by an ECS issuer, which is set in the encrypted content signature file (ECS file) received from the encrypted content signature (ECS) issuer.

In a case where no tampering has been confirmed through this signature verification, in other words, validity of the encrypted content signature file (ECS file) has been confirmed, another signature verification of an ECS issuer cert stored in the encrypted content signature file (ECS file) is executed. The processes of Step S401 and subsequent Steps are executed provided that no tampering has been confirmed in both of the two signature verification processes.

In a case where some tampering has been confirmed in at least one of the two signature verification processes, validity of the encrypted content signature file (ECS file) or validity of the ECS issuer cert is not confirmed. Thus, the processes of Step S401 and subsequent Steps are not executed. In this case, the content providing process is not executed as well.

Note that, as content hashes as source data of content hash list collections, which are stored in the encrypted content signature file (ECS file), there may be set either hashes of encrypted content or hashes of unencrypted contents.

In a case where no tampering has been confirmed through both of the two signature verification processes of the encrypted content signature file (ECS file) and the ECS issuer cert, in other words, validities of the encrypted content signature file (ECS file) and the ECS issuer cert have been confirmed, the content providing apparatus executes the process of Step S401.

First, in Step S401, the content providing apparatus reads the ECS issuer cert in the ECS file to read an information item of the block identifier recorded in the ECS issuer cert.

Figure 32:
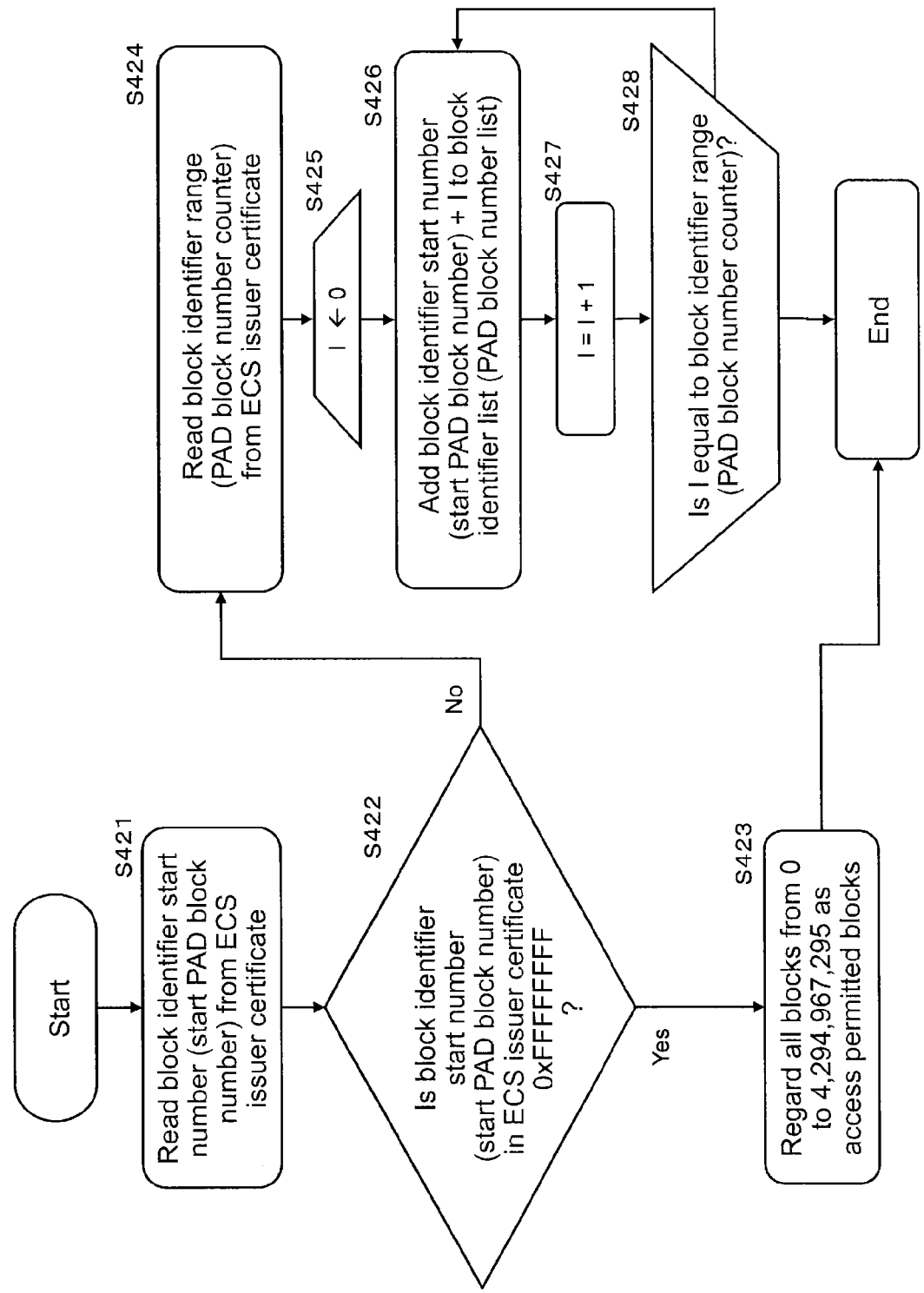
FIG. 32 is an explanatory flowchart showing a processing sequence of reading the block identifier from the ECS issuer certificate.

Details of this Step S401 are described with reference to a flowchart shown in FIG. 32.

In Step S421, a block identifier start number (start PAD block number) is read from the ECS issuer cert.

The block identifier start number (start PAD block number) is a start number of an access permitted block in a protected area in a medium, to which the ECS issuer 102 permits the content providing apparatus 103 to make access.

Next, in Step S422, it is judged whether or not the block identifier start number (start PAD block number) in the ECS issuer cert is 0xFFFFFFFF.

Note that, when the block identifier start number (start PAD block number) is 0xFFFFFFFF, access to all the blocks is permitted.

In Step S422, in a case where it has been judged that the block identifier start number (start PAD block number) is 0xFFFFFFFF, the flow proceeds to Step S423 to regard all the blocks in the protected area in the medium as access permitted blocks.

Meanwhile, in Step S422, in a case where it has been judged that the block identifier start number (start PAD block number) is not 0xFFFFFFFF, the flow proceeds to Step S424.

In Step S424, a block identifier range (PAD block number counter) is read from the ECS issuer cert.

The block identifier range (PAD block number counter) is an information item indicating a range from the start number of the access permitted block in the protected area in the medium, to which the content providing apparatus 103 permits the ECS issuer 102 to make access.

Processes in subsequent Steps S425 to S428 are each an iterative routine of incrementing a variable I indicating the block identifier sequentially from 0 to 1, 2, 3, . . . .

First, in Step S425, the following equation is set.
Variable: I=1

Next, in Step S426, block identifier start number (start PAD block number)+I is added to a block identifier list (PAD block number list).

Next, in Step S427, the following equation is established.

$$I=I+1$$

Next, in Step S428, it is judged whether or not I is equal to the block identifier range (PAD block number counter).

When I is equal thereto, the flow is completed. Meanwhile, when I is not equal thereto, the flow returns to Step S426 to repeat the process.

Based on this flow, the process of Step S401 in the flow shown in FIG. 31 is executed.

In Step S401, the block identifier start number (start PAD block number) and the block identifier range (PAD block number counter) in the ECS issuer cert are applied to calculate an access permitted range defined by the ECS issuer cert. Then, the access permitted range is set as an access permitted block identifier list.

Next, in Step S402, it is judged whether or not the access permitted block identifier list created in Step S401 contains the block identifier (PAD block number) described as a data item recorded in the encrypted content signature (ECS) file.

When the access permitted block identifier list does not contain the block identifier (PAD block number), the flow proceeds to Step S405 not to execute a process of providing the content to the user apparatus.

Meanwhile, when the access permitted block identifier list contains the block identifier (PAD block number), the flow proceeds to Step S403.

In Step S403, it is judged whether or not the block identifier (PAD block number) described as a data item recorded in the encrypted content signature (ECS) file matches the block identifier recorded in the usage control information item (UR).

When the block identifier (PAD block number) does not match the different block identifier, the flow proceeds to Step S405 not to execute the process of providing the content to the user apparatus.

Meanwhile, when the block identifier (PAD block number) matches the different block identifier, the flow proceeds to Step S404 to execute the process of providing the content to the user apparatus.

In this way, the content providing apparatus judges whether or not both the following conditions (a) and (b) are satisfied.

(a) The block identifier (PAD block number) recorded in the encrypted content signature (ECS) file falls within an access permitted block range recorded in the ECS issuer cert.

(b) The block identifier (PAD block number) recorded in the encrypted content signature (ECS) file matches the different block identifier recorded in the usage control information item (UR)

Only when both the conditions (a) and (b) are satisfied, the content is provided to the user apparatus.

Next, how the user apparatus to execute a content reproduction process executes a process of applying the block identifiers is described with reference to a flowchart shown in FIG. 33.

Figure 33:
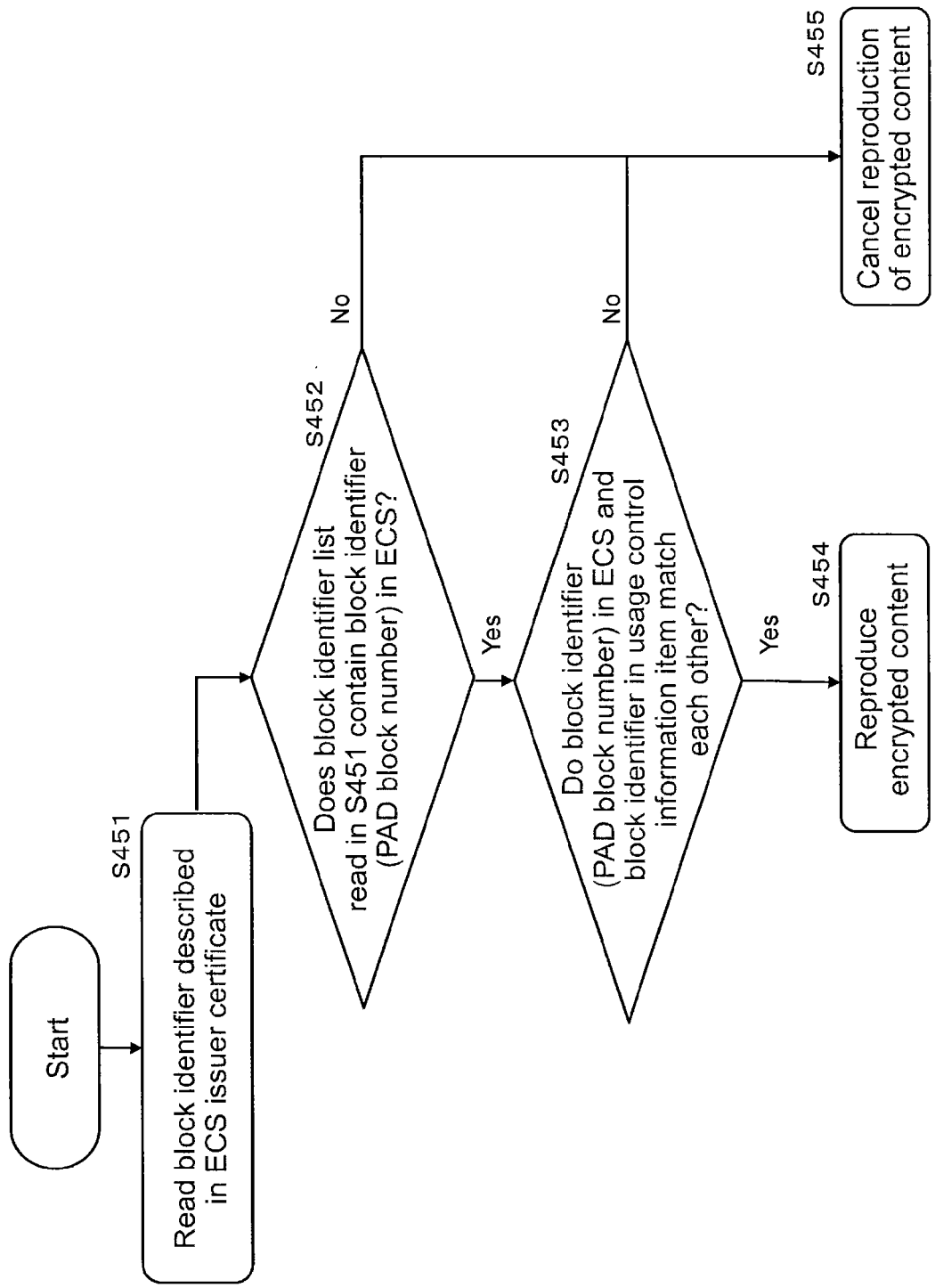
FIG. 33 is an explanatory flowchart showing a content reproduction possibility judgment sequence with reference to the block identifier recorded in the encrypted content signature file (ECS file) and the different block identifier recorded in the usage control information file.

Note that, prior to Step 451 shown in FIG. 33, the user apparatus executes the signature verification applying the signature by an ECS issuer, which is set in the encrypted content signature file (ECS file) received from the content providing apparatus.

In a case where no tampering has been confirmed through this signature verification, in other words, validity of the encrypted content signature file (ECS file) has been confirmed, another signature verification of the ECS issuer cert stored in the encrypted content signature file (ECS file) is executed. The processes of Step S451 and subsequent Steps are executed provided that no tampering has been confirmed in both of the two signature verification processes.

In a case where some tampering has been confirmed in at least one of the two signature verification processes, validity of the encrypted content signature file (ECS file) or validity of the ECS issuer cert is not confirmed. Thus, the processes of Step S451 and subsequent Steps are not executed. In this case, the content reproduction process is not executed as well.

In a case where no tampering has been confirmed through both of the two signature verification processes of the encrypted content signature file (ECS file) and the ECS issuer cert, in other words, validities of the encrypted content signature file (ECS file) and the ECS issuer cert have been confirmed, the user apparatus executes the process of Step S451.

In Step S451, the same process as the process of Step S401 in the flow shown in FIG. 31, which is described above as the process by the content providing apparatus, is executed. In other words, as described in detail with reference to the flow shown in FIG. 32, the block identifier start number (start PAD block number) and the block identifier range (PAD block number counter) in the ECS issuer cert are applied to calculate the access permitted range defined by the ECS issuer cert. Then, the access permitted range is set as the access permitted block identifier list.

Next, in Step S452, it is judged whether or not the access permitted block identifier list created in Step S451 contains the block identifier (PAD block number) described as a data item recorded in the encrypted content signature (ECS) file.

When the access permitted block identifier list does not contain the block identifier (PAD block number), the flow proceeds to Step S455 not to execute a process of reproducing the content.

Meanwhile, when the access permitted block identifier list contains the block identifier (PAD block number), the flow proceeds to Step S453.

In Step S453, it is judged whether or not the block identifier (PAD block number) described as a data item recorded in the encrypted content signature (ECS) file matches the block identifier recorded in the usage control information item (UR).

When the block identifier (PAD block number) does not match the different block identifier, the flow proceeds to Step S455 not to execute the process of reproducing the content.

Meanwhile, when the block identifier (PAD block number) matches the different block identifier, the flow proceeds to Step S454 to execute the process of reproducing the content.

Note that, before starting the content reproduction process, not only processes of acquiring and creating title key to be applied to decryption of the encrypted content, but also a hash value verification process applying the content hash list collections contained in the encrypted content signature file are executed. In a case where no tampering has been confirmed in the content through the hash value verification, reproduction of the content is permitted.

In this way, the user apparatus to reproduce the content judges whether or not both the following conditions (a) and (b) are satisfied.

(a) The block identifier (PAD block number) recorded in the encrypted content signature (ECS) file falls within an access permitted block range recorded in the ECS issuer cert.

(b) The block identifier (PAD block number) recorded in the encrypted content signature (ECS) file matches the different block identifier recorded in the usage control information item (UR)

Only when both the conditions (a) and (b) are satisfied, the user apparatus reproduces the content.

[12. Hardware Configuration Example of Each Apparatus]

Lastly, a hardware configuration example of each of the apparatuses to execute the processes described hereinabove is described with reference to FIG. 34.

Figure 34:
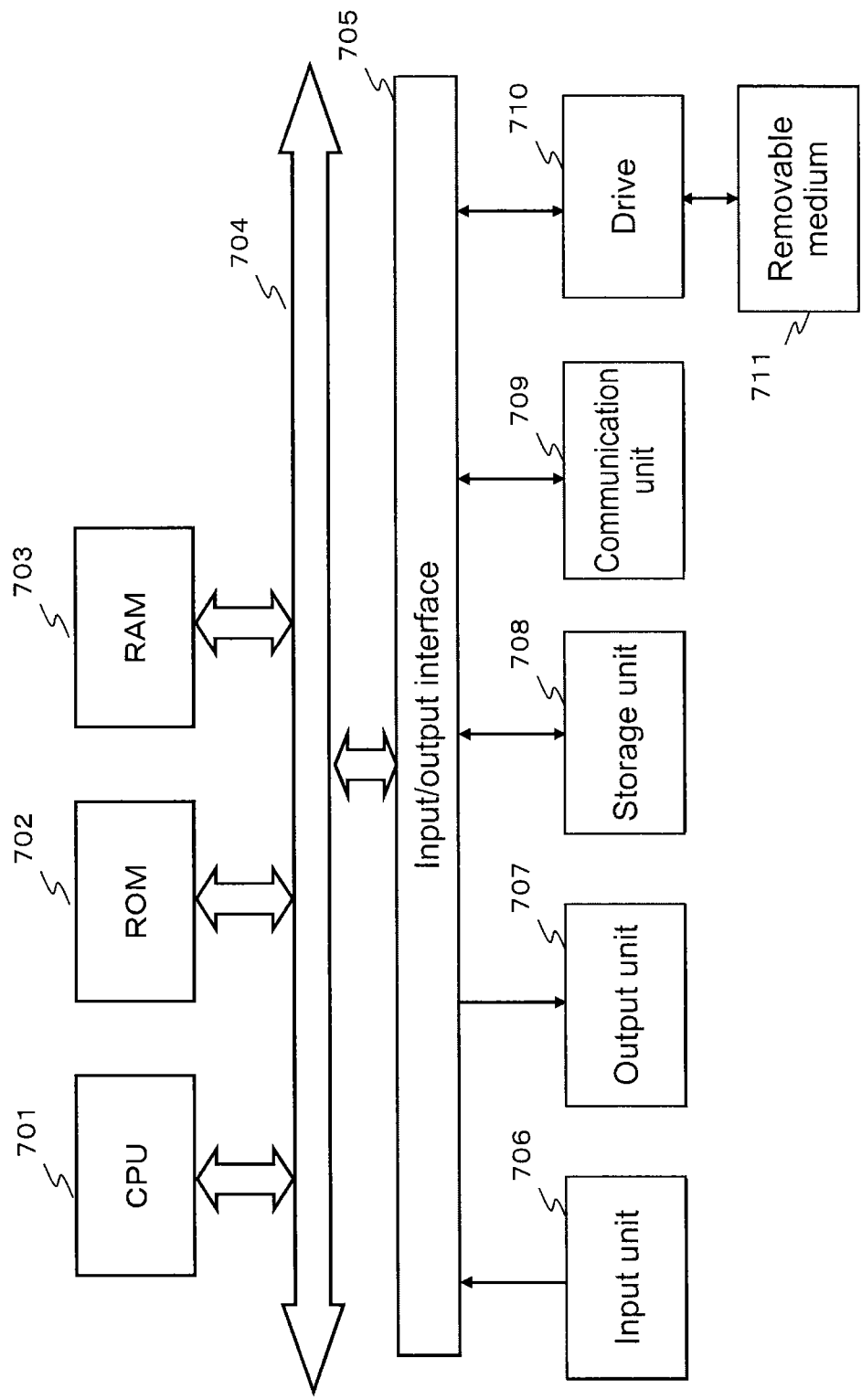
FIG. 34 is an explanatory diagram of a hardware configuration example of an information processing apparatus.

FIG. 34 shows a hardware configuration example of an information processing apparatus, which is applicable to any of the user apparatuses 104, the content providing apparatuses 103, the encrypted content signature issuers 102, the license issuer 101 shown in FIGS. 7 and 8.

A CPU (Central Processing Unit) 701 functions as a data processing unit to execute various processes based on programs stored in a ROM (Read Only Memory) 702 or a storage unit 708. For example, the CPU 701 executes the processes based on the flowcharts described hereinabove. A RAM (Random Access Memory) 703 stores, as appropriate, programs to be executed by the CPU 701, data items, and the like. These CPU 701, ROM 702, and RAM 703 are connected to each other with a bus 704.

The CPU 701 is connected to an input/output interface 705 via the bus 704. To the input/output interface 705, there are connected an input unit 706 including various switches, a keyboard, a mouse, and a microphone, and an output unit 707 including a display and a speaker. The CPU 701 executes the various processes in response to commands input from the input unit 706, and outputs processing results, for example, to the output unit 707.

A storage unit 708 connected to the input/output interface 705 includes, for example, a hard disc, and stores the programs to be executed by the CPU 701 and the various data items. A communication unit 709 communicates with external apparatuses via networks such as the Internet and a local area network.

A drive 710 connected to the input/output interface 705 drives a removable medium 711 such as a magnetic disc, an optical disc, a magneto-optical disc, and a semiconductor memory such as a memory card, and acquires various data items stored therein, such as contents and key information items. For example, by using the contents and the key data items, a decryption process, a reproducing process, and the like are executed on the contents based on the reproducing programs to be executed by the CPU.

Figure 35:
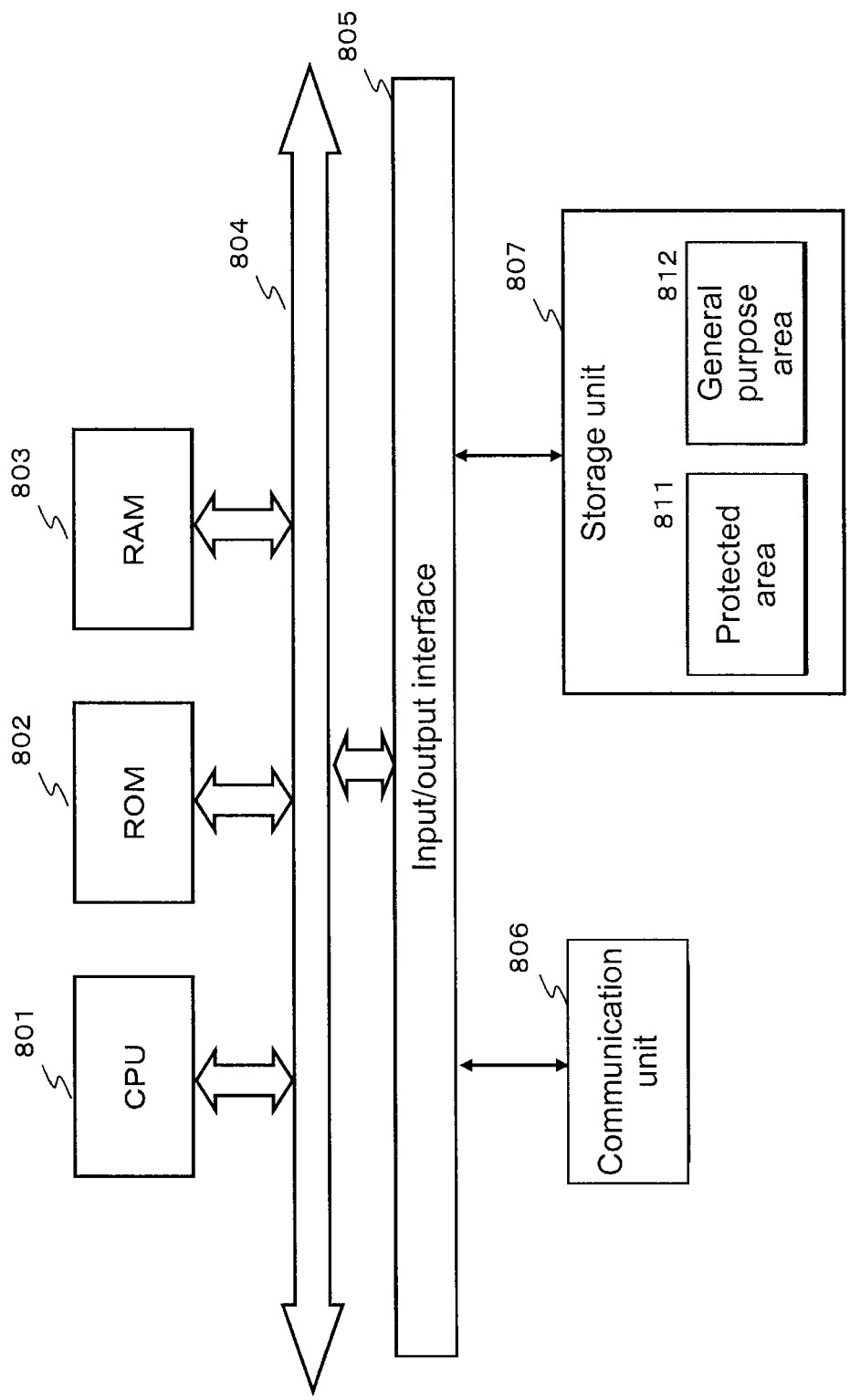
FIG. 35 is an explanatory diagram of a hardware configuration example of a memory card as the information storage apparatus.

FIG. 35 shows a hardware configuration example of a memory card as an information storage apparatus.

A CPU (Central Processing Unit) 801 functions as a data processing unit to execute various processes based on programs stored in a ROM (Read Only Memory) 802 or a storage unit 807. For example, the CPU 801 executes communication processes to the servers and the host apparatuses, which are described in the embodiments hereinabove, processes such as reading and writing of data with respect to the storage unit 807, and an access possibility judgment process in units of segment areas in a protected area 811 in the storage unit 807. A RAM (Random Access Memory) 803 stores, as appropriate, programs to be executed by the CPU 801, data items, and the like. These CPU 801, ROM 802, and RAM 803 are connected to each other with a bus 804.

The CPU 801 is connected to an input/output interface 805 via the bus 804. To the input/output interface 805, there are connected a communication unit 806 and the storage unit 807.

The communication unit 806 connected to the input/output interface 805 executes communications, for example, to the servers and the hosts. The storage unit 807 is a storage area for data, and includes, as described above, the protected area 811 to which access restrictions are set and a general purpose area 812 from which data can be freely read.

In the typical example described in the embodiments hereinabove, contents to be provided by content providing apparatuses are encrypted contents. However, the configurations according to the embodiments of the present disclosure are not limited to the case where the contents to be provided are encrypted contents, and may be applicable to a case where the contents to be provided are unencrypted plaintext contents. Note that, in a case where the contents are plaintext contents, the same process as the encrypted content providing process described hereinabove may be performed on a premise that the title key described in the embodiments hereinabove includes data strings in related art, such as a key data item in which values are all zero.

[13. Summary of Configuration of Present Disclosure]

Hereinabove, the embodiments of the present disclosure have been described in detail with reference to specific embodiments. However, as a matter of course, modifications and replacements of the embodiments may be made by those skilled in the art without departing from the gist of the present disclosure. In other words, the present disclosure has been described merely as illustration, and hence should not be construed restrictively. The gist of the present disclosure should be judged based on the scope of the appended claims.

Note that, the technology disclosed in the specification may include the following configurations.

(1) An information storage apparatus, including a storage unit configured to store an encrypted content and an encryption key to be applied to decryption of the encrypted content, the storage unit including a protected area in which a converted encryption key is stored and to which access restrictions are set, the converted encryption key being a data item acquired through conversion of the encryption key, and a general purpose area storing the encrypted content and an encrypted content signature file set correspondingly to the encrypted content, the encrypted content signature file containing, as a recorded data item, a block identifier indicating in which of areas in the protected area storage of the converted encryption key is permitted, to permit a reproducing apparatus to execute content reproduction possibility judgment applying the block identifier, the reproducing apparatus being configured to read the encrypted content from the storage unit and execute a reproducing process.

(2) The information storage apparatus according to Item (1), in which the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas in the protected area, storage of the converted encryption key is permitted, and the information storage apparatus permits the reproducing apparatus to judge whether or not the block identifier recorded in the encrypted content signature file falls within the block identifier range recorded in the ECS issuer certificate, and to determine, based on results of the judgment, whether or not the encrypted content can be reproduced, the reproducing apparatus being configured to read the encrypted content from the storage unit and execute the reproducing process.

(3) The information storage apparatus according to Item (1) or (2), in which the general purpose area further stores a usage control information item corresponding to the encrypted content, the usage control information item being an information item containing a different block identifier indicating in which of blocks the encryption key is stored, and the information storage apparatus permits the reproducing apparatus to judge whether or not the block identifier recorded in the encrypted content signature file matches the different block identifier recorded in the usage control information item, and to determine, based on results of the judgment, whether or not the encrypted content can be reproduced, the reproducing apparatus being configured to read the encrypted content from the storage unit and execute the reproducing process.

(4) An information processing apparatus, including a data processing unit configured to execute a decryption process and a reproducing process of an encrypted content recorded in a medium, the data processing unit being configured to read an encrypted content signature file set correspondingly to the encrypted content from the medium, to acquire, from the encrypted content signature file, a block identifier indicating in which of areas storage of an encryption key to be applied to decryption of the encrypted content is permitted, and to execute a content reproduction possibility judgment process applying the block identifier.

(5) The information processing apparatus according to Item (4), in which the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas, storage of the encryption is permitted, and the data processing unit judges whether or not the block identifier recorded in the encrypted content signature file falls within the block identifier range recorded in the ECS issuer certificate, and determines, based on results of the judgment, whether or not the encrypted content can be reproduced.

(6) The information processing apparatus according to Item (4) or (5), in which the medium further stores a usage control information item corresponding to the encrypted content, the usage control information item being an information item containing a different block identifier indicating in which of blocks the encryption key is stored, and the data processing unit judges whether or not the block identifier recorded in the encrypted content signature file matches the different block identifier recorded in the usage control information item, and determines, based on results of the judgment, whether or not the encrypted content can be reproduced.

(7) An information processing apparatus, including a data processing unit configured to output an encrypted content to be recorded to a medium and an encryption key to be applied to decryption of the encrypted content, the data processing unit being configured to acquire an encrypted content signature file set correspondingly to the encrypted content, to acquire, from the encrypted content signature file, a block identifier indicating in which of areas storage of the encryption key is permitted, and to execute a content output possibility judgment process applying the block identifier.

(8) The information processing apparatus according to Item (7), in which the encrypted content signature file contains an ECS issuer certificate storing a public key from an ECS issuer which is an issuer of the encrypted content signature file, the ECS issuer certificate containing, as a recorded data item, a block identifier range as a range in which, in each of the areas, storage of the encryption key is permitted, and the data processing unit judges whether or not the block identifier recorded in the encrypted content signature file falls within the block identifier range recorded in the ECS issuer certificate, and determines, based on results of the judgment, whether or not the encrypted content can be output.

(9) The information processing apparatus according to Item (7) or (8), in which the data processing unit is configured to acquire a usage control information item set correspondingly to the encrypted content, to acquire, from the acquired usage control information item, a different block identifier indicating in which of blocks the encryption key is stored, to judge whether or not the block identifier recorded in the encrypted content signature file matches the different block identifier recorded in the usage control information item, and to determine, based on results of the judgment, whether or not the encrypted content can be reproduced.

Further, the configuration according to the embodiments of the present disclosure includes methods of executing the processes and programs to execute the processes in the above-mentioned apparatuses and systems.

Further, the series of processes described in the specification can be executed by hardware, software, or a composite configuration of the hardware and the software. When the processes are executed by the software, the processes can be executed with programs which store processing sequences and are installed in a memory in a computer incorporated in dedicated hardware, or installed in a general purpose computer capable of executing various processes. For example, the programs can be recorded in advance in a recording medium, and can be installed from the recording medium to the computer. Alternatively, the programs can be received via networks such as the Internet or a LAN (Local Area Network) and then installed to recording media such as built-in hard disc.

Note that, various processes described in this specification may be executed not only in time series according to the description, but also in parallel or individually in accordance with processing capabilities of apparatuses to execute the process or when necessary. Further, the term "system" used in this specification means a logical collective configuration of a plurality of apparatuses, and hence these apparatuses configured as described above are not necessarily provided in the same casing.

As described hereinabove, according to a configuration in one embodiment of the present disclosure, an apparatus and method for effectively preventing fraudulent usage of contents are provided.

Specifically, from an encrypted content signature file set correspondingly to an encrypted content, a block identifier indicating in which of areas storage of an encryption key to be applied to decryption of the encrypted content is permitted is acquired. Then, a content reproduction possibility judgment process applying the block identifier is executed. The encrypted content signature file contains a cert from an ECS issuer as an issuer of the encrypted content signature file. A judgment is executed as to whether or not the block identifier recorded in the encrypted content signature file falls within a block identifier range recorded in the ECS issuer cert, and a judgment is executed as to whether or not the block identifier recorded in the encrypted content signature file matches a different block identifier recorded in a usage control information item. Based on results of these judgments, whether or not the content can be reproduced is determined.

By using the block identifier information item acquired from the encrypted content signature file, content usage control can be performed based on a judgment as to whether or not a key information item is recorded in a certain access permitted block.

The present disclosure contains subject matter related to that disclosed in Japanese Priority Patent Application JP 2011-251735 filed in the Japan Patent Office on Nov. 17, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information storage apparatus, comprising
a storage unit configured to store an encrypted content and an encryption key to be applied to decryption of the encrypted content, the storage unit including
a protected area in which a converted encryption key is stored and to which access restrictions are set, the converted encryption key being a data item acquired through conversion of the encryption key, and
a general purpose area storing the encrypted content and an encrypted content signature (ECS) file set correspondingly to the encrypted content, the ECS file containing, as a recorded data item, a block identifier indicating in which of areas in the protected area storing the converted encryption key is permitted, to permit a reproducing apparatus to compare the block identifier recorded in the ECS file with another block identifier recorded in a usage control information item stored in the general purpose area, both the block identifier recorded in the ECS file and the other block identifier recorded in the usage control information being provided from a content providing apparatus that provides the encrypted content, the reproducing apparatus being configured to read the encrypted content from the storage unit and execute a reproducing process based on a result of the comparison.

2. The information storage apparatus according to claim 1, wherein
the ECS file contains an ECS issuer certificate storing a public key from an ECS issuer which is an issuer of the ECS file, the ECS issuer certificate containing, as a recorded data item, a block identifier range as a range in which, in each of the areas in the protected area, storage of the converted encryption key is permitted, and
the information storage apparatus permits the reproducing apparatus to judge whether or not the block identifier recorded in the ECS file falls within the block identifier range recorded in the ECS issuer certificate, and to determine, based on results of the judgment, whether or not the encrypted content can be reproduced, the reproducing apparatus being configured to read the encrypted content from the storage unit and execute the reproducing process.

3. The information storage apparatus according to claim 1, wherein
the general purpose area further stores a usage control information item corresponding to the encrypted content, the usage control information item being an information item containing a different block identifier indicating in which of blocks the encryption key is stored, and
the information storage apparatus permits the reproducing apparatus to judge whether or not the block identifier recorded in the ECS file matches the different block identifier recorded in the usage control information item, and to determine, based on results of the judgment, whether or not the encrypted content can be reproduced, the reproducing apparatus being configured to read the encrypted content from the storage unit and execute the reproducing process.

4. An information processing apparatus, comprising
a data processing unit configured to execute a decryption process and a reproducing process of an encrypted content recorded in a medium, the data processing unit being configured
to read an encrypted content signature (ECS) file set correspondingly to the encrypted content from the medium,
to acquire, from the ECS file, a block identifier indicating in which of areas storage of an encryption key to be applied to decryption of the encrypted content is permitted, and
to compare the block identifier acquired from the ECS file with another block identifier recorded in a usage control information item stored in a general purpose area of a storage unit, both the block identifier acquired from the ECS file and the other block identifier recorded in the usage control information being provided from a content providing apparatus that provides the encrypted content.

5. The information processing apparatus according to claim 4, wherein
the ECS file contains an ECS issuer certificate storing a public key from an ECS issuer which is an issuer of the ECS file, the ECS issuer certificate containing, as a recorded data item, a block identifier range as a range in which, in each of the areas, storage of the encryption is permitted, and the data processing unit judges whether or not the block identifier recorded in the ECS file falls within the block identifier range recorded in the ECS issuer certificate, and determines, based on results of the judgment, whether or not the encrypted content can be reproduced.

6. The information processing apparatus according to claim 4, wherein the medium further stores a usage control information item corresponding to the encrypted content, the usage control information item being an information item containing a different block identifier indicating in which of blocks the encryption key is stored, and the data processing unit judges whether or not the block identifier recorded in the ECS file matches the different block identifier recorded in the usage control information item, and determines, based on results of the judgment, whether or not the encrypted content can be reproduced.

7. An information processing apparatus, comprising a data processing unit configured to output an encrypted content to be recorded to a medium and an encryption key to be applied to decryption of the encrypted content, the data processing unit being configured to acquire an encrypted content signature (ECS) file set correspondingly to the encrypted content, to acquire, from the ECS file, a block identifier indicating in which of areas storage of the encryption key is permitted, and to compare the block identifier acquired from the ECS file with another block identifier recorded in a usage control information item stored in a general purpose area of a storage unit of the information processing apparatus, both the block identifier acquired from the ECS file and the other block identifier recorded in the usage control information being provided from a content providing apparatus that provides the encrypted content.

8. The information processing apparatus according to claim 7, wherein the ECS file contains an ECS issuer certificate storing a public key from an ECS issuer which is an issuer of the ECS file, the ECS issuer certificate containing, as a recorded data item, a block identifier range as a range in which, in each of the areas, storage of the encryption key is permitted, and the data processing unit judges whether or not the block identifier recorded in the ECS file falls within the block identifier range recorded in the ECS issuer certificate, and determines, based on results of the judgment, whether or not the encrypted content can be output.

9. The information processing apparatus according to claim 7, wherein the data processing unit is configured to acquire a usage control information item set correspondingly to the encrypted content, to acquire, from the acquired usage control information item, a different block identifier indicating in which of blocks the encryption key is stored, to judge whether or not the block identifier recorded in the ECS file matches the different block identifier recorded in the usage control information item, and to determine, based on results of the judgment, whether or not the encrypted content can be reproduced.

10. An information processing method to be executed by an information processing apparatus, the information processing apparatus including a data processing unit configured to execute a decryption process and a reproducing process of an encrypted content recorded in a medium, the data processing unit being configured to read an encrypted content signature (ECS) file set correspondingly to the encrypted content from the medium, to acquire, from the ECS file, a block identifier indicating in which of areas storage of an encryption key to be applied to decryption of the encrypted content is permitted, and to compare the block identifier acquired from the ECS file with another block identifier recorded in a usage control information item stored in a general purpose area of a storage unit of the information processing apparatus, both the block identifier acquired from the ECS file and the other block identifier recorded in the usage control information being provided from a content providing apparatus the encrypted content.

11. An information processing method to be executed by an information processing apparatus, the information processing apparatus including a data processing unit configured to output an encrypted content to be recorded to a medium and an encryption key to be applied to decryption of the encrypted content, the data processing unit being configured to acquire an encrypted content signature (ECS) file set correspondingly to the encrypted content, to acquire, from the ECS file, a block identifier indicating in which of areas storage of the encryption key is permitted, and to compare the block identifier acquired from the ECS file with another block identifier recorded in a usage control information item stored in a general purpose area of a storage unit of the information processing apparatus, both the block identifier acquired from the ECS file and the other block identifier recorded in the usage control information being provided from a content providing apparatus that provides the encrypted content.

12. A non-transitory computer readable medium storing computer readable program thereon that, when executed by an information processing apparatus including a data processing unit configured to execute a decryption process and a reproducing process of an encrypted content recorded in a medium, causes the data processing unit to perform a method comprising:

reading an encrypted content signature (ECS) file set correspondingly to the encrypted content from the medium;

acquiring, from the ECS file, a block identifier indicating in which of areas storage of an encryption key to be applied to decryption of the encrypted content is permitted; and comparing the block identifier acquired from the ECS file with another block identifier recorded in a usage control information item stored in a general purpose area of a storage unit of the information processing apparatus, both the block identifier acquired from the ECS file and the other block identifier recorded in the usage control information being provided from a content providing apparatus that provides the encrypted content.

13. A non-transitory computer readable medium storing computer readable program thereon that, when executed by an information processing apparatus including a data processing unit configured to output an encrypted content to be recorded to a medium and an encryption key to be applied to decryption of the encrypted content, causes the data processing unit to perform a method comprising:

acquiring an encrypted content signature (ECS) file set correspondingly to the encrypted content;
acquiring, from the ECS file, a block identifier indicating in which of areas storage of the encryption key is permitted: and
comparing the block identifier acquired from the ECS file with another block identifier recorded in a usage control information item stored in a general purpose area of a storage unit of the information processing apparatus, both the block identifier acquired from the ECS file and the other block identifier recorded in the usage control information being provided from a content providing apparatus that provides the encrypted content.

* * * * *